(12) United States Patent
Kyuma

(10) Patent No.: US 10,248,209 B2
(45) Date of Patent: Apr. 2, 2019

(54) STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventor: Koichi Kyuma, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/584,395

(22) Filed: May 2, 2017

(65) Prior Publication Data

US 2018/0196516 A1   Jul. 12, 2018

(30) Foreign Application Priority Data

Jan. 10, 2017  (JP) .................. 2017-001839

(51) Int. Cl.
   *G06F 3/01*     (2006.01)
   *G06F 3/0346*   (2013.01)
   *A63F 13/428*   (2014.01)
   *A63F 13/211*   (2014.01)
   *A63F 13/285*   (2014.01)

(52) U.S. Cl.
   CPC ............ *G06F 3/016* (2013.01); *A63F 13/211* (2014.09); *A63F 13/285* (2014.09); *A63F 13/428* (2014.09); *G06F 3/0346* (2013.01)

(58) Field of Classification Search
   CPC ...... G06F 3/016; G06F 3/0346; G06F 3/0414; G06F 3/01
   See application file for complete search history.

(56) References Cited

U.S. PATENT DOCUMENTS

| | | | |
|---|---|---|---|
| 2004/0100441 A1* | 5/2004 | Rekimoto ............ | G06F 1/1626 345/158 |
| 2007/0106457 A1* | 5/2007 | Rosenberg ............ | G01C 17/00 701/532 |
| 2008/0051197 A1 | 2/2008 | Jawad et al. | |
| 2009/0131171 A1* | 5/2009 | Miyazaki ................ | A63F 13/10 463/37 |
| 2010/0295667 A1* | 11/2010 | Kyung .................... | G06F 3/016 340/407.2 |
| 2011/0190052 A1 | 8/2011 | Takeda et al. | |
| 2011/0263328 A1* | 10/2011 | Yamashita ............ | A63F 13/213 463/36 |
| 2017/0254829 A1* | 9/2017 | Tanabe ................... | G01C 21/26 |

FOREIGN PATENT DOCUMENTS

| | | |
|---|---|---|
| JP | 2009-61159 | 3/2009 |
| JP | 2012-110670 | 6/2012 |

OTHER PUBLICATIONS

Anonymous, "Able Pear Software: iPhone SDK: Shake, Rattle & Roll—Accelerometer and Vibrate", Feb. 24, 2010 (XP055430903) (4 pgs.).

* cited by examiner

*Primary Examiner* — Md Saiful A Siddiqui
(74) *Attorney, Agent, or Firm* — Nixon & Vanderhye P.C.

(57) ABSTRACT

Predetermined vibration data for vibrating a vibrator of an operation apparatus is generated and output to the operation apparatus. Then, when motion/orientation data of the operation apparatus satisfies a predetermined condition in a period in which the vibration data is output, vibration data for temporarily changing the vibration of the vibrator and thereafter continuing the vibration of the vibrator is generated and output.

28 Claims, 26 Drawing Sheets

FIG. 12
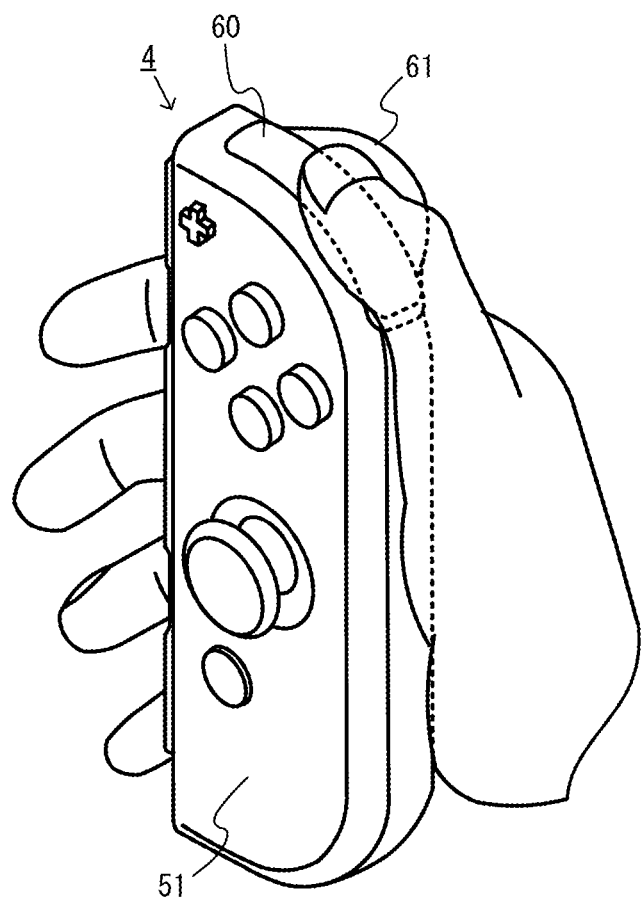
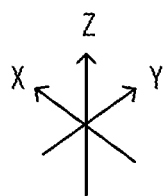

FIG. 14
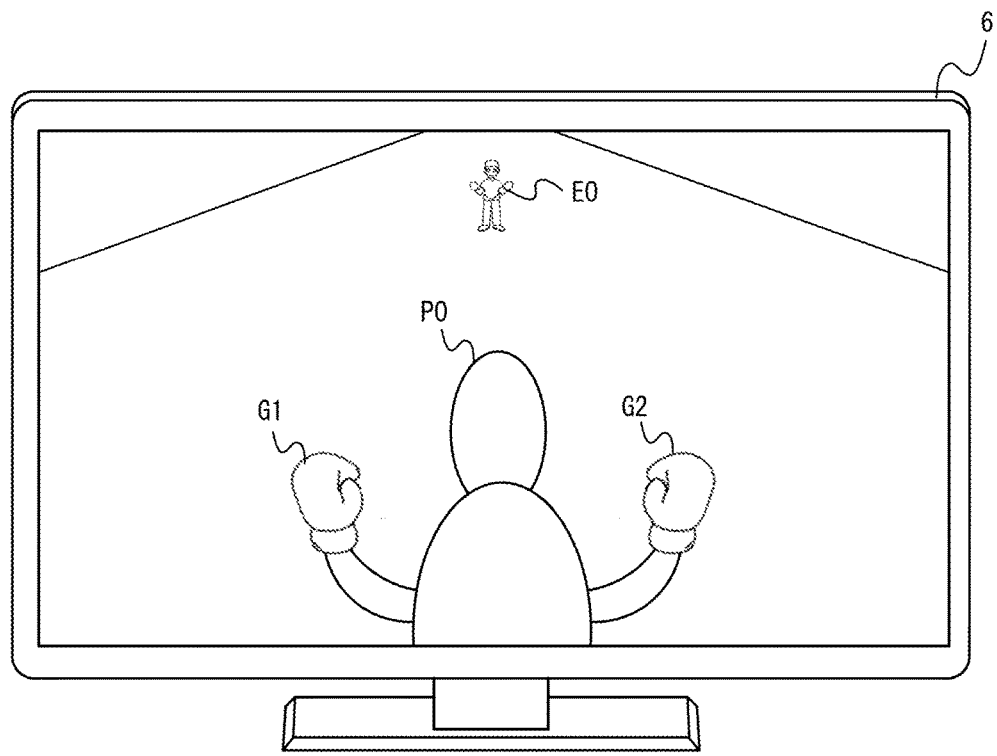
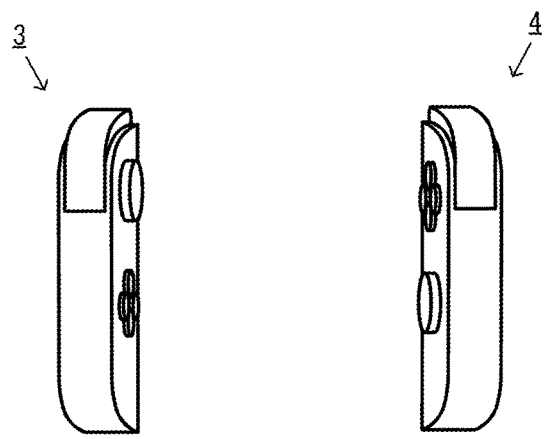

FIG. 15
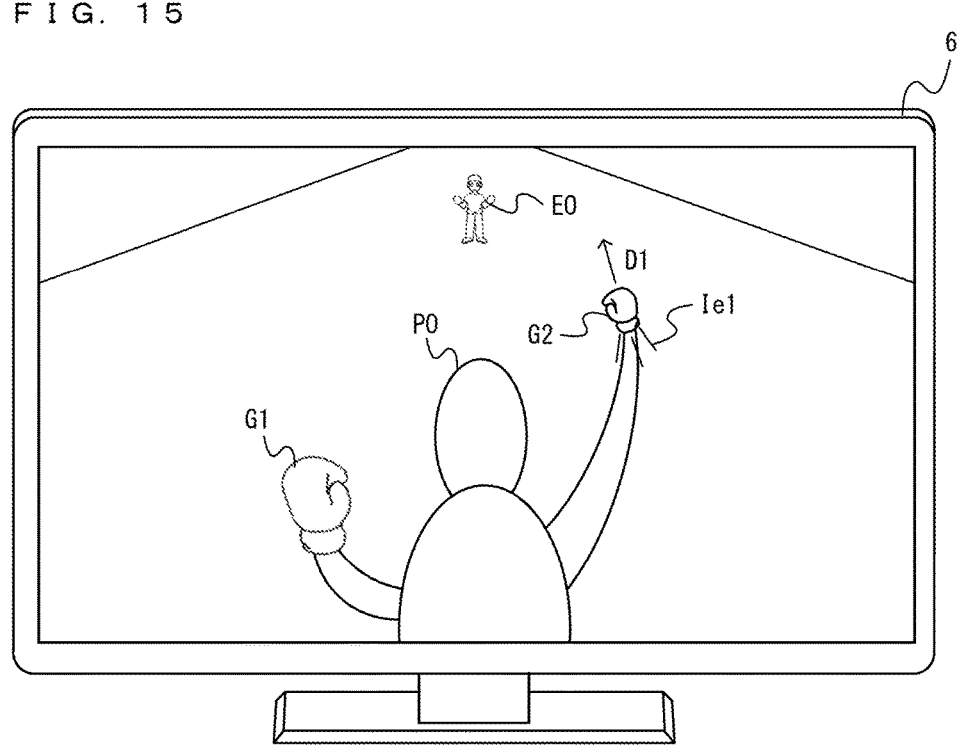
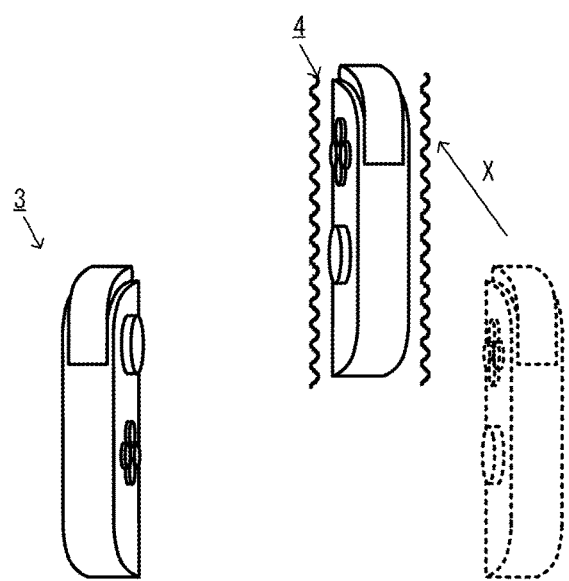

FIG. 16
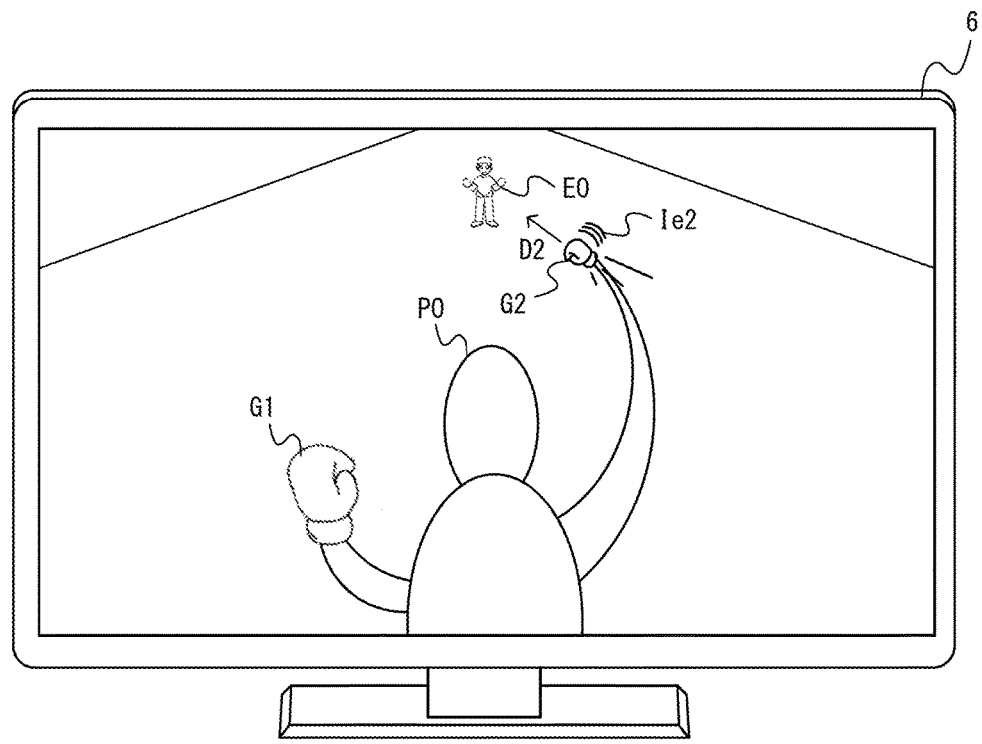
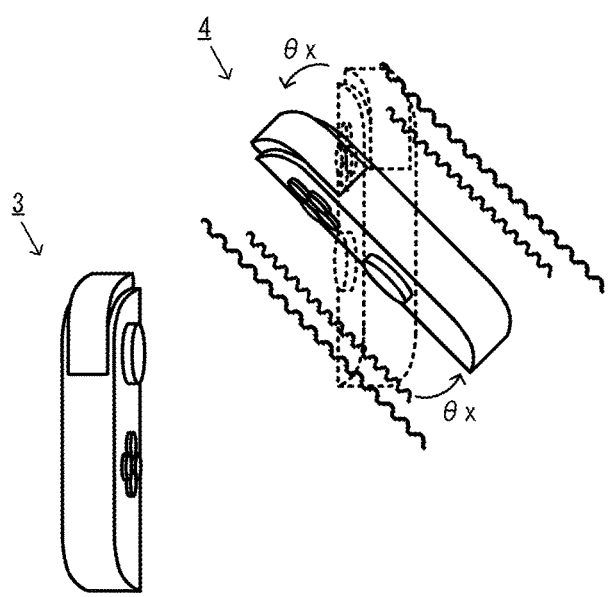

FIG. 18
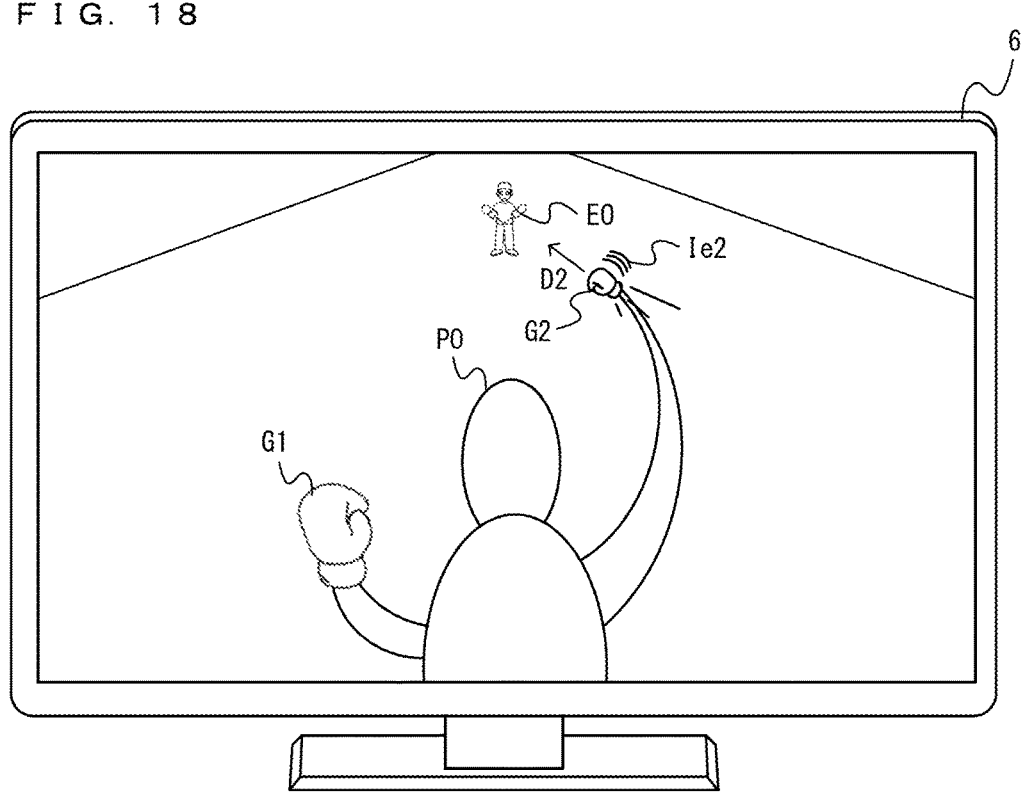
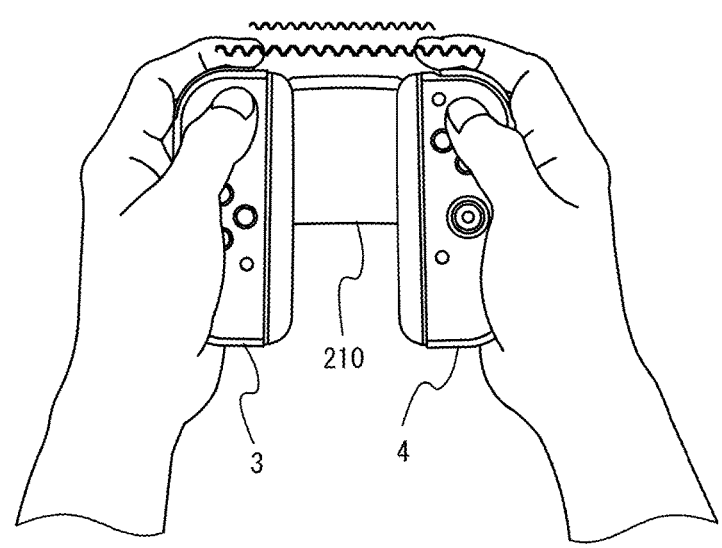

F I G. 1 9
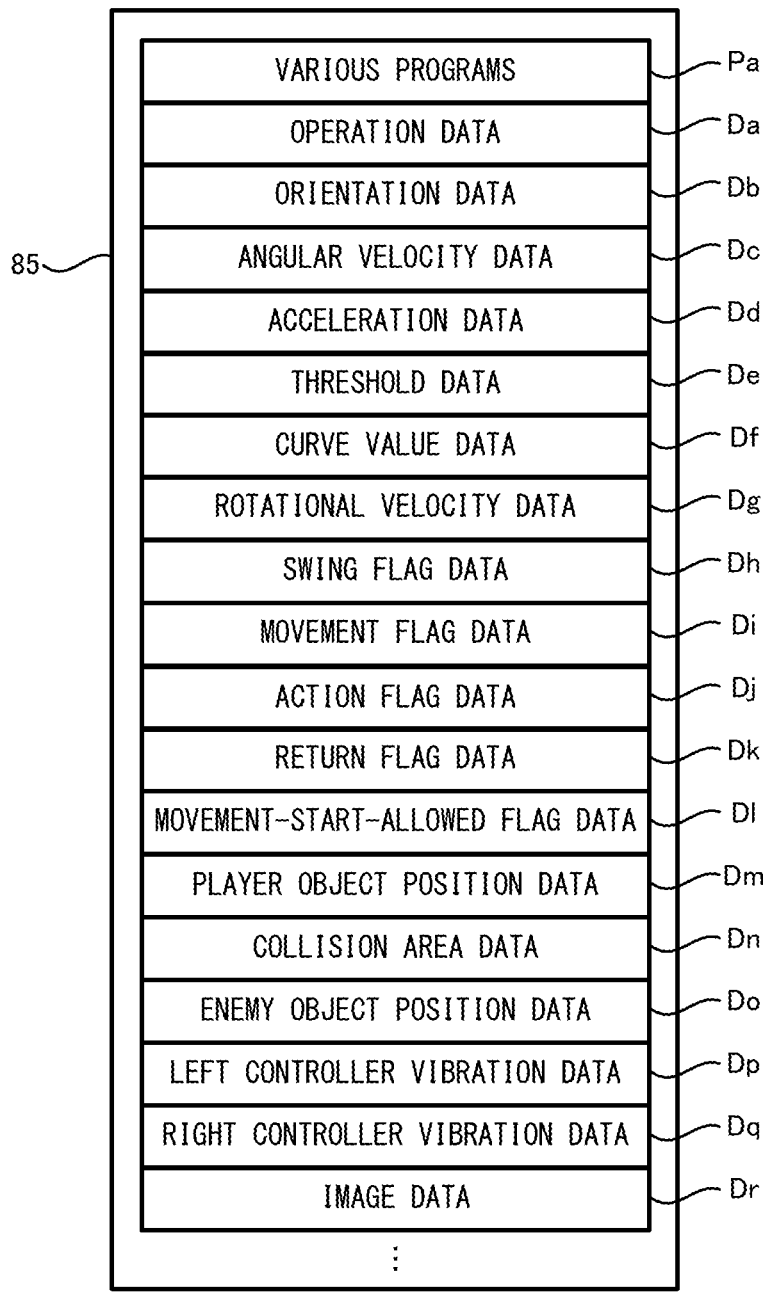

STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2017-001839, filed on Jan. 10, 2017, is incorporated herein by reference.

FIELD

The technology shown here relates to a storage medium having stored therein an information processing program, an information processing apparatus, an information processing system, and an information processing method for performing information processing based on an operation on an operation apparatus.

BACKGROUND AND SUMMARY

Conventionally, there is a game system where an operation is performed using a controller in which a vibrator is provided.

The controller used in the above game system, however, merely vibrates in accordance with predetermined vibration data according to a game situation, and there is room for improvement in variedly vibrating the controller.

Therefore, it is an object of an exemplary embodiment to provide a storage medium having stored therein an information processing program, an information processing apparatus, an information processing system, and an information processing method that are capable of variedly vibrating an operation apparatus.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In a first exemplary configuration of a non-transitory computer-readable storage medium having stored therein an information processing program according to the exemplary embodiment, an information processing program is executed by a computer included in an information processing apparatus for performing information processing based on an operation on an operation apparatus including a vibrator and a sensor for detecting a motion or an orientation of the operation apparatus. The information processing program causes the computer to execute: generating predetermined vibration data for vibrating the vibrator; outputting the vibration data to the operation apparatus; acquiring motion/orientation data based on a detection result of the sensor from the operation apparatus; and performing predetermined information processing based on the motion/orientation data. In the generation of the vibration data, when the motion/orientation data satisfies a predetermined condition in a period in which the predetermined vibration data for vibrating the vibrator is output, vibration data for temporarily changing the vibration of the vibrator and thereafter continuing the vibration of the vibrator is generated.

Based on the above, in accordance with the motion or the orientation of an operation apparatus, it is possible to variedly vibrate the operation apparatus.

Further, in the generation of the vibration data, when the motion/orientation data satisfies the predetermined condition, vibration data for temporarily changing an amplitude of the vibration of the vibrator may be generated.

Based on the above, in accordance with the motion or the orientation of the operation apparatus, it is possible to impart a vibration of which the amplitude temporarily changes.

Further, in the generation of the vibration data, when the motion/orientation data satisfies the predetermined condition, vibration data for temporarily changing a frequency of the vibration of the vibrator may be generated.

Based on the above, in accordance with the motion or the orientation of the operation apparatus, it is possible to impart a vibration of which the frequency temporarily changes.

Further, in the generation of the vibration data, when the motion/orientation data satisfies the predetermined condition, vibration data for temporarily changing an amplitude and a frequency of the vibration of the vibrator may be generated.

Based on the above, in accordance with the motion or the orientation of the operation apparatus, it is possible to impart a vibration of which both the amplitude and the frequency temporarily change.

Further, in the generation of the vibration data, an amount of change in the amplitude to be temporarily changed may be set in accordance with an amount of change in the motion or the orientation of the operation apparatus indicated by the motion/orientation data, thereby generating the vibration data for making the temporarily change.

Based on the above, in accordance with the amount of change in the motion of the operation apparatus or the amount of change in the orientation of the operation apparatus, it is possible to impart a vibration of which the amplitude temporarily changes.

Further, in the generation of the vibration data, when the motion/orientation data satisfies the predetermined condition, vibration data for temporarily changing the vibration of the vibrator and thereafter changing back to the vibration indicated by the predetermined vibration data may be generated.

Based on the above, when the motion or the orientation of the operation apparatus that is vibrating satisfies a predetermined condition, a vibration that temporarily changes is imparted to the operation apparatus, and thereafter, it is possible to change back the vibration of the operation apparatus to the previous vibration.

Further, in the generation of the vibration data, the predetermined vibration data may be generated in accordance with an operation on the operation apparatus.

Based on the above, the vibration of the operation apparatus imparted in accordance with a predetermined operation using the operation apparatus can be temporarily changed in accordance with the motion or the orientation of the operation apparatus.

Further, in the generation of the vibration data, the predetermined vibration data may be generated in accordance with the motion/orientation data.

Based on the above, the vibration of the operation apparatus imparted in accordance with the motion or the orientation of the operation apparatus can be temporarily change in accordance with the motion or the orientation of the operation apparatus.

Further, the sensor may be able to detect a plurality of parameters corresponding to the motion or the orientation of the operation apparatus. In the acquisition of the motion/ orientation data, a detection result of the sensor regarding the plurality of parameters may be acquired as the motion/ orientation data. In the generation of the vibration data, the predetermined vibration data may be generated in accordance with a predetermined parameter indicated by the motion/orientation data, and when a parameter different from the predetermined parameter indicated by the motion/ orientation data satisfies the predetermined condition, the vibration data for temporarily changing the vibration of the vibrator may be generated.

Based on the above, the vibration of the operation apparatus imparted in accordance with the motion or the orientation of the operation apparatus can be temporarily changed in accordance with a different parameter based on the motion or the orientation of the operation apparatus.

Further, in accordance with the motion or the orientation of the operation apparatus, the sensor may be able to detect an acceleration and an angular velocity generated in the operation apparatus. In the acquisition of the motion/orientation data, a detection result regarding the acceleration and the angular velocity detected by the sensor may be acquired as the motion/orientation data. In the generation of the vibration data, the predetermined vibration data may be generated in accordance with the acceleration indicated by the motion/orientation data, and when the angular velocity indicated by the motion/orientation data satisfies the predetermined condition, the vibration data for temporarily changing the vibration of the vibrator may be generated.

Based on the above, the vibration of the operation apparatus imparted based on an acceleration generated in accordance with the motion or the orientation of the operation apparatus can be temporarily changed in accordance with an angular velocity generated in accordance with the motion or the orientation of the operation apparatus.

Further, in the performance of the information processing, an object may be caused to move in a virtual world based on the motion/orientation data. The information processing program may further cause the computer to execute displaying on a display screen the virtual world where the object moves. In the movement of the object, when the motion/ orientation data satisfies the predetermined condition while the object is moving in the virtual world, a moving direction of the object may be changed.

Based on the above, it is possible to synchronize a change in the moving direction of an object with a change in the vibration of the operation apparatus.

Further, in the displaying on the display screen, when the moving direction of the object changes in accordance with the fact that the motion/orientation data satisfies the predetermined condition, the object may be displayed on the display screen by providing the object a predetermined effect image corresponding to the change in the moving direction.

Based on the above, it is possible to synchronize an effect image provided in accordance with the moving direction of the object with a change in the vibration of the operation apparatus.

Further, in the generation of the vibration data, the vibration data for temporarily changing the vibration may be generated in accordance with an amount of change in the motion/orientation data.

Based on the above, in accordance with the motion of the operation apparatus or the amount of change in the orientation of the operation apparatus, it is possible to temporarily change the vibration of the operation apparatus.

Further, in the generation of the vibration data, the vibration data for temporarily changing the vibration may be generated in accordance with an amount of change corresponding to a difference between the motion/orientation data previously acquired in the acquisition of the motion/orientation data and the motion/orientation data currently acquired in the acquisition of the motion/orientation data.

Based on the above, in accordance with the motion of the operation apparatus or the amount of change in the orientation of the operation apparatus, it is possible to temporarily change the vibration of the operation apparatus.

Further, in the generation of the vibration data, when the motion/orientation data satisfies the predetermined condition again in the period in which the predetermined vibration data for vibrating the vibrator is output, vibration data for temporarily changing the vibration of the vibrator again and thereafter continuing the vibration of the vibrator may be generated.

Based on the above, when the motion or the orientation of the operation apparatus satisfies a predetermined condition multiple times, it is possible to temporarily change the vibration in each time.

Further, the information processing program may further cause the computer to execute outputting a sound. In the generation of the vibration data, the predetermined vibration data may be generated in relation to the sound output in the output of the sound.

Based on the above, the vibration of the operation apparatus imparted in accordance with a sound can be temporarily changed in accordance with the motion or the orientation of the operation apparatus.

Further, in a second exemplary configuration of the non-transitory computer-readable storage medium having stored therein the information processing program according to the exemplary embodiment, an information processing program is executed by a computer included in an information processing apparatus for performing information processing based on an operation on an operation apparatus including a vibrator, an acceleration sensor, and an angular velocity sensor. The information processing program causes the computer to execute: acquiring, from the operation apparatus, acceleration data based on a detection result of the acceleration sensor and angular velocity data based on a detection result of the angular velocity sensor; when the acceleration data satisfies a predetermined condition, generating predetermined vibration data for vibrating the vibrator; outputting the vibration data to the operation apparatus; and performing predetermined information processing based on at least one of the acceleration data and the angular velocity data. In the generation of the vibration data, when the angular velocity data satisfies a predetermined condition, a parameter of the predetermined vibration data is changed.

Based on the above, the vibration of an operation apparatus imparted based on an acceleration generated in accordance with the motion or the orientation of the operation apparatus can be temporarily changed in accordance with an angular velocity generated in accordance with the motion or the orientation of the operation apparatus.

Further, in a third exemplary configuration of the non-transitory computer-readable storage medium having stored therein the information processing program according to the exemplary embodiment, an information processing program is executed by a computer included in an information processing apparatus for performing information processing based on an operation on an operation apparatus including a vibrator. The information processing program causes the computer to execute: acquiring operation data of an operation on the operation apparatus; causing an object to move in a virtual world; displaying on a display screen the virtual world where the object moves; generating predetermined vibration data for vibrating the vibrator in relation to the movement of the object; and outputting the vibration data to the operation apparatus. In the generation of the vibration data, when the operation data satisfies a predetermined condition during the movement of the object in which the predetermined vibration data for vibrating the vibrator in relation to the movement of the object is output, vibration data for changing the vibration of the vibrator is generated. In the movement of the object, when the operation data satisfies the predetermined condition during the movement of the object, a moving direction of the object in the virtual world is changed.

Based on the above, the vibration of an operation apparatus imparted in relation to the movement of an object displayed on a display screen can be temporarily changed in accordance with a change in the moving direction of the object.

Further, in a fourth exemplary configuration of the non-transitory computer-readable storage medium having stored therein the information processing program according to the exemplary embodiment, an information processing program is executed by a computer included in an information processing apparatus for performing information processing based on an operation on an operation apparatus including a vibrator and an operation unit allowing an analog operation input. The information processing program causes the computer to execute: generating predetermined vibration data for vibrating the vibrator; outputting the vibration data to the operation apparatus; acquiring analog operation data based on a detection result of the operation unit from the operation apparatus; and performing predetermined information processing based on the operation data. In the generation of the vibration data, when the analog operation data satisfies a predetermined condition in a period in which the predetermined vibration data for vibrating the vibrator is output, vibration data for temporarily changing the vibration of the vibrator and thereafter continuing the vibration of the vibrator is generated.

Based on the above, in accordance with an analog operation on an operation apparatus, it is possible to variedly vibrate the operation apparatus.

Further, the exemplary embodiment may be carried out in the forms of an information processing apparatus, an information processing system, and an information processing method.

According to the exemplary embodiment, in accordance with the motion or the orientation of an operation apparatus or an operation on the operation apparatus, it is possible to variedly vibrate the operation apparatus.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 12 is a diagram showing a non-limiting example of the state where the single user uses the information processing system 1 by holding the set of the left controller 3 and the right controller 4 in the separate state;

FIG. 14 is a diagram showing a non-limiting example of a game image displayed in a game played by moving the left controller 3 and the right controller 4;

FIG. 15 is a diagram showing a non-limiting example of the game image displayed in the game played by moving the left controller 3 and the right controller 4;

FIG. 16 is a diagram showing a non-limiting example of the game image displayed in the game played by moving the left controller 3 and the right controller 4;

FIG. 18 is a diagram showing a non-limiting example of an accessory device to which the left controller 3 and the right controller 4 are attachable;

FIG. 19 is a diagram showing a non-limiting example of a data area set in a DRAM 85 of the main body apparatus 2 in the exemplary embodiment;

DETAILED DESCRIPTION OF NON-LIMITING EXAMPLE EMBODIMENTS

Figure 1:
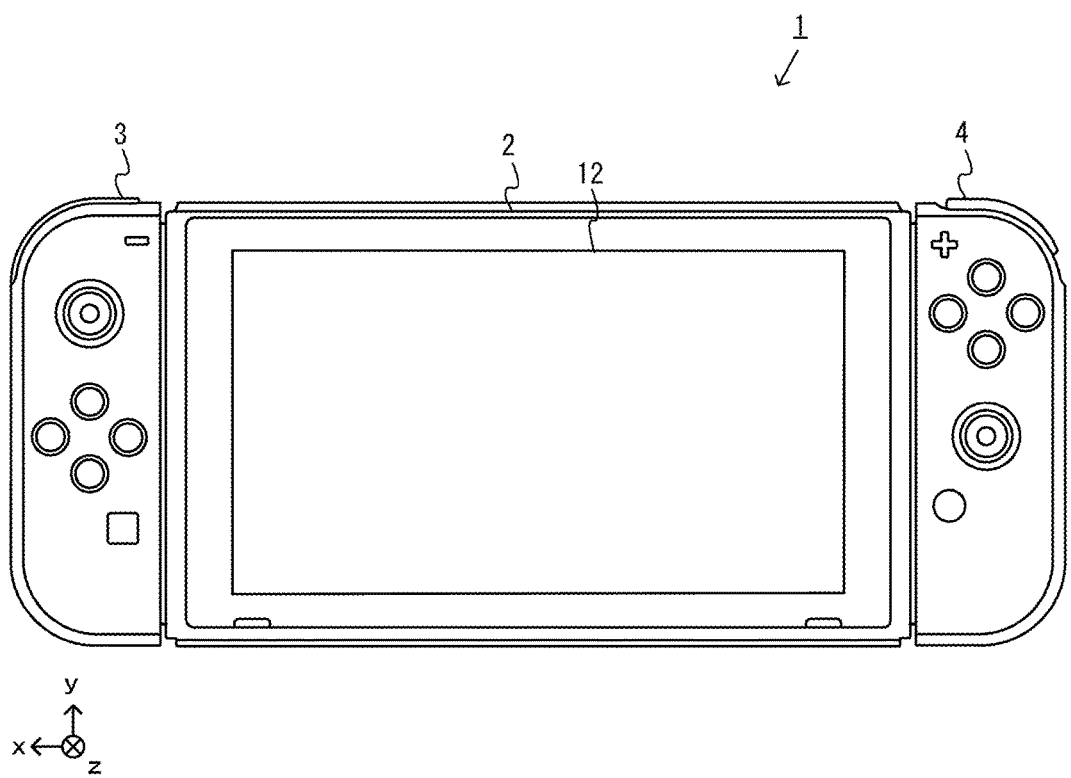
FIG. 1 is a diagram showing a non-limiting example of the state where a left controller 3 and a right controller 4 are attached to a main body apparatus 2 in an example of an information processing system 1 according to an exemplary embodiment.

A description is given below of an information processing program, an information processing apparatus, an information processing system, and an information processing method according to an exemplary embodiment. In the exemplary embodiment, an information processing system 1 includes a main body apparatus (information processing apparatus; which functions as a game apparatus main body in the exemplary embodiment) 2, a left controller 3, and a right controller 4. Further, in another form, the information processing system may further include a cradle 5 (see FIGS. 5 and 7 and the like) in addition to the above configuration. In the information processing system 1 according to the exemplary embodiment, the left controller 3 and the right controller 4 are attachable to and detachable from the main body apparatus 2. The information processing system 1 can be used as a unified apparatus obtained by attaching each of the left controller 3 and the right controller 4 to the main body apparatus 2. Further, the main body apparatus 2, the left controller 3, and the right controller 4 can also be used as separate bodies (see FIG. 2). Further, the information processing system 1 can be used in the form in which an image is displayed on the main body apparatus 2, and in the form in which an image is displayed on another display device such as a television. In the first form, the information processing system 1 can be used as a mobile apparatus (e.g., a mobile game apparatus). Further, in the second form, the information processing system 1 can be used as a stationary apparatus (e.g., a stationary game apparatus).

FIG. 1 is a diagram showing the state where the left controller 3 and the right controller 4 are attached to the main body apparatus 2 in an example of the information processing system 1 according to the exemplary embodiment. As shown in FIG. 1, the information processing system 1 includes the main body apparatus 2, the left controller 3, and the right controller 4. Each of the left controller 3 and the right controller 4 is attached to and unified with the main body apparatus 2. The main body apparatus 2 is an apparatus for performing various processes (e.g., game processing) in the information processing system 1. The main body apparatus 2 includes a display 12. Each of the left controller 3 and the right controller 4 is an apparatus including operation sections with which a user provides inputs.

Figure 2:
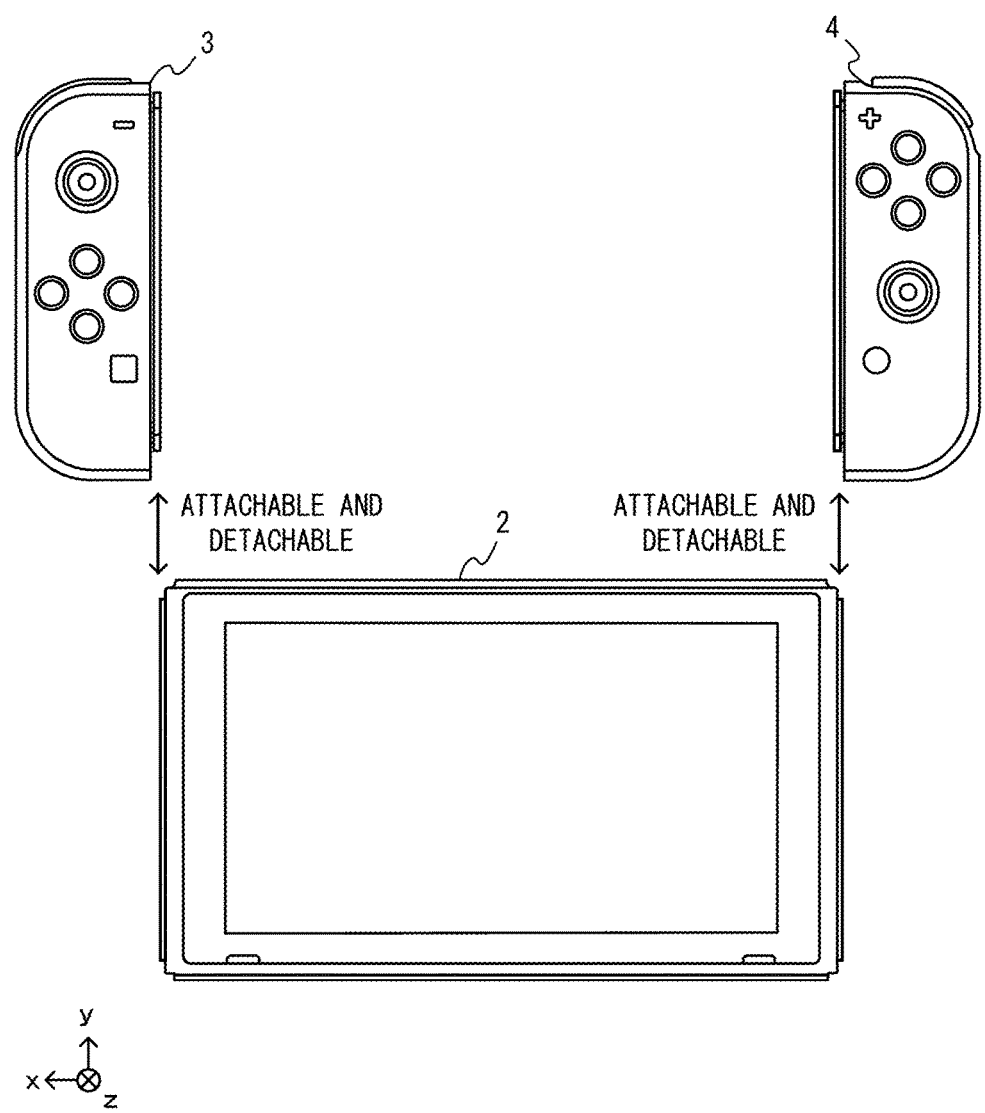
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller". It should be noted that in the exemplary embodiment, an "operation device" operated by a single user may be a single controller (e.g., one of the left controller 3 and the right controller 4) or a plurality of controllers (e.g., both the left controller 3 and the right controller 4, or these controllers and another controller), and the "operation device" can be configured by one or more controllers. A description is given below of examples of the specific configurations of the main body apparatus 2, the left controller 3, and the right controller 4.

Figure 3:
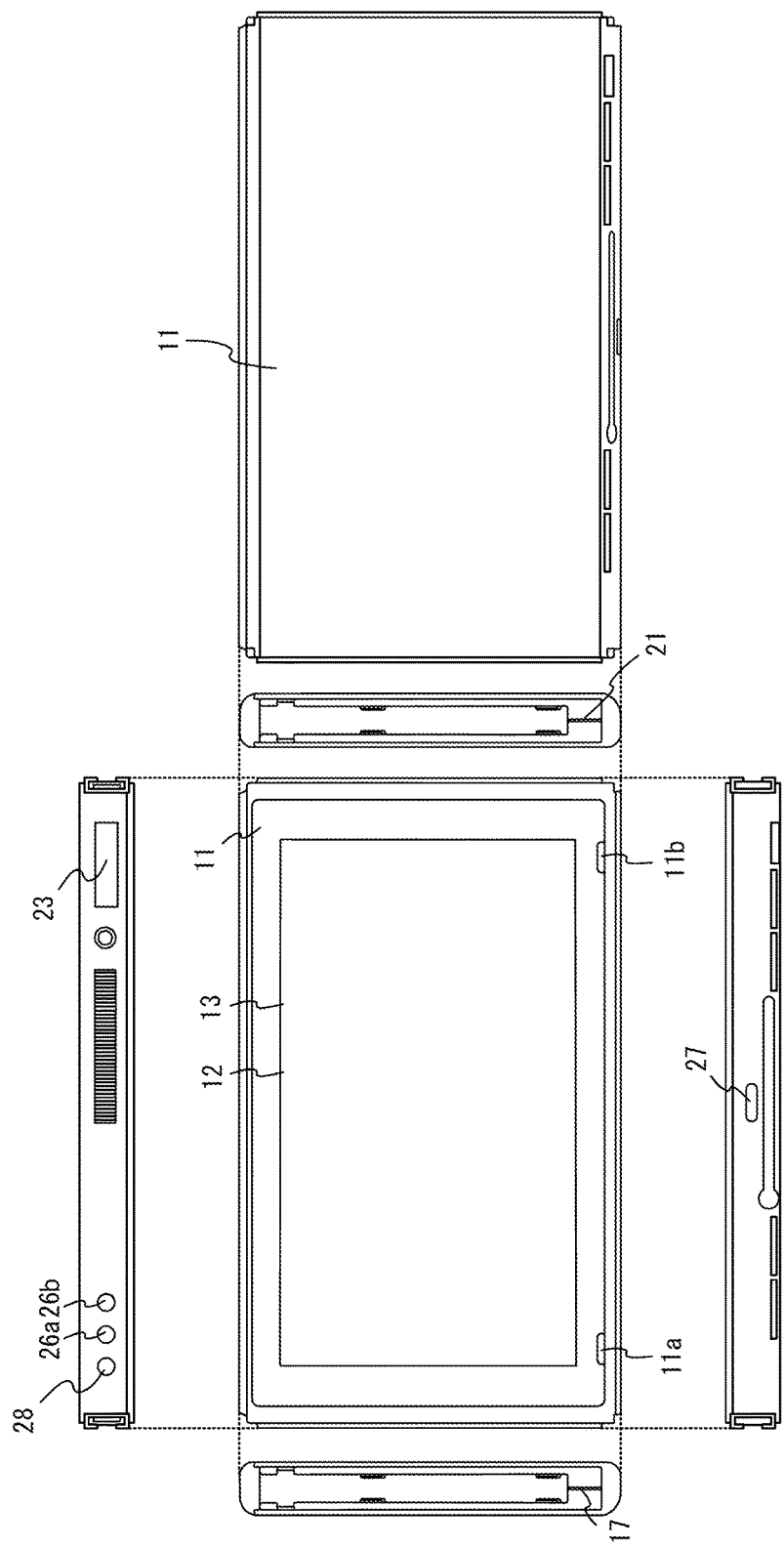
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape. In the exemplary embodiment, the housing 11 has a horizontally long shape. That is, in the exemplary embodiment, the longitudinal direction of the main surface of the housing 11 (i.e., an x-axis direction shown in FIG. 1) is referred to as a "horizontal direction" (also as a "left-right direction"), the short direction of the main surface (i.e., a y-axis direction shown in FIG. 1) is referred to as a "vertical direction" (also as an "up-down direction"), and a direction perpendicular to the main surface (i.e., a z-axis direction shown in FIG. 1) is referred to as a depth direction (also as a "front-back direction"). The main body apparatus 2 can be used in the orientation in which the main body apparatus 2 is horizontally long. Further, the main body apparatus 2 can also be used in the orientation in which the main body apparatus 2 is vertically long. In this case, the housing 11 may be considered as having a vertically long shape.

It should be noted that the housing 11 are optional. As an example, the housing 11 may have a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image (a still image or a moving image) acquired or generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 8) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17 for the main body apparatus 2 to perform wired communication with the left controller 3, and a right terminal 21 for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the information processing system 1 and an information processing apparatus of the same type as the information processing system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28 and sound volume buttons 26a and 26b.

The main body apparatus 2 includes a lower terminal 27. The lower terminal 27 is a terminal for the main body apparatus 2 to communicate with the cradle 5, which will be described later. In the exemplary embodiment, the lower terminal 27 is a USB connector (more specifically, a female connector).

Figure 4:
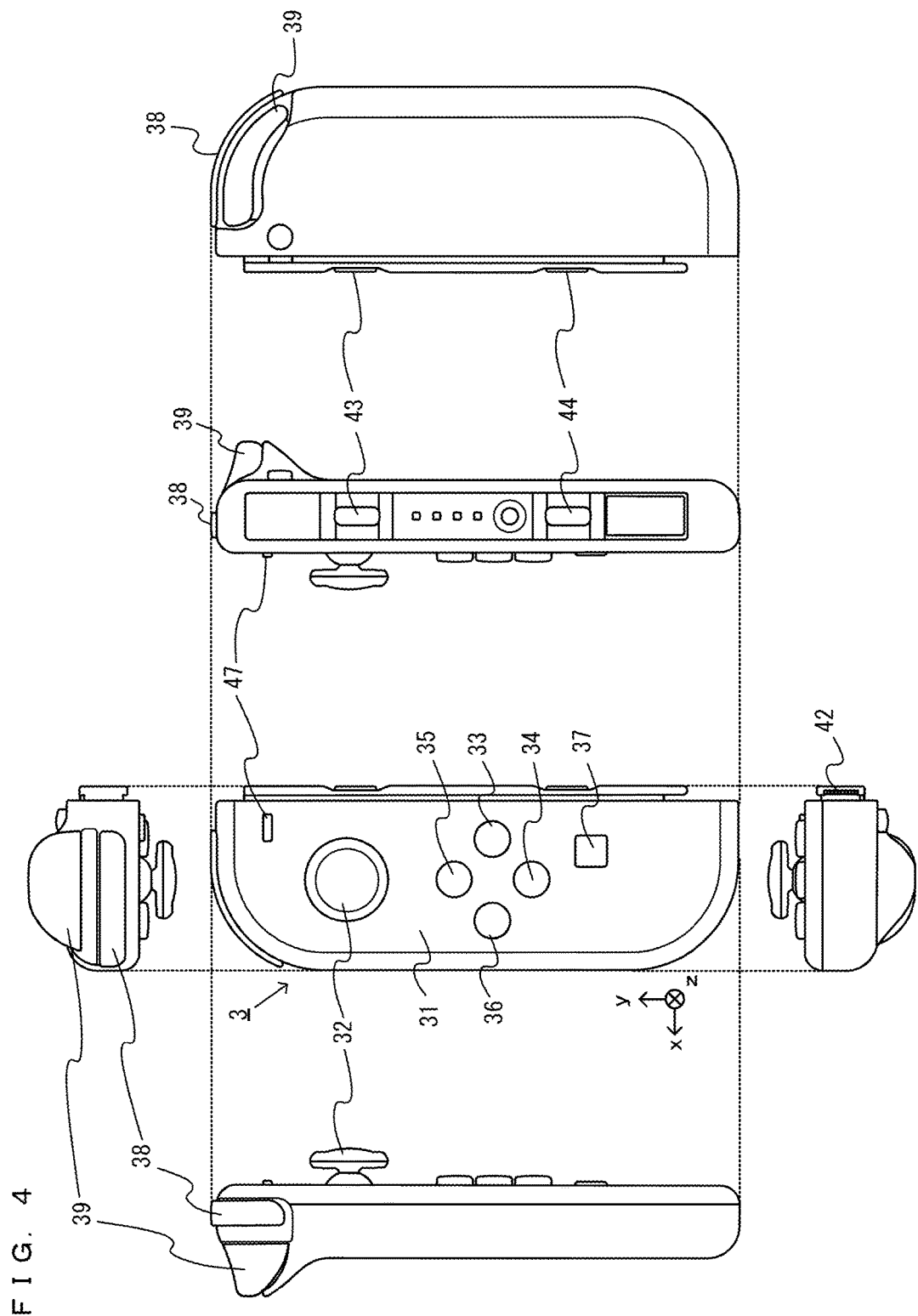
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 is approximately plate-shaped. In the exemplary embodiment, the housing 31 has a vertically long shape, i.e., is shaped to be long in the up-down direction (i.e., the y-axis direction shown in FIG. 1). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. First, the left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
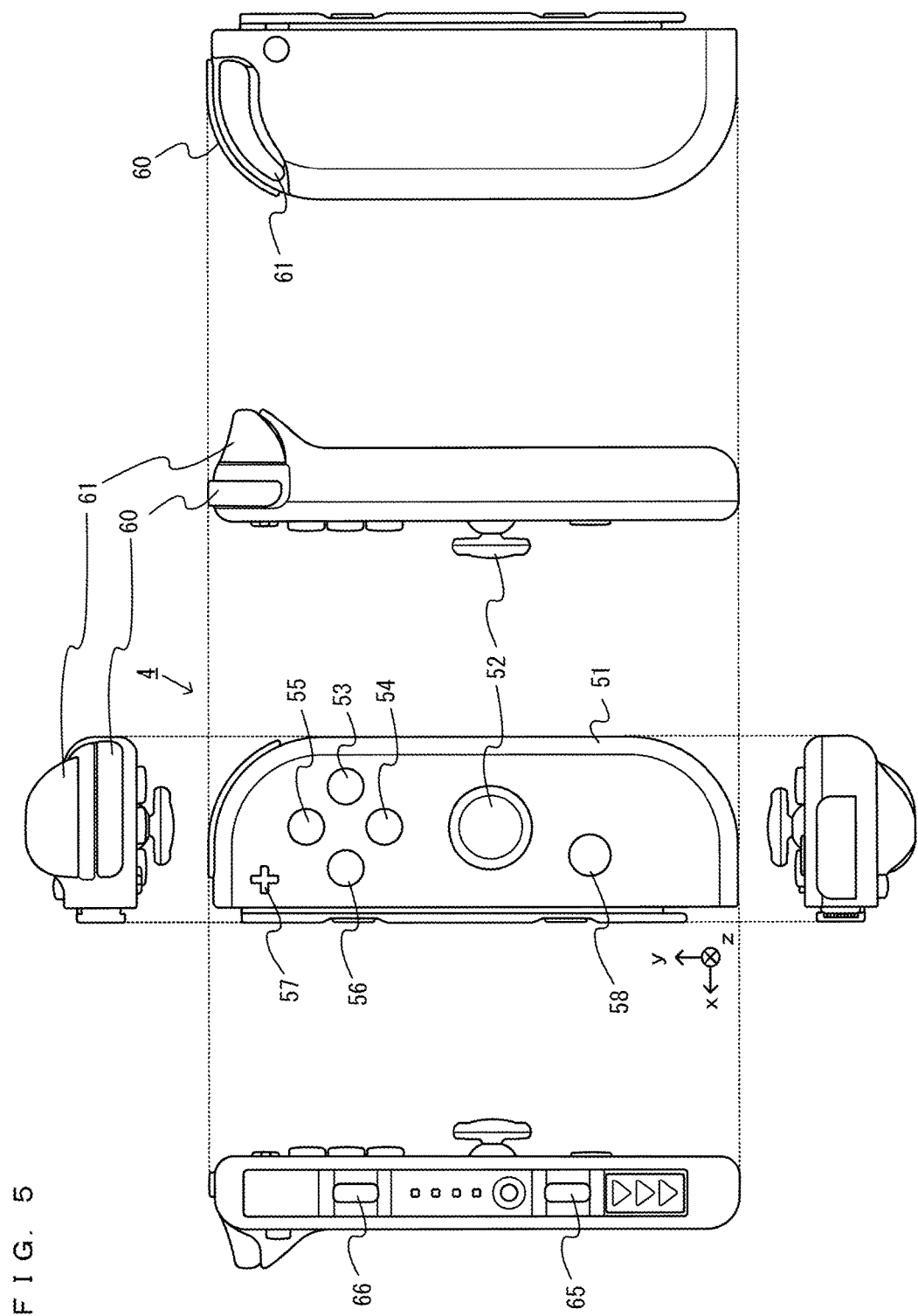
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
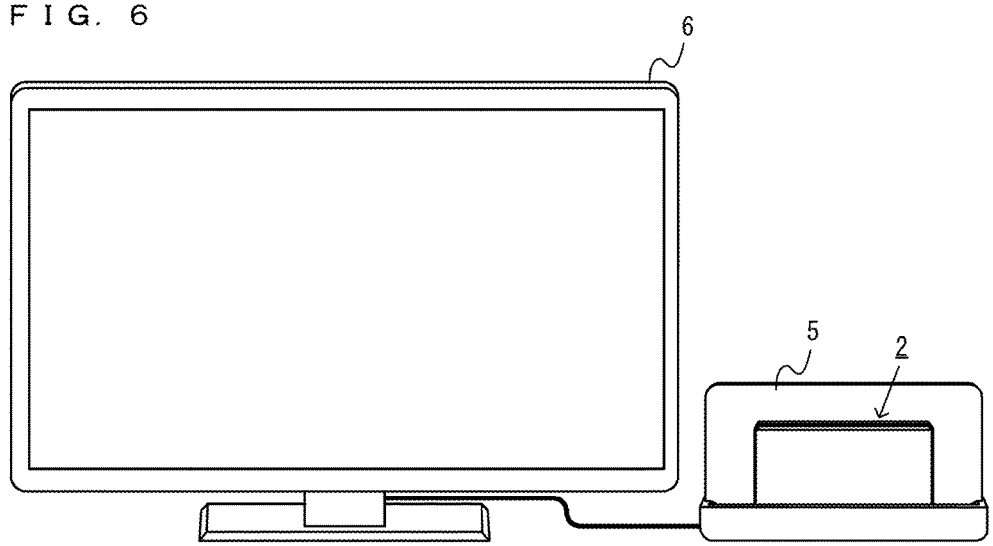
FIG. 6 is a diagram showing the overall configuration of another non-limiting example of the information processing system according to the exemplary embodiment.

FIG. 6 is a diagram showing the overall configuration of another example of the information processing system according to the exemplary embodiment. As shown in FIG. 6, as an example, the unified apparatus obtained by attaching the left controller 3 and the right controller 4 to the main body apparatus 2 can be mounted on the cradle 5. Further, as yet another example, only the main body apparatus 2 can also be mounted on the cradle 5 in the state where the left controller 3 and the right controller 4 are detached from the main body apparatus 2. Further, the cradle 5 can communicate (through wired communication or wireless communication) with a stationary monitor 6 (e.g., a stationary television), which is an example of an external display device separate from the display 12. Although the details will be described later, when the unified apparatus or the main body apparatus 2 alone is mounted on the cradle 5, the information processing system can display on the stationary monitor 6 an image acquired or generated by the main body apparatus 2. Further, in the exemplary embodiment, the cradle 5 has the function of charging the unified apparatus or the main body apparatus 2 alone mounted on the cradle 5. Further, the cradle 5 has the function of a hub device (specifically, a USB hub).

Figure 7:
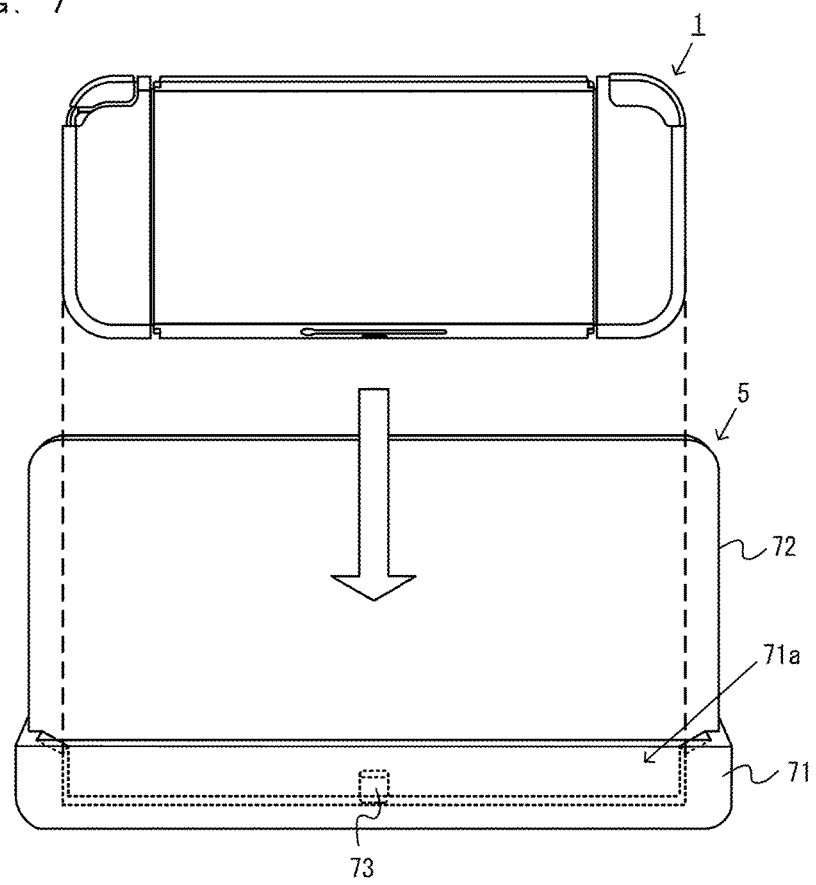
FIG. 7 is a diagram showing a non-limiting example of the external configuration of a cradle 5.

FIG. 7 is a diagram showing an example of the external configuration of the cradle 5. The cradle 5 includes a housing on which the unified apparatus or the main body apparatus 2 alone can be detachably mounted (or attached). In the exemplary embodiment, as shown in FIG. 7, the housing includes a first supporting portion 71, in which a groove 71a is formed, and an approximately planar second supporting portion 72.

As shown in FIG. 7, the groove 71a formed in the first supporting portion 71 has a shape corresponding to the shape of a lower portion of the unified apparatus. Specifically, the groove 71a is so shaped as to allow the lower portion of the unified apparatus to be inserted into the groove 71a, and more specifically, is so shaped as to approximately coincide with the lower portion of the main body apparatus 2. Thus, the lower portion of the unified apparatus is inserted into the groove 71a, whereby it is possible to mount the unified apparatus on the cradle 5. Further, the second supporting portion 72 supports a front surface of the unified apparatus (i.e., the surface on which the display 12 is provided) of which the lower portion is inserted into the groove 71a. With the second supporting portion 72, the cradle 5 can support the unified apparatus more stably. It should be noted that the shape of the housing shown in FIG. 7 is merely illustrative. In another exemplary embodiment, the housing of the cradle 5 may have any shape that allows the main body apparatus 2 to be mounted on the housing.

As shown in FIG. 7, further, the cradle 5 includes a main body terminal 73 for the cradle 5 to communicate with the unified apparatus. As shown in FIG. 7, the main body terminal 73 is provided on a bottom surface of the groove 71a, which is formed in the first supporting portion 71. More specifically, the main body terminal 73 is provided at the position where the lower terminal 27 of the main body apparatus 2 comes into contact with the main body terminal 73 when the unified apparatus is attached to the cradle 5. In the exemplary embodiment, the main body terminal 73 is a USB connector (more specifically, a male connector).

Figure 10:
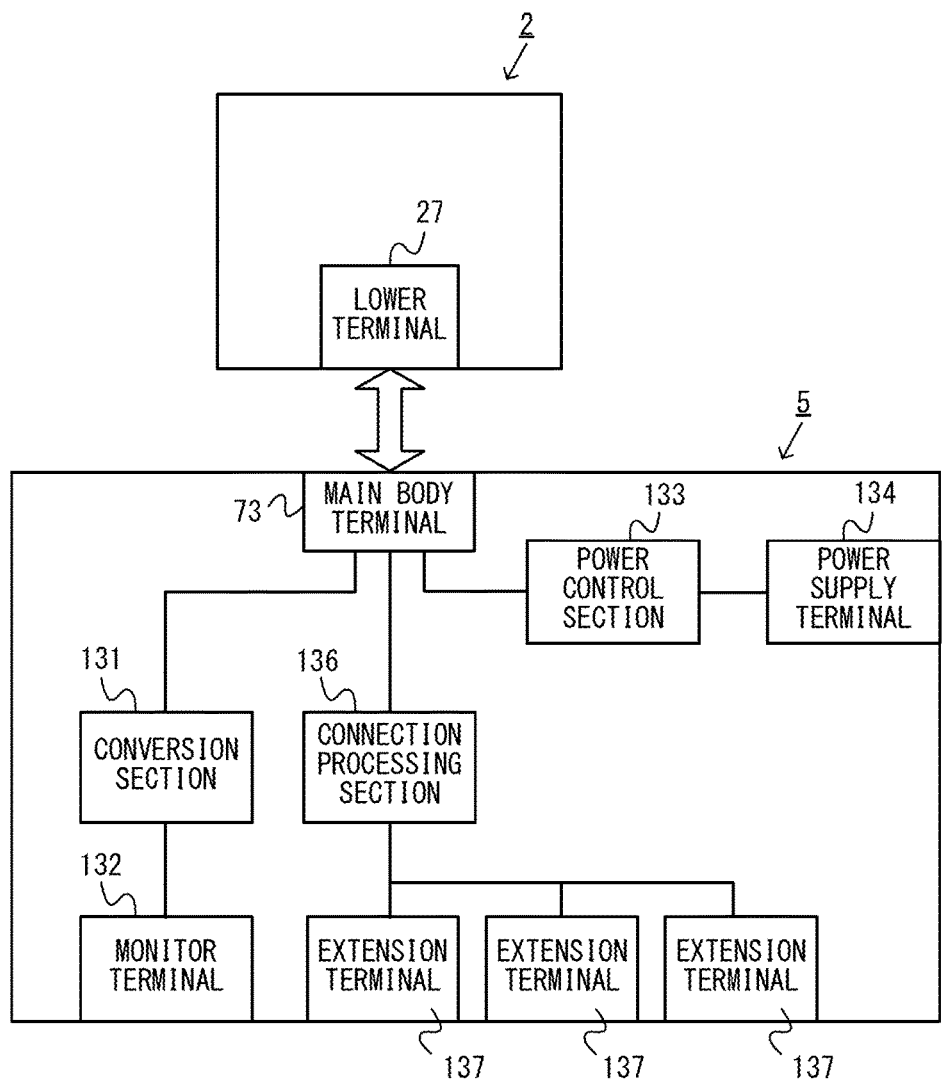
FIG. 10 is a block diagram showing a non-limiting example of the internal configuration of the cradle 5.

Although not shown in FIG. 7, the cradle 5 includes a terminal (includes a plurality of terminals, specifically, a monitor terminal 132, a power supply terminal 134, and extension terminals 137, which are shown in FIG. 10 in the exemplary embodiment) on a back surface of the housing. The details of these terminals will be described later.

Figure 8:
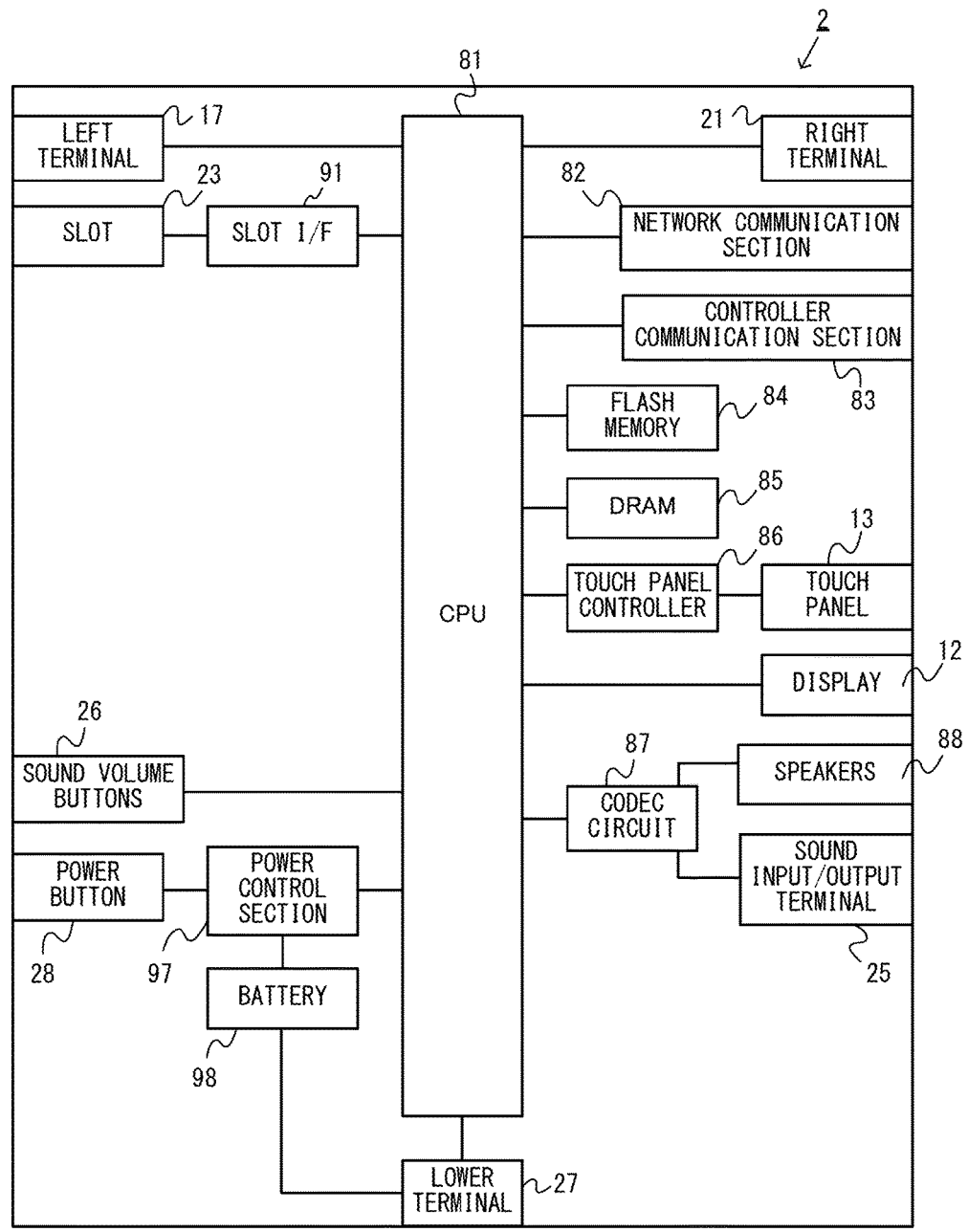
FIG. 8 is a block diagram showing a non-limiting example of the internal configuration of the main body apparatus 2.

FIG. 8 is a block diagram showing an example of the internal configuration of the main body apparatus 2. The main body apparatus 2 includes components 81 to 98 shown in FIG. 8 in addition to the components shown in FIG. 3. Some of the components 81 to 98 may be mounted as electronic components on an electronic circuit board and accommodated in the housing 11.

The main body apparatus 2 includes a CPU (Central Processing Unit) 81. The CPU 81 is an information processing section for executing various types of information processing to be executed by the main body apparatus 2. The CPU 81 executes an information processing program (e.g., a game program) stored in a storage section (specifically, an internal storage medium such as a flash memory 84, an external storage medium attached to the slot 23 or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the CPU 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the CPU 81. The slot I/F 91 is connected to the slot 23, and in accordance with an instruction from the CPU 81, reads and writes data from and to the predetermined type of storage medium (e.g., a dedicated memory card) attached to the slot 23.

The CPU 81 appropriately reads and writes data from and to the flash memory 84, the DRAM 85, and each of the above storage media, thereby performing the above information processing.

The main body apparatus 2 includes a network communication section 82. The network communication section 82 is connected to the CPU 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the CPU 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The CPU 81 is connected to the left terminal 17, the right terminal 21, and the lower terminal 27. When performing wired communication with the left controller 3, the CPU 81 transmits data to the left controller 3 via the left terminal 17 and also receives operation data from the left controller 3 via the left terminal 17. Further, when performing wired communication with the right controller 4, the CPU 81 transmits data to the right controller 4 via the right terminal 21 and also receives operation data from the right controller 4 via the right terminal 21. Further, when communicating with the cradle 5, the CPU 81 transmits data to the cradle 5 via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle 5, the main body apparatus 2 can output data (e.g., image data or sound data) to the stationary monitor 6 via the cradle 5.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, the user can provide inputs to the main body apparatus 2 using a plurality of left controllers 3 and a plurality of right controllers 4.

The main body apparatus 2 includes a touch panel controller 86, which is a circuit for controlling the touch panel 13. The touch panel controller 86 is connected between the touch panel 13 and the CPU 81. Based on a signal from the touch panel 13, the touch panel controller 86 generates, for example, data indicating the position where a touch input is provided. Then, the touch panel controller 86 outputs the data to the CPU 81.

Further, the display 12 is connected to the CPU 81. The CPU 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the CPU 81. The codec circuit 87 is a circuit for controlling the input and output of sound data to and from the speakers 88 and the sound input/output terminal 25. That is, if receiving sound data from the CPU 81, the codec circuit 87 outputs sound signals obtained by performing D/A conversion on the sound data to the speakers 88 or the sound input/output terminal 25. Consequently, sounds are output from the speakers 88 or a sound output section (e.g., earphones) connected to the sound input/output terminal 25. Further, if receiving a sound signal from the sound input/output terminal 25, the codec circuit 87 performs A/D conversion on the sound signal and outputs sound data in a predetermined format to the CPU 81. Further, the sound volume buttons 26 are connected to the CPU 81. Based on an input to the sound volume buttons 26, the CPU 81 controls the volume of sounds output from the speakers 88 or the sound output section.

The main body apparatus 2 includes a power control section 97 and a battery 98. The power control section 97 is connected to the battery 98 and the CPU 81. Further, although not shown in FIG. 8, the power control section 97 is connected to components of the main body apparatus 2 (specifically, components that receive power supplied from the battery 98, the left terminal 17, and the right terminal 21). Based on a command from the CPU 81, the power control section 97 controls the supply of power from the battery 98 to the above components.

Further, the battery 98 is connected to the lower terminal 27. When an external charging device (e.g., the cradle 5) is connected to the lower terminal 27, and power is supplied to the main body apparatus 2 via the lower terminal 27, the battery 98 is charged with the supplied power.

Figure 9:
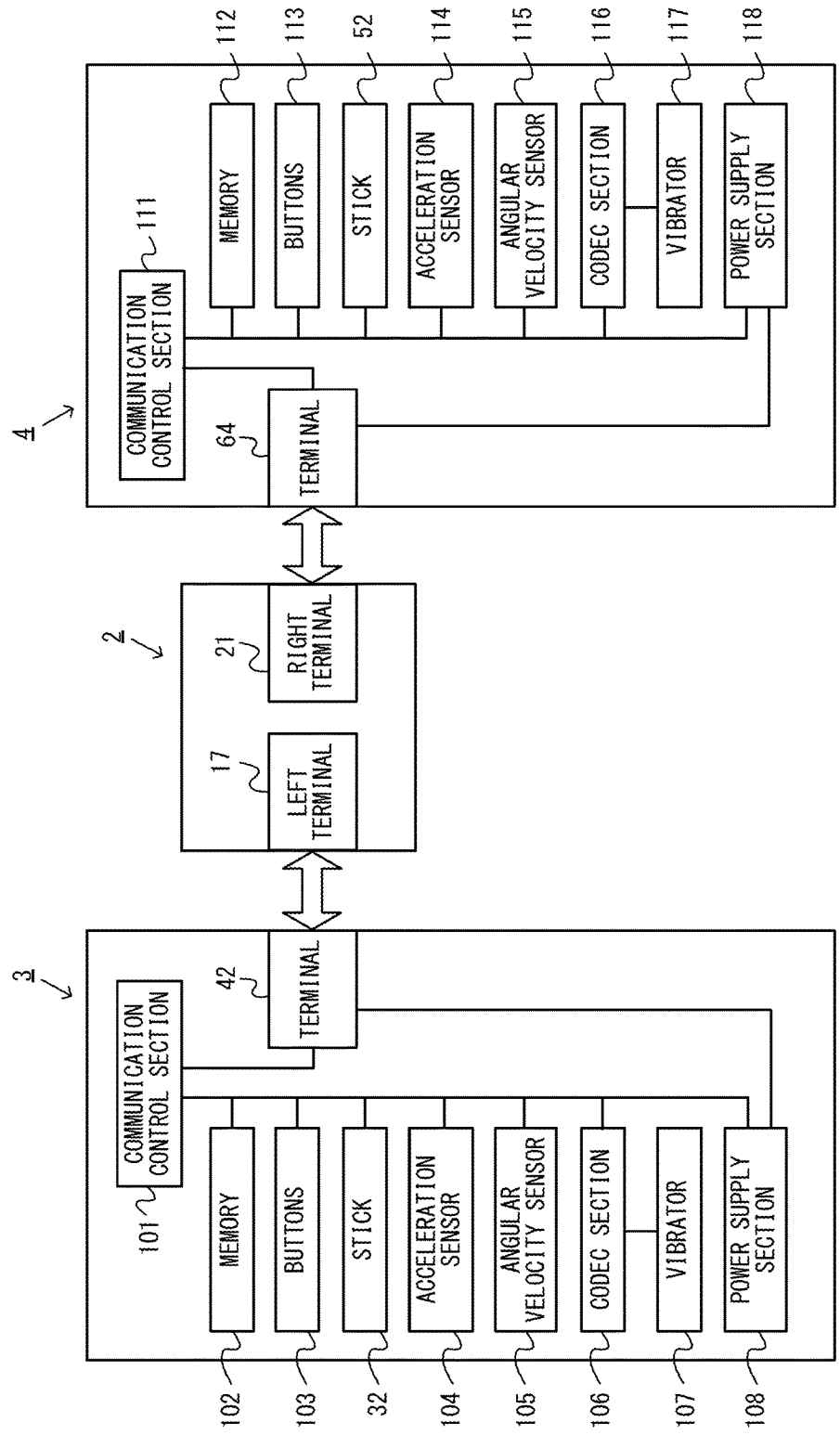
FIG. 9 is a block diagram showing a non-limiting example of the internal configuration of the information processing system 1.

FIG. 9 is a block diagram showing an example of the internal configuration of the information processing system 1. It should be noted that the details of the internal configuration of the main body apparatus 2 in the information processing system 1 are shown in FIG. 8 and therefore are omitted in FIG. 9.

The left controller 3 includes a communication control section 101, which communicates with the main body apparatus 2. As shown in FIG. 9, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, and 44). Further, the left controller 3 includes the analog stick ("stick" in FIG. 9) 32. Each of the buttons 103 and the analog stick 32 outputs information regarding an operation performed on itself to the communication control section 101 repeatedly at appropriate timing.

The left controller 3 includes an acceleration sensor 104. In the exemplary embodiment, the acceleration sensor 104 detects the magnitudes of linear accelerations along predetermined three axial (e.g., XYZ axes shown in FIG. 11) directions. It should be noted that the acceleration sensor 104 may detect an acceleration along one axial direction or accelerations along two axial directions. Further, the left controller 3 includes an angular velocity sensor 105. In the exemplary embodiment, the angular velocity sensor 105 detects angular velocities about predetermined three axes (e.g., the XYZ axes shown in FIG. 11). It should be noted that the angular velocity sensor 105 may detect an angular velocity about one axis or angular velocities about two axes. Each of the acceleration sensor 104 and the angular velocity sensor 105 is connected to the communication control section 101. Then, the detection results by the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec 106. If receiving the above command, the communication control section 101 outputs a control signal corresponding to the command to the codec 106. The codec 106 generates a driving signal for driving the vibrator 107 by amplifying the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, information indicating the waveform itself may be transmitted. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 9, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections (specifically, buttons 113, the analog stick 52, an acceleration sensor 114, and an angular velocity sensor 115) of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec 116. The vibrator 117 and the codec 116 operate similarly to the vibrator 107 and the codec 106, respectively, of the left controller 3. That is, in accordance with a command from the main body apparatus 2, the communication control section 111 causes the vibrator 117 to operate, using the codec 116.

The right controller 4 includes a power supply section 118. The power supply section 118 has a function similar to that of the power supply section 108 of the left controller 3 and operates similarly to the power supply section 108.

FIG. 10 is a block diagram showing an example of the internal configuration of the cradle 5. It should be noted that the details of the internal configuration of the main body apparatus 2 are shown in FIG. 8 and therefore are omitted in FIG. 10.

As shown in FIG. 10, the cradle 5 includes a conversion section 131 and a monitor terminal 132. The conversion section 131 is connected to the main body terminal 73 and the monitor terminal 132. The conversion section 131 converts the formats of signals of an image (or video) and a sound received from the main body apparatus 2 into formats in which the image and the sound are output to the stationary monitor 6. Here, in the exemplary embodiment, the main body apparatus 2 outputs signals of an image and a sound as display port signals (i.e., signals compliant with the DisplayPort standard) to the cradle 5. Further, in the exemplary embodiment, as the communication between the cradle 5 and the stationary monitor 6, communication based on the HDMI (registered trademark) standard is used. That is, the monitor terminal 132 is an HDMI terminal, and the cradle 5 and the stationary monitor 6 are connected together by an HDMI cable. Then, the conversion section 131 converts the display port signals (specifically, the signals representing the video and the sound) received from the main body apparatus 2 via the main body terminal 73 into HDMI signals. The converted HDMI signals are output to the stationary monitor 6 via the monitor terminal 132.

The cradle 5 includes a power control section 133 and a power supply terminal 134. The power supply terminal 134 is a terminal for connecting a charging device (e.g., an AC adapter or the like) (not shown). In the exemplary embodiment, an AC adapter is connected to the power supply terminal 134, and mains electricity is supplied to the cradle 5. When the main body apparatus 2 is attached to the cradle 5, the power control section 133 supplies power from the power supply terminal 134 to the main body apparatus 2 via the main body terminal 73. Consequently, the battery 98 of the main body apparatus 2 is charged.

Further, the cradle 5 includes a connection processing section 136 and extension terminals 137. Each of the extension terminals 137 is a terminal for connecting to another apparatus. In the exemplary embodiment, the cradle 5 includes a plurality of (more specifically, three) USB terminals as the extension terminals 137. The connection processing section 136 is connected to the main body terminal 73 and the extension terminals 137. The connection processing section 136 has a function as a USB hub and for example, manages the communication between an apparatus connected to each of the extension terminals 137 and the main body apparatus 2 connected to the main body terminal 73 (i.e., transmits a signal from a certain apparatus to another apparatus by appropriately distributing the signal). As described above, in the exemplary embodiment, the information processing system 1 can communicate with another apparatus via the cradle 5. It should be noted that the connection processing section 136 may be able to change the communication speed, or supply power to the apparatus connected to the extension terminal 137.

As describe above, in the information processing system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle 5 and thereby can output an image (and a sound) to the stationary monitor 6. A description is given below using the information processing system in use forms in which an image (and a sound) is output to the stationary monitor 6 by attaching the main body apparatus 2 alone to the cradle 5 in the state where the left controller 3 and the right controller 4 are detached from the main body apparatus 2.

As described above, in the exemplary embodiment, the information processing system 1 can also be used in the state where the left controller 3 and the right controller 4 are detached from the main body apparatus 2 (referred to as a "separate state"). As a form in a case where an operation is performed on the same application (e.g., a game application) using the information processing system 1 in the separate state, a form in which a single user uses both the left controller 3 and the right controller 4 is possible. It should be noted that when a plurality of users perform operations using the same application in this use form, a form is possible in which a plurality of sets of the left controller 3 and the right controller 4 are prepared, and each user uses one of the plurality of sets.

Figure 11:
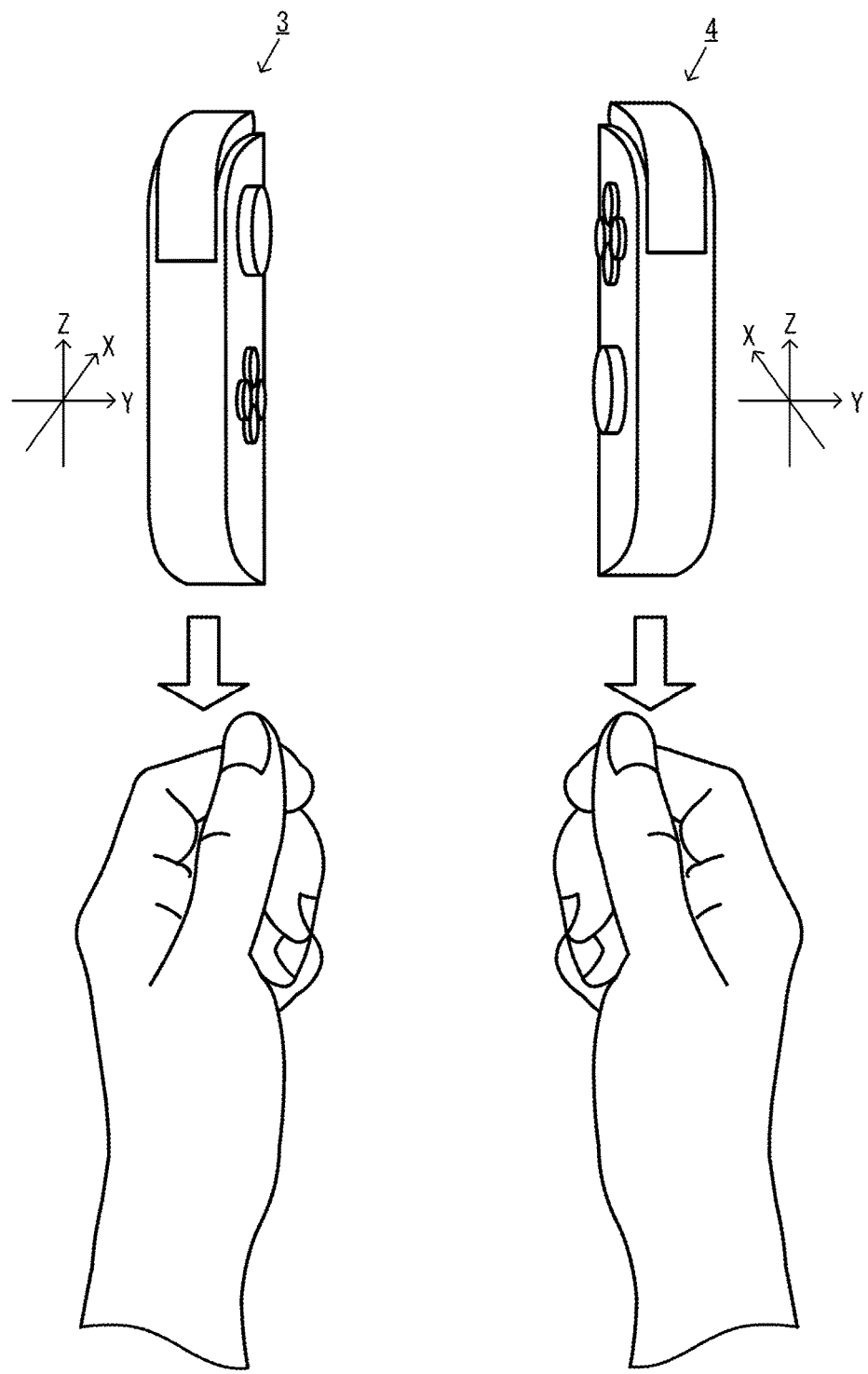
FIG. 11 is a diagram showing a non-limiting example of the state where a single user uses the information processing system 1 by holding a set of the left controller 3 and the right controller 4 in a separate state.
Figure 13:
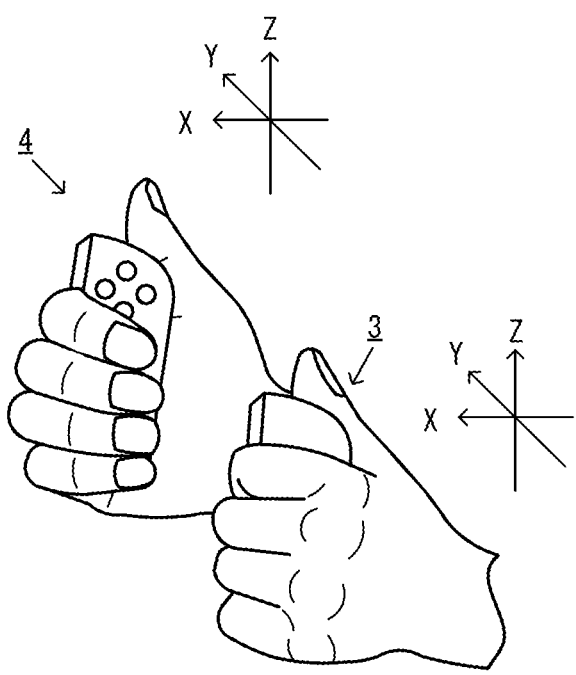
FIG. 13 is a diagram showing a non-limiting example of the state where a single user uses the information processing system 1 by holding the set of the left controller 3 and the right controller 4 in the separate state.

FIGS. 11 to 13 are diagrams showing an example of the state where a single user uses the information processing system 1 by holding a set of the left controller 3 and the right controller 4 in the separate state. As shown in FIGS. 11 to 13, in the separate state, the user can view an image displayed on the stationary monitor 6 while operating the left controller 3 and the right controller 4 by holding the left controller 3 with their left hand and the right controller 4 with their right hand.

For example, in the exemplary embodiment, the user holds the left controller 3 with their left hand such that the down direction of the longitudinal direction of the left controller 3 (the down direction (the negative y-axis direction) shown in FIG. 1), which is vertically long and approximately plate-shaped, is the vertical direction, also the side surface that is in contact with the main body apparatus 2 when the left controller 3 is attached to the main body apparatus 2 is directed forward, and also the main surface of the left controller 3 (the surface on which the analog stick 32 is provided) is directed to the right. Further, the user holds the right controller 4 with their right hand such that the down direction of the longitudinal direction of the right controller 4 (the down direction (the negative y-axis direction) shown in FIG. 1), which is vertically long and approximately plate-shaped, is the vertical direction, also the side surface that is in contact with the main body apparatus 2 when the right controller 4 is attached to the main body apparatus 2 is directed forward, and also the main surface of the right controller 4 (the surface on which the analog stick 52 is provided) is directed to the left. In the state where the left controller 3 is held with the left hand, and the right controller 4 is held with the right hand (hereinafter, the orientations of the left controller 3 and the right controller 4 held in these directions will occasionally be referred to as "basic orientations"), each controller is moved in up, down, left, right, front, and back directions, rotated, or swung, whereby game play is performed in accordance with the motion or the orientation of the controller.

It should be noted that to facilitate the understanding of the directions of accelerations and angular velocities generated in the left controller 3, a front direction in the above holding state (the direction from a round side surface to the side surface in contact with the main body apparatus 2, and the negative x-axis direction shown in FIG. 1) is defined as a positive X-axis direction. A right direction in the above holding state (the direction from a back surface to the main surface, and the negative z-axis direction shown in FIG. 1) is defined as a positive Y-axis direction. An up direction in the above holding state (the direction toward the up direction of the longitudinal direction, and the positive y-axis direction shown in FIG. 1) is defined as a positive Z-axis direction. Then, the acceleration sensor 104 of the left controller 3 can detect accelerations in the XYZ-axis directions, and the angular velocity sensor 105 can detect angular velocities about the XYZ-axis directions. Further, to facilitate the understanding of the directions of accelerations and angular velocities generated in the right controller 4, a front direction in the above holding state (the direction from a round side surface to the side surface in contact with the main body apparatus 2, and the positive x-axis direction shown in FIG. 1) is defined as a positive X-axis direction. A right direction in the above holding state (the direction from the main surface to a back surface, and the positive z-axis direction shown in FIG. 1) is defined as a positive Y-axis direction. An up direction in the above holding state (the direction toward the up direction of the longitudinal direction, and the positive y-axis direction shown in FIG. 1) is defined as a positive Z-axis direction. Then, the acceleration sensor 114 of the right controller 4 can detect accelerations in the XYZ-axis directions, and the angular velocity sensor 115 can detect angular velocities about the XYZ-axis directions.

Next, FIGS. 14 to 17 are diagrams showing examples of a game image displayed in a game played by moving the left controller 3 and the right controller 4. As shown in FIG. 14, in this exemplary game, an image of a game (e.g., a boxing game) in which a player object PO and an enemy object EO compete against each other is displayed on the stationary monitor 6. Then, the user operating the left controller 3 and the right controller 4 can operate the player object PO by swinging the main body of the left controller 3 and/or the main body of the right controller 4, or changing the orientations of the main body of the left controller 3 and/or the main body of the right controller 4. For example, the user swings the left controller 3 and thereby can control the action of a first object G1, which represents a left glove (a left first) of the player object PO. The user swings the right controller 4 and thereby can control the action of a second object G2, which represents a right glove (a right first) of the player object PO. Specifically, when the user performs the operation of swinging so as to throw a left punch using the left hand holding the left controller 3, the first object G1, which represents the left glove of the player object PO, moves toward the place where the enemy object EO is placed. Further, when the user performs the operation of swinging so as to throw a right punch using the right hand holding the right controller 4, the second object G2, which represents the right glove of the player object PO, moves toward the place where the enemy object EO is placed.

For example, when the right controller 4 is swung so as to be pushed forward (in the positive X-axis direction of the right controller 4) in the state where neither of the left controller 3 and the right controller 4 moves (the state shown in FIG. 14), then as shown in FIG. 15, the second object G2 of the player object PO moves toward the enemy object EO in accordance with the motion of the right controller 4 in the state where an effect image Ie1 is provided. Consequently, a game image is displayed such that the player object PO throws a right punch at the enemy object EO.

Here, the moving direction of the first object G1 starting moving is set by the orientation of the left controller 3 when the left controller 3 is swung so as to be pushed forward. Further, the moving direction of the second object G2 starting moving is set by the orientation of the right controller 4 when the right controller 4 is moved so as to be pushed forward. For example, when the right controller 4 moves in the positive X-axis direction as shown in FIG. 15, a moving direction D1 of the second object G2 is set in accordance with the orientation in a roll direction of the right controller 4 in this movement. As an example, in the exemplary embodiment, in the period in which the right controller 4 moves, the tilt in the Y-axis direction of the right controller 4 with respect to the direction in which a gravitational acceleration acts in real space is calculated, and the moving direction D1 of the second object G2 is calculated based on the tilt in the Y-axis direction. Specifically, when the tilt in the Y-axis direction indicates that the right controller 4 is in the orientation in which the right controller 4 roll-rotates in the right direction with respect to the above reference orientation, the second object G2 moves in the right direction in a virtual space. Further, when the tilt in the Y-axis direction indicates that the right controller 4 is in the orientation in which the right controller 4 roll-rotates in the left direction with respect to the reference orientation, the second object G2 moves in the left direction in the virtual space. Then, the angle at which the moving direction shifts in the right direction or the left direction is calculated in accordance with the tilt angle in the Y-axis direction.

Further, in this exemplary game, even when the distance between the player object PO and the enemy object EO is relatively long in the virtual space, it is possible to throw a punch. The arms of the player object PO extend, whereby the first object G1 and the second object G2 can move by a relatively long distance. Then, the first object G1 or the second object G2 collides with another object (e.g., the enemy object EO) or moves by a predetermined distance, then finishes the movement, and returns to a movement start position where the first object G1 or the second object G2 starts moving (e.g., a hand portion of the player object PO shown in FIG. 14). The first object G1 and the second object G2 return to the movement start positions and thereby can make a next movement toward the enemy object EO. In other words, it is possible to throw a next punch. Thus, the time from when the first object G1 or the second object G2 starts moving from the movement start position to when the first object G1 or the second object G2 returns to the movement start position again is longer than in a general boxing game.

Further, in this exemplary game, when the first object G1 and/or the second object G2 move in the virtual space, the controllers for operating the objects vibrate. For example, when the first object G1 moves in accordance with the fact that the left controller 3 is swung so as to be pushed forward, the left controller 3 vibrates in accordance with the fact that the first object G1 moves in the virtual space. Further, when the second object G2 moves in accordance with the fact that the right controller 4 is swung so as to be pushed forward, the right controller 4 vibrates in accordance with the fact that the second object G2 moves in the virtual space (the state in FIG. 15). Specifically, when the left controller 3 and/or the right controller 4 are swung so as to be pushed forward, the main body apparatus 2 generates outward vibration data in accordance with the types, the moving velocities, the moving directions, and the like of the first object G1 and/or the second object G2 moving in the virtual space, and transmits the outward vibration data to the left controller 3 and/or the right controller 4. Further, when the first object G1 and/or the second object G2 collide with another object, the main body apparatus 2 generates vibration data indicating vibrations corresponding to the collision and transmits the vibration data to the left controller 3 and/or the right controller 4. Further, when the first object G1 and/or the second object G2 move on homeward paths for returning to the movement start positions, the main body apparatus 2 generates homeward vibration data in accordance with the types, the moving velocities, the moving directions, and the like of the first object G1 and/or the second object G2 moving on the homeward paths and transmits the homeward vibration data to the left controller 3 and/or the right controller 4. Consequently, the left controller 3 and/or the right controller 4 receiving various vibration data vibrate based on the vibration data.

Further, in this exemplary game, even while the first object G1 or the second object G2 is moving using the movement time of the first object G1 or the second object G2 (typically, the period in which the first object G1 or the second object G2 is moving in the direction of the enemy object EO), it is possible to change a trajectory moving in accordance with the orientation or the motion of the left controller 3 or the right controller 4. For example, when the left controller 3 or the right controller 4 rotates in the roll direction or rotates in a yaw direction from the orientation of the left controller 3 or the right controller 4 when the first object G1 or the second object G2 starts moving, the trajectory of the first object G1 or the second object G2 is changed in accordance with the rotation. For example, in the example shown in FIG. 16, after the right controller 4 is swung so as to be pushed forward in the positive X-axis direction, the moving direction of the second object G2 changes to D2 in accordance with the fact that the right controller 4 rotationally moves in the left roll direction (Ox in FIG. 16) during the movement of the second object G2. Further, when the moving direction of the second object G2 changes, an effect image Ie2 is provided for the second object G2.

As an example, in the exemplary embodiment, in the state where the rotational velocity (the angular velocity) about the X-axis of the left controller 3 or the right controller 4 after the first object G1 or the second object G2 starts moving is the rotation in the roll direction, the trajectory of the first object G1 or the second object G2 moving based on this rotational velocity about the X-axis is changed. Specifically, when the rotational velocity of the left controller 3 roll-rotating in the right direction about the X-axis while the first object G1 is moving is obtained, the trajectory of the first object G1 is changed in the right direction in the virtual space. When the rotational velocity of the left controller 3 roll-rotating in the left direction about the X-axis is obtained, the trajectory of the first object G1 is changed in the left direction in the virtual space. Further, when the rotational velocity of the right controller 4 roll-rotating in the right direction about the X-axis while the second object G2 is moving is obtained, the trajectory of the second object G2 is changed in the right direction in the virtual space. When the rotational velocity of the right controller 4 roll-rotating in the left direction about the X-axis is obtained, the trajectory of the second object G2 is changed in the left direction in the virtual space.

As another example, in the exemplary embodiment, in the state where the rotational velocity (the angular velocity) of the left controller 3 or the right controller 4 with respect to the direction of gravity in real space after the first object G1 or the second object G2 starts moving is the rotation in the yaw direction, the trajectory of the first object G1 or the second object G2 moving based on this rotational velocity about the direction of gravity is changed. Specifically, when the rotational velocity of the left controller 3 yaw-rotating in the right direction about the direction of gravity while the first object G1 is moving is obtained, the trajectory of the first object G1 is changed in the right direction in the virtual space. When the rotational velocity of the left controller 3 yaw-rotating in the left direction about the direction of gravity is obtained, the trajectory of the first object G1 is changed in the left direction in the virtual space. Further, when the rotational velocity of the right controller 4 yaw-rotating in the right direction about the direction of gravity while the second object G2 is moving is obtained, the trajectory of the second object G2 is changed in the right direction in the virtual space. When the rotational velocity of the right controller 4 yaw-rotating in the left direction about the direction of gravity is obtained, the trajectory of the second object G2 is changed in the left direction in the virtual space.

As described above, when the trajectories of the first object G1 and/or the second object G2 change, the vibrations of the left controller 3 and/or the right controller 4 also change. For example, when the outward trajectories of the first object G1 and/or the second object G2 change, the main body apparatus 2 calculates change parameters for the amplitudes and/or the frequencies of the vibrations in accordance with changes in the motions or the orientations of the left controller 3 and/or the right controller 4 (e.g., the angular velocities in the roll direction or the yaw direction), temporarily changes the outward vibration data using the change parameters, and then changes back the outward vibration data again. Consequently, receiving the outward vibration data that temporarily changes, the left controller 3 and/or the right controller 4 change the amplitudes and/or the frequencies of the vibrations based on the outward vibration data.

Further, in this exemplary game, using the magnitude of an acceleration generated in the left controller 3 or the right controller 4, it is determined whether or not the left controller 3 or the right controller 4 is swung. Then, when it is determined that the left controller 3 is swung in the positive X-axis direction in the state where the first object G1 is placed at the movement start position (hereinafter referred to as a "first movement-start-allowed state"), the first object G1 starts moving from the movement start position toward the enemy object EO. Further, when it is determined that the right controller 4 is swung in the positive X-axis direction in the state where the second object G2 is placed at the movement start position (hereinafter referred to as a "second movement-start-allowed state"), the second object G2 starts moving from the movement start position toward the enemy object EO. In the exemplary embodiment, however, even when the left controller 3 is not in the first movement-start-allowed state, but when the left controller 3 enters the first movement-start-allowed state within a predetermined time from when it is determined that the left controller 3 is swung in the positive X-axis direction, it is possible to start the movement of the first object G1 from the movement start position toward the enemy object EO in accordance with the operation of swinging the left controller 3. Further, even when the right controller 4 is not in the second movement-start-allowed state, but when the right controller 4 enters the second movement-start-allowed state within a predetermined time from when it is determined that the right controller 4 is swung in the positive X-axis direction, it is possible to start the movement of the second object G2 from the movement start position toward the enemy object EO in accordance with the operation of swinging the right controller 4. As described above, in the exemplary embodiment, even when the left controller 3 and/or the right controller 4 are not in the first movement-start-allowed state and/or the second movement-start-allowed state, the left controller 3 and/or the right controller 4 are swung, whereby it is possible to give an instruction to start the movements of the first object G1 and/or the second object G2. Thus, it is possible to facilitate an operation even in a game where the state where an operation instruction can be given intermittently occurs. That is, as described above, in the exemplary game, the time from when the first object G1 or the second object G2 starts moving from the movement start position to when the first object G1 or the second object G2 returns to the movement start position again is longer than that in a general boxing game. Thus, it is possible that the operation of swinging the left controller 3 or the right controller 4 precedes in the state where the user cannot wait until the first movement-start-allowed state or the second movement-start-allowed state. However, even when such a preceding operation is performed, it is possible to aid the preceding operation without invalidating the preceding operation and make use of the preceding operation for a game operation.

Figure 17:
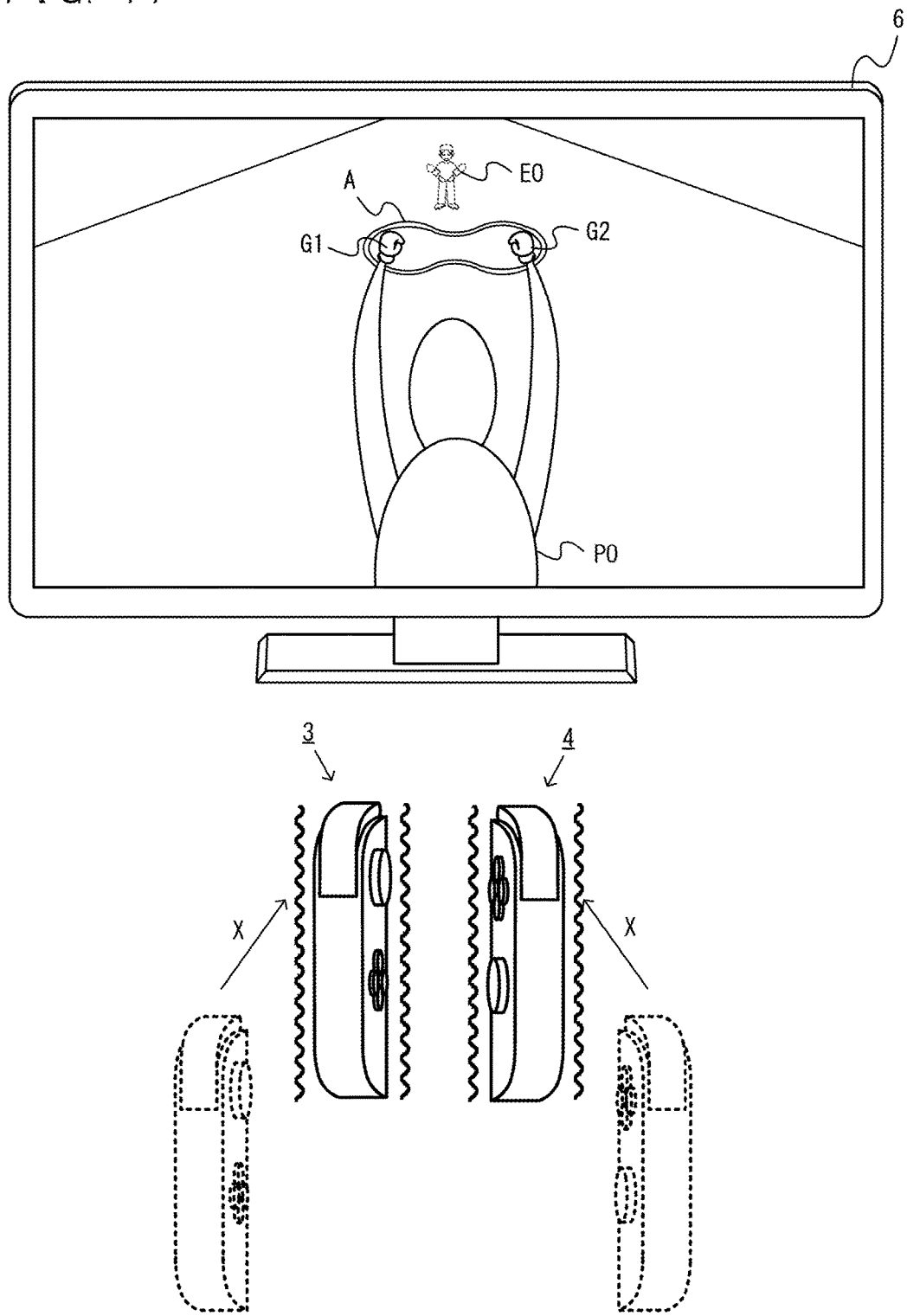
FIG. 17 is a diagram showing a non-limiting example of the game image displayed in the game played by moving the left controller 3 and the right controller 4.

Further, in this exemplary game, as shown in FIG. 17, the first object G1 and the second object G2 are caused to simultaneously start moving from the movement start positions, whereby a predetermined action is performed. For example, when, within a predetermined period from when one of the first object G1 and the second object G2 starts moving, the other starts moving, a "both-hand punch action" is started in which the first object G1 and the second object G2 are a set. Here, in the "both-hand punch action", the state where a collision area A is formed between the first object G1 and the second object G2 moving in the virtual space is represented as a game image, and the first object G1 and the second object G2 move toward the enemy object EO in the state where the collision area A is formed. Then, when the first object G1 or the second object G2 that is moving or the collision area A collides with the enemy object EO, a predetermined action is performed in which damage greater than that in the case where the first object G1 or the second object G2 solely collides with the enemy object EO is imparted to the enemy object EO. As an example, in the "both-hand punch action", when the first object G1, the second object G2, or the collision area A collides with the enemy object EO, the action of throwing the enemy object EO may be performed, or the action of putting the enemy object EO out of action may be performed. It should be noted that even during the execution of the "both-hand punch action", the trajectories of the movements of the first object G1 and/or the second object G2 can be changed in accordance with the orientations or the motions of the left controller 3 and/or the right controller 4. Thus, the trajectories of the movements of the first object G1 and/or the second object G2 are changed, whereby it is possible to also change the range of the collision area A. Thus, it is possible to make a more strategic attack on the enemy object EO.

Even when the first object G1 and the second object G2 move in the state where such an action is performed, the left controller 3 and/or the right controller 4 vibrate in accordance with the movements of the objects. Specifically, when the first object G1 and the second object G2 move by the both-hand punch action, the main body apparatus 2 generates action outward vibration data in accordance with the types, the moving velocities, the moving directions, and the like of the first object G1 and the second object G2 moving in the virtual space and transmits the action outward vibration data to the left controller 3 and the right controller 4. Further, when the collision area A, the first object G1, or the second object G2 collides with another object, the main body apparatus 2 generates vibration data indicating a vibration corresponding to the collision and transmits the vibration data to the left controller 3 and the right controller 4. Further, when the first object G1 and the second object G2 move on the homeward paths for returning to the movement start positions, the main body apparatus 2 generates homeward vibration data in accordance with the types, the moving velocities, the moving directions, and the like of the first object G1 and the second object G2 moving on the homeward paths and transmits the homeward vibration data to the left controller 3 and the right controller 4. Consequently, even when the both-hand punch action is performed, the left controller 3 and the right controller 4 receiving various vibration data vibrate based on the vibration data.

Further, when the trajectories of the first object G1 and the second object G2 change during the execution of the both-hand punch action, the vibrations of the left controller 3 and the right controller 4 also change. For example, when the outward trajectories of the first object G1 and the second object G2 change during the execution of the both-hand punch action, the main body apparatus 2 calculates change parameters for the amplitudes and/or the frequencies of the vibrations in accordance with the changes in the motions or the orientations of the left controller 3 and/or the right controller 4, temporarily changes the action outward vibration data using the change parameters, and then changes back the action outward vibration data again. Consequently, receiving the action outward vibration data that temporarily changes, the left controller 3 and the right controller 4 change the amplitudes and/or the frequencies of the vibrations based on the action outward vibration data.

Further, in this exemplary game, it is possible to move the player object PO in the virtual space in accordance with the motions or the orientations of both the left controller 3 and the right controller 4. For example, when both the left controller 3 and the right controller 4 rotate in a pitch direction or rotate in the roll direction in real space, the player object PO is caused to move in accordance with the tilts of the rotations. Specifically, the tilts in the X-axis direction and the Y-axis direction of the left controller 3 and the tilts in the X-axis direction and the Y-axis direction of the right controller 4 with respect to the direction of gravity in real space are calculated. Then, based on these tilts, when it is determined that both the left controller 3 and the right controller 4 are in the orientations in which the left controller 3 and the right controller 4 are tilted forward, the player object PO is caused to move forward in the virtual space by the amount of movement corresponding to the angles at which both the left controller 3 and the right controller 4 are tilted forward (e.g., the average value of these angles). Further, based on these tilts, when it is determined that both the left controller 3 and the right controller 4 are in the orientations in which the left controller 3 and the right controller 4 are tilted backward, the player object PO is caused to move backward in the virtual space by the amount of movement corresponding to the angles at which both the left controller 3 and the right controller 4 are tilted backward (e.g., the average value of these angles). Further, based on these tilts, when it is determined that both the left controller 3 and the right controller 4 are in the orientations in which the left controller 3 and the right controller 4 are tilted to the left, the player object PO is caused to move to the left in the virtual space by the amount of movement corresponding to the angles at which both the left controller 3 and the right controller 4 are tilted to the left (e.g., the average value of these angles). Further, based on these tilts, when it is determined that both the left controller 3 and the right controller 4 are in the orientation in which the left controller 3 and the right controller 4 are tilted to the right, the player object PO is caused to move to the right in the virtual space by the amount of movement corresponding to the angles at which both the left controller 3 and the right controller 4 are tilted to the right (e.g., the average value of these angles).

Further, in the exemplary embodiment, it is also possible to play the above game using an attachment (an accessory device) for joining the left controller 3 and the right controller 4 to cause the left controller 3 and the right controller 4 to function as a single operation apparatus.

FIG. 18 is a diagram showing an example of an accessory device to which the left controller 3 and the right controller 4 are attachable. As shown in FIG. 18, an extension grip 210, which is an example of the accessory device, is an accessory device used by the user to perform an operation. The left controller 3 is attachable to the extension grip 210, and the right controller 4 is also attachable to the extension grip 210. Thus, with the extension grip 210, the user can perform an operation by holding, in a unified manner, the two controllers 3 and 4 detached from the main body apparatus 2.

The extension grip 210 has mechanisms similar to those of the main body apparatus 2 (specifically, the left rail member 15, the right rail member 19, and the like) as mechanisms for attaching the left controller 3 and the right controller 4. Thus, similarly to the case where the left controller 3 and the right controller 4 are attached to the main body apparatus 2, the left controller 3 and the right controller 4 can be attached to the extension grip 210. Specifically, in the extension grip 210, mechanisms for attaching the left controller 3 and the right controller 4 are provided on both left and right sides across a main body portion having a predetermined width, and rail members for attaching the left controller 3 and the right controller 4 are provided in parallel. Consequently, the left controller 3 and the right controller 4 are attached to the extension grip 210 such that the xyz-axis directions of the left controller 3 and the right controller 4 are parallel to each other. Then, the user holds with both hands the left controller 3 and the right controller 4 attached to the extension grip 210 and unified. Consequently, the user can hold in a unified manner the two controllers, namely the left controller 3 and the right controller 4, detached from the main body apparatus 2.

When the above game is played using the left controller 3 and the right controller 4 unified by such an extension grip 210, an operation is performed using the operation buttons and the sticks provided in the left controller 3 and the right controller 4. For example, when the B-button 54 of the right controller 4 is subjected to a pressing operation, the player object PO throws a left punch, and the first object G1 starts moving. When the A-button 53 of the right controller 4 is subjected to a pressing operation, the player object PO throws a right punch, and the second object G2 starts moving. When the analog stick 32 of the left controller 3 is subjected to a tilt operation while the first object G1 and/or the second object G2 are moving in a virtual game world, the moving directions of the first object G1 and/or the second object G2 that are moving change in accordance with the direction of the tilt operation and the tilt angle. When the analog stick 32 of the left controller 3 is subjected to a tilt operation in a case where both the first object G1 and the second object G2 are placed at the movement start positions, the player object PO moves in the virtual game world in accordance with the direction of the tilt operation and the tilt angle. Further, when the operation of pushing in the analog stick 32 of the left controller 3 is performed in a case where both the first object G1 and the second object G2 are placed at the movement start positions, the player object PO defends against an attack from the enemy object EO in the virtual game world. When the X-button 55 of the right controller 4 is subjected to a pressing operation, the player object PO performs the action of jumping in the virtual game world. Then, when the Y-button 56 of the right controller 4 is subjected to a pressing operation, the player object PO dashes (moves rapidly) in the virtual game world.

Also when game play is performed using the extension grip 210, vibrations are imparted to the left controller 3 and/or the right controller 4 attached to the extension grip 210 in accordance with the states of the first object G1 and/or the second object G2 in the virtual game world. As an example, also when game play is performed using the extension grip 210, the main body apparatus 2 generates outward vibration data in accordance with the type, the moving velocity, the moving direction, and the like of the first object G1 in accordance with the fact that the first object G1 moves in the virtual space, and transmits the outward vibration data to the left controller 3. Further, the main body apparatus 2 generates outward vibration data in accordance with the type, the moving velocity, the moving direction, and the like of the second object G2 in accordance with the fact that the second object G2 moves in the virtual space, and transmits the outward vibration data to the right controller 4. Further, also when game play is performed using the extension grip 210, and when the first object G1 and/or the second object G2 collide with another object, the main body apparatus 2 generates vibration data indicating vibrations corresponding to the collision and transmits the vibration data to the left controller 3 and/or the right controller 4. Further, also when game play is performed using the extension grip 210, and when the first object G1 and/or the second object G2 move on the homeward paths for returning to the movement start positions, the main body apparatus 2 generates homeward vibration data in accordance with the types, the moving velocities, the moving directions, and the like of the first object G1 and/or the second object G2 moving on the homeward paths, and transmits the homeward vibration data to the left controller 3 and/or the right controller 4. Consequently, also when game play is performed using the extension grip 210, the left controller 3 and/or the right controller 4 receiving various vibration data vibrate based on the vibration data.

Further, also when game play is performed using the extension grip 210, and when the trajectories of the first object G1 and/or the second object G2 change due to the fact that the analog stick 32 is subjected to a tilt operation, the vibrations of the left controller 3 and/or the right controller 4 also change. For example, when the outward trajectories of the first object G1 and/or the second object G2 change, the main body apparatus 2 calculates change parameters for the amplitudes and/or the frequencies of the vibrations in accordance with the angle of the tilt operation (an analog input value) on the analog stick 32, temporarily changes the outward vibration data using the change parameters, and then changes back the outward vibration data again. Consequently, receiving the outward vibration data that temporarily changes, the left controller 3 and/or the right controller 4 change the amplitudes and/or the frequencies of the vibrations based on the outward vibration data.

It should be noted that when an operation is performed using an accessory device to which the left controller 3 and the right controller 4 are attachable, an operation using not only the analog stick 32 of the left controller 3 but also the analog stick 52 of the right controller 4 may be allowed. In this case, an operation using a pair of analog sticks is allowed. Thus, independent direction indications for changing the trajectory of the first object G1 using the analog stick 32, and changing the trajectory of the second object G2 using the analog stick 52 may be allowed.

It should be noted that in FIGS. 14 to 18, an exemplary game has been used where one-person play (e.g., the enemy object EO is automatically controlled by the CPU 81) is performed using the stationary monitor 6. Alternatively, a game may be played by a plurality of users. For example, when two users perform game play, each user operates a different player object by holding a set of the left controller 3 and the right controller 4. Then, the display area of the stationary monitor 6 is split into two display areas, and an image for each user is displayed on each split display area (an image in which the player object operated by the other user is viewed from the player object operated by the user). In such an operation environment, each user performs the operation of throwing a punch at the opponent player object, whereby it is possible to achieve a game where each user competes against the opponent player object.

When a plurality of users perform game play, the information processing system 1 may communicate with another apparatus (e.g., another information processing system 1), thereby transmitting and receiving game data necessary for the game play. For example, when the information processing system 1 communicates with another apparatus, the information processing system 1 may transmit and receive data to and from another apparatus connected to the Internet (a wide-area network) via the network communication section 82, or may transmit and receive data using so-called "local communication", in which the information processing system 1 directly communicates with another apparatus placed in a closed local network area.

Next, with reference to FIGS. 19 to 26, a description is given of an example of specific processing executed by the information processing system 1 according to the exemplary embodiment. FIG. 19 is a diagram showing an example of a data area set in the DRAM 85 of the main body apparatus 2 according to the exemplary embodiment. It should be noted that in the DRAM 85, in addition to data shown in FIG. 19, data used for other processes is also stored, but is not described in detail here.

In a program storage area of the DRAM 85, various programs Pa, which are executed by the information processing system 1, are stored. In the exemplary embodiment, as the various programs Pa, a communication program for wirelessly communicating with the left controller 3 and the right controller 4, an application program for performing information processing (e.g., game processing) based on data acquired from the left controller 3 and/or the right controller 4, a program for switching a display device for displaying an image in accordance with the attachment and detachment of the main body apparatus 2 to and from the cradle 5, and the like are stored. It should be noted that the various programs Pa may be stored in advance in the flash memory 84, or may be acquired from a storage medium attachable to and detachable from the information processing system 1 (e.g., a storage medium attached to the slot 23) and stored in the DRAM 85, or may be acquired from another apparatus via a network such as the Internet and stored in the DRAM 85. The CPU 81 executes the various programs Pa stored in the DRAM 85.

In a data storage area of the DRAM 85, various data used for processes such as a communication process, information processing, and the like executed by the information processing system 1 is stored. In the exemplary embodiment, in the DRAM 85, operation data Da, orientation data Db, angular velocity data Dc, acceleration data Dd, threshold data De, curve value data Df, rotational velocity data Dg, swing flag data Dh, movement flag data Di, action flag data Dj, return flag data Dk, movement-start-allowed flag data Dl, player object position data Dm, collision area data Dn, enemy object position data Do, left controller vibration data Dp, right controller vibration data Dq, image data Dr, and the like are stored.

The operation data Da is operation data appropriately acquired from each of the left controller 3 and the right controller 4. As described above, operation data transmitted from each of the left controller 3 and the right controller 4 includes information regarding an input (specifically, information regarding an operation or the detection result of each sensor) from each input section (specifically, each button, an analog stick, and each sensor). In the exemplary embodiment, operation data is transmitted from each of the left controller 3 and the right controller 4 in a predetermined cycle through wireless communication, and the operation data Da is appropriately updated using the received operation data. It should be noted that the update cycle of the operation data Dc may be such that the operation data Da is updated every frame, which is the cycle of the processing described later performed by the information processing system 1, or is updated every cycle in which operation data is transmitted through the above wireless communication.

The orientation data Db is data indicating each of the orientations of the left controller 3 and the right controller 4 with respect to the direction of a gravitational acceleration in real space. For example, the orientation data Db includes data indicating the direction of a gravitational acceleration acting on each of the left controller 3 and the right controller 4, data indicating XYZ-axis directions relative to the direction of the gravitational acceleration, and the like.

The angular velocity data Dc is data indicating angular velocities generated in each of the left controller 3 and the right controller 4. For example, the angular velocity data Dc includes data indicating angular velocities about the XYZ-axes generated in each of the left controller 3 and the right controller 4 and the like.

The acceleration data Dd is data indicating accelerations generated in each of the left controller 3 and the right controller 4. For example, the acceleration data Dd includes data indicating accelerations generated in the XYZ-axis directions, except for the gravitational acceleration generated in each of the left controller 3 and the right controller 4.

The threshold data De is data indicating a threshold for determining a swing operation performed on each of the left controller 3 and the right controller 4. The curve value data Df is data indicating a curve value C for calculating the moving direction and the trajectory of each of the first object G1 and the second object G2. The rotational velocity data Dg is data indicating the motion (a rotational velocity V) of each of the left controller 3 and the right controller 4 while the first object G1 or the second object G2 is moving.

The swing flag data Dh is data indicating a swing flag, which is set to on when it is determined that each of the left controller 3 and the right controller 4 is swung. The movement flag data Di is data indicating a movement flag, which is set to on when each of the first object G1 and the second object G2 is moving in the virtual space. The action flag data Dj is data indicating an action flag, which is set to on when an action is performed in which the first object G1 and the second object G2 are a set. The return flag data Dk is data indicating a return flag, which is set to on when each of the first object G1 and the second object G2 is moving on the homeward path in the virtual space for returning to the movement start position. The movement-start-allowed flag data Dl is data indicating a movement-start-allowed flag, which is set to on when the first object G1 enters the first movement-start-allowed state, and when the second object G2 enters the second movement-start-allowed state.

The player object position data Dm is data indicating each of the positions and the directions (the moving directions) in the virtual space of the first object G1, the second object G2, and the player object PO. The collision area data Dn is data indicating the position in the virtual space, the shape, and the range of the collision area A. The enemy object position data Do is data indicating the position and the direction in the virtual space of the enemy object EO and data indicating the positions and the directions in the virtual space of objects shot from the enemy object EO (e.g., objects representing the left glove (the left first) and the right glove (the right fist)).

The left controller vibration data Dp is data indicating a vibration for vibrating the left controller 3. The right controller vibration data Dq is data indicating a vibration for vibrating the right controller 4.

The image data Dr is data for displaying an image (e.g., an image of a virtual object, a field image, or a background image) on the display 12 of the main body apparatus 2 or the display screen of the stationary monitor 6 when a game is performed.

Figure 20:
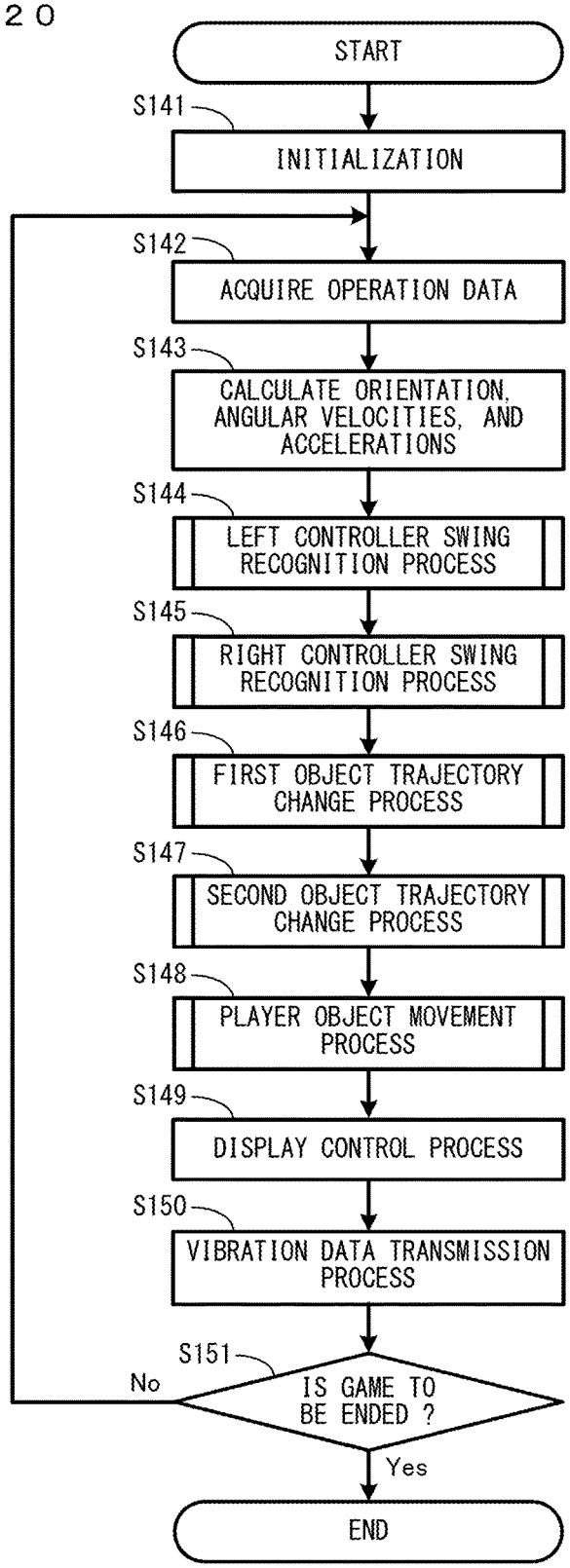
FIG. 20 is a flow chart showing a non-limiting example of game processing executed by the information processing system 1.
Figure 21:
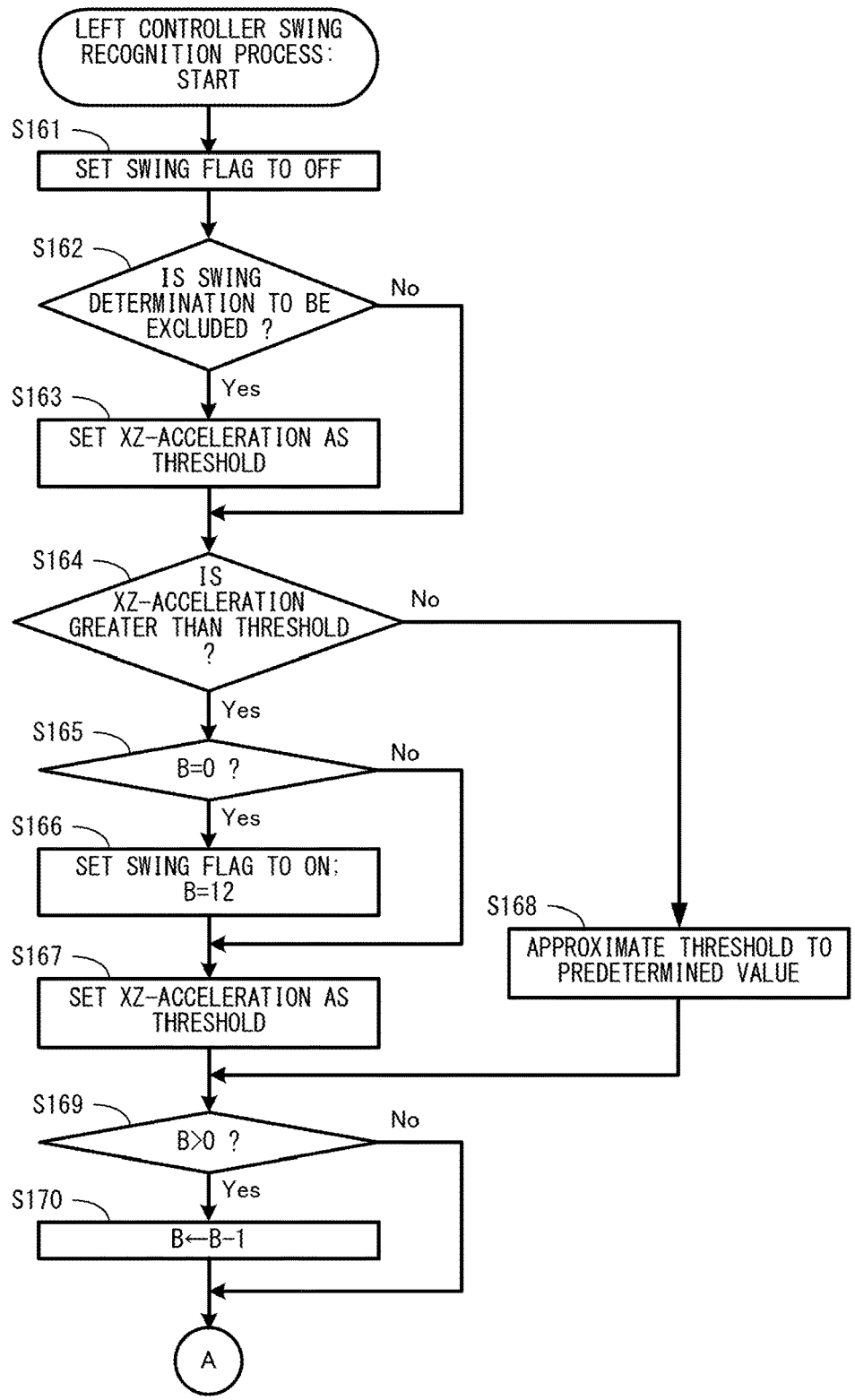
FIG. 21 is a subroutine showing non-limiting examples of the details of a controller swing recognition process performed in steps S144 and S145 in FIG. 20.
Figure 22:
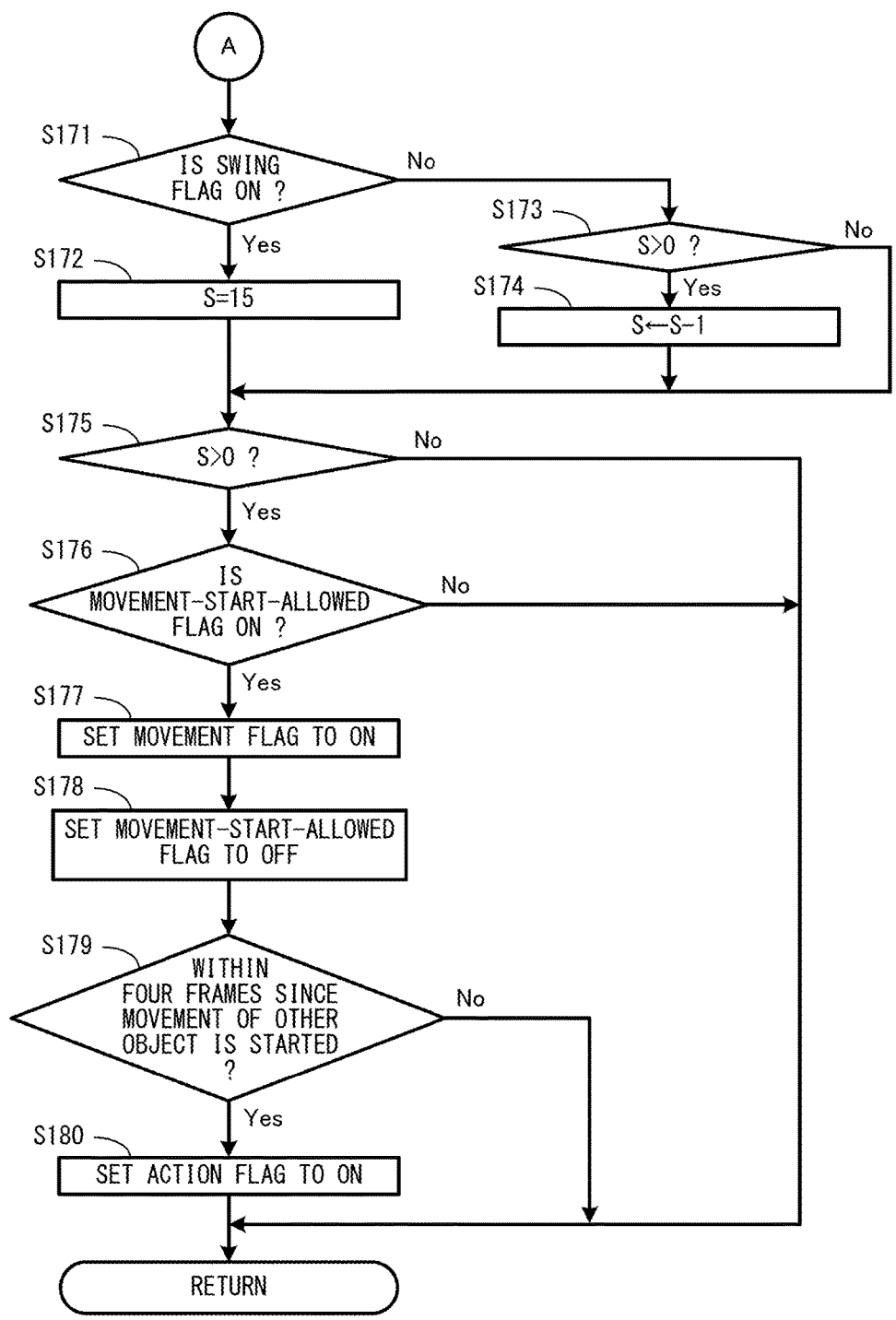
FIG. 22 is the subroutine showing non-limiting examples of the details of the controller swing recognition process performed in steps S144 and S145 in FIG. 20.
Figure 23:
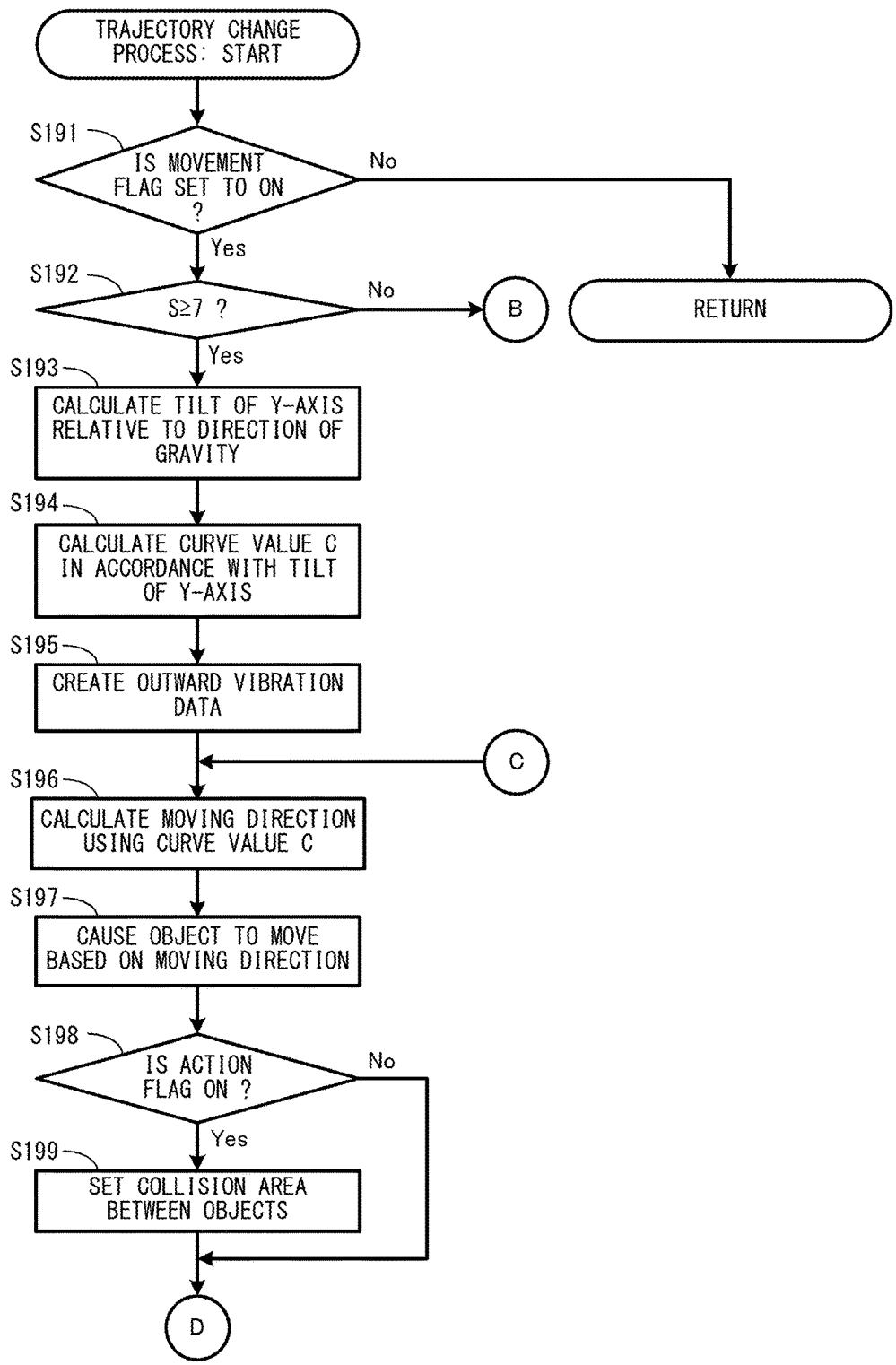
FIG. 23 is a subroutine showing non-limiting examples of the details of an object trajectory change process performed in steps S146 and S147 in FIG. 20.
Figure 24:
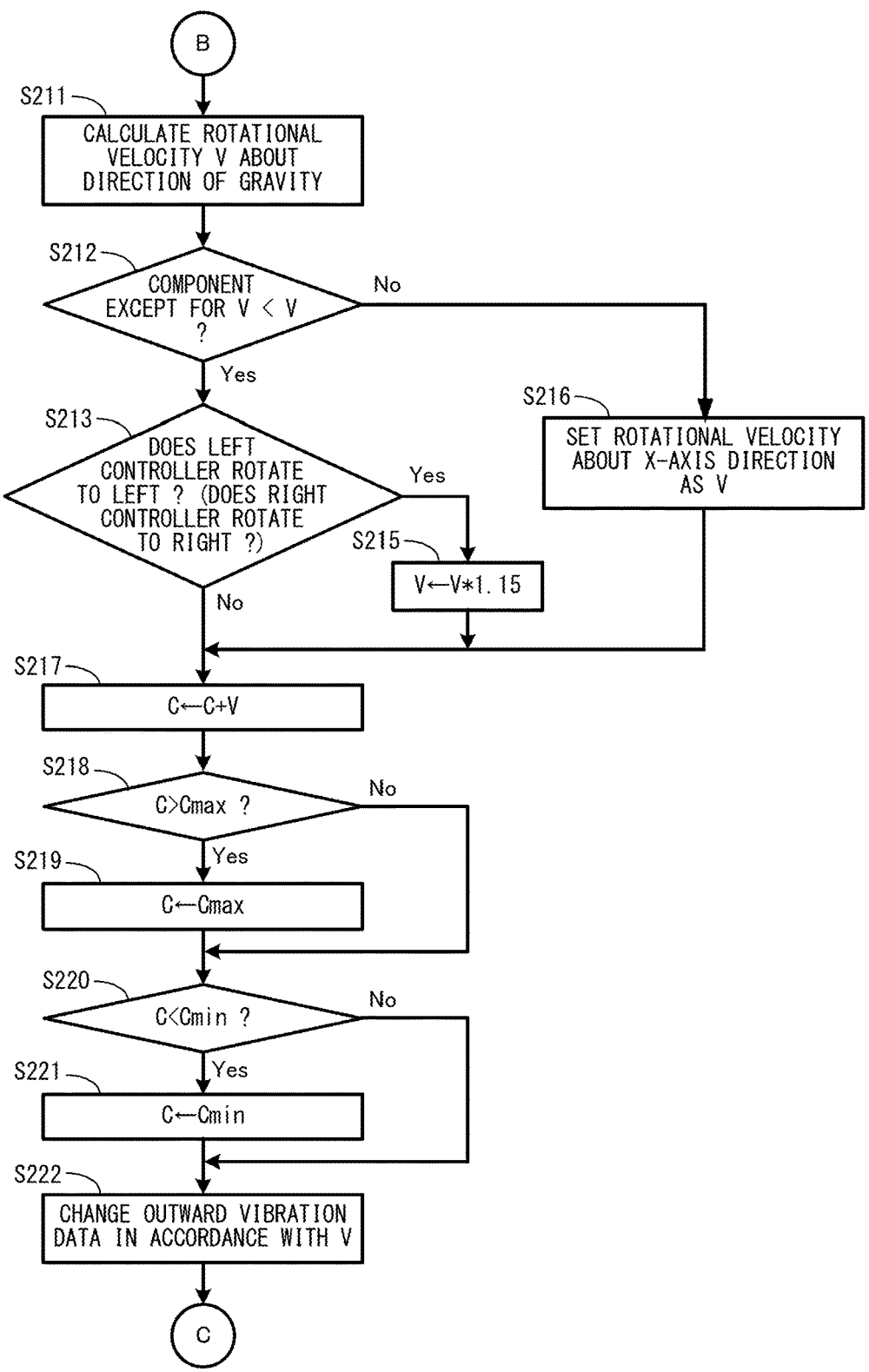
FIG. 24 is the subroutine showing non-limiting examples of the details of the object trajectory change process performed in steps S146 and S147 in FIG. 20.
Figure 25:
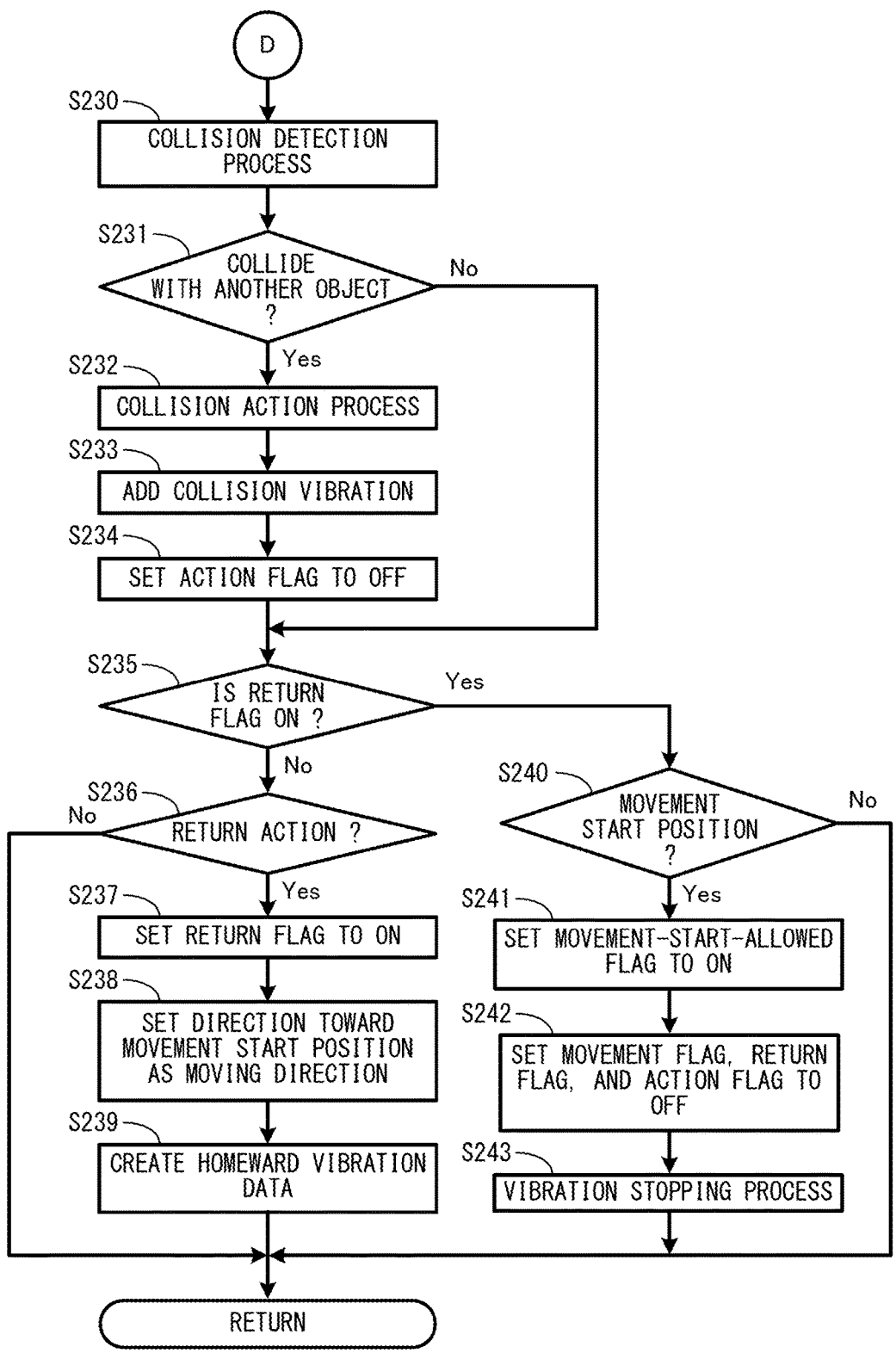
FIG. 25 is the subroutine showing non-limiting examples of the details of the object trajectory change process performed in steps S146 and S147 in FIG. 20.
Figure 26:
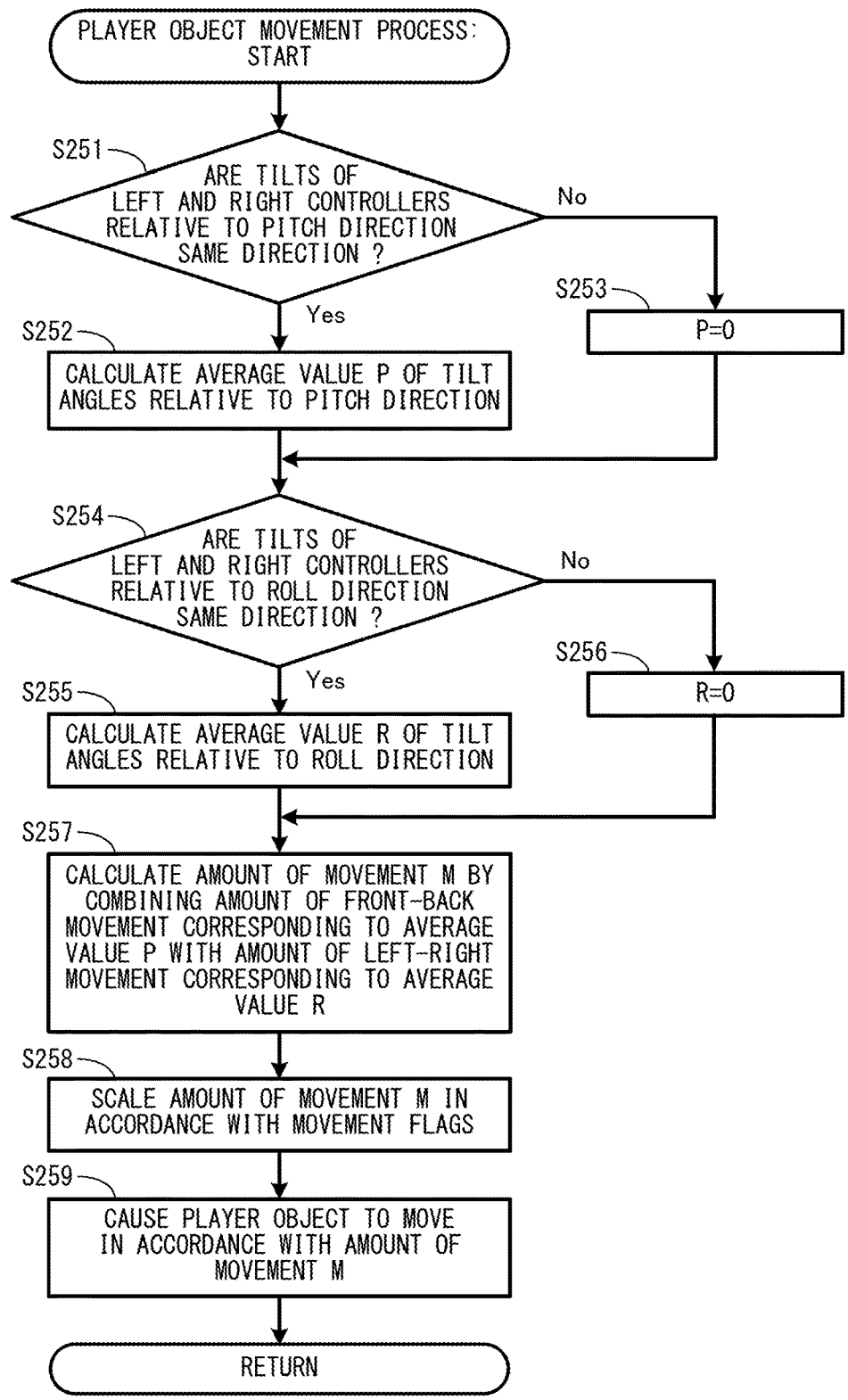
FIG. 26 is a subroutine showing non-limiting examples of the details of a player object movement process performed in step S148 in FIG. 20.

Next, a detailed example of information processing (game processing) according to the exemplary embodiment is described. FIG. 20 is a flow chart showing an example of game processing executed by the information processing system 1. FIGS. 21 and 22 are a subroutine showing examples of the details of a controller swing recognition process performed in steps S144 and S145 in FIG. 20. FIGS. 23 to 25 are a subroutine showing examples of the details of an object trajectory change process performed in steps S146 and S147 in FIG. 20. FIG. 26 is a subroutine showing examples of the details of a player object movement process performed in step S148 in FIG. 20. In the exemplary embodiment, a series of processes shown in FIGS. 20 to 26 is performed by the CPU 81 executing the communication program and a predetermined application program (a game program) included in the various programs Pa. Further, the game processing shown in FIGS. 20 to 26 is started at any timing.

It should be noted that the processes of all of the steps in the flow charts shown in FIGS. 20 to 26 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the CPU 81 performs the processes of all of the steps in the flow charts. Alternatively, a processor or a dedicated circuit other than the CPU 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 20 to 26 may be executed by the cooperation of a plurality of information processing apparatuses including the main body apparatus 2.

In FIG. 20, the CPU 81 performs initialization in the game processing (step S141), and the processing proceeds to the next step. For example, in the initialization, the CPU 81 initializes parameters for performing the processing described below. Further, in the initialization, the CPU 81 sets a game field for performing game play and sets the initial positions of the player object PO and the enemy object EO on the game field, thereby updating the player object position data Dm and the enemy object position data Do. Further, the CPU 81 initializes the moving directions of the first object G1 and the second object G2 to default values (e.g., front directions), thereby updating the player object position data Dm. Further, the CPU 81 initializes the movement-start-allowed flag indicated by the movement-start-allowed flag data Dl to on.

Next, the CPU 81 acquires operation data from the left controller 3 and the right controller 4 and updates the operation data Da (step S142), and the processing proceeds to the next step.

Next, the CPU 81 calculates the orientation, the angular velocities, and the accelerations of each of the left controller 3 and the right controller 4 (step S143), and the processing proceeds to the next step. For example, the CPU 81 acquires data indicating accelerations generated in each of the left controller 3 and the right controller 4 from the operation data Da, calculates the direction of a gravitational acceleration acting on each of the left controller 3 and the right controller 4, and updates the orientation data Db using data indicating the direction. As a method for extracting a gravitational acceleration, any method may be used. For example, an acceleration component generated on average in each of the left controller 3 and the right controller 4 may be calculated and extracted as a gravitational acceleration. Then, the CPU 81 calculates, as the orientation of the left controller 3, the XYZ-axis directions of the left controller 3 with respect to the direction of the gravitational acceleration calculated for the left controller 3 and updates the orientation data Db using data indicating the orientation. Further, the CPU 81 calculates, as the orientation of the right controller 4, the XYZ-axis directions of the right controller 4 with respect to the direction of the gravitational acceleration calculated for the right controller 4 and updates the orientation data Db using data indicating the orientation. Further, the CPU 81 acquires data indicating angular velocities generated in each of the left controller 3 and the right controller 4 from the operation data Da, calculates angular velocities about the XYZ-axes of each of the left controller 3 and the right controller 4, and updates the angular velocity data Dc using data indicating the angular velocities. Further, the CPU 81 acquires data indicating accelerations generated in each of the left controller 3 and the right controller 4 from the operation data Da, removes the gravitational acceleration component from the accelerations in the XYZ-axis directions generated in each of the left controller 3 and the right controller 4, and updates the acceleration data Dd using data indicating the accelerations after the removal.

It should be noted that after the XYZ-axis directions with respect to the gravitational acceleration are calculated, the orientation of the left controller 3 or the right controller 4 may be updated in accordance with only the angular velocities about the XYZ-axes. However, to prevent the relationship between the orientation of the left controller 3 or the right controller 4 and the direction of the gravitational acceleration from shifting due to erroneous accumulation, the XYZ-axis directions relative to the direction of the gravitational acceleration may be calculated every predetermined cycle, and the orientation of the left controller 3 or the right controller 4 may be corrected.

Next, the CPU 81 performs a left controller swing recognition process (step S144), and the processing proceeds to the next step. With reference to FIGS. 21 and 22, a description is given below of the left controller swing recognition process performed in the above step S144.

In FIG. 21, the CPU 81 sets the swing flag set for the processing of the left controller 3 to off, thereby updating the swing flag data Dh. Then, the processing proceeds to the next step.

Next, the CPU 81 determines whether or not a swing determination regarding the left controller 3 is to be excluded (step S162). For example, when the left controller 3 is swung back, the CPU 81 excludes the swing determination. Then, when the swing determination regarding the left controller 3 is to be excluded, the processing proceeds to step S163. On the other hand, when the swing determination regarding the left controller 3 is to be made, the processing proceeds to step S164.

As a first example of the method for determining whether the left controller 3 is swung back, the CPU 81 acquires the angular velocity about the Y-axis of the left controller 3 with reference to the orientation data Db. When the left controller 3 rotates toward the near side (e.g., rotation in which the positive Z-axis direction is directed toward the near side), the determination is affirmative in the above step S162. As a second example of the method for determining the left controller 3 is swung back, the CPU 81 acquires the orientation of the left controller 3 with reference to the orientation data Db. When the left controller 3 is in the orientation in which the left controller 3 is tilted backward relative to the direction of the gravitational acceleration (e.g., the orientation in which the positive X-axis direction of the left controller 3 is directed above the horizontal direction in real space), the determination is affirmative in the above step S162. As a third example of the method for determining whether the left controller 3 is swung back, the CPU 81 acquires, with reference to the acceleration data Dd, the accelerations generated in the left controller 3. When the left controller 3 moves in the direction of the player (e.g., a negative X-axis direction component of the left controller 3 is included in the accelerations generated in the left controller 3), the determination is affirmative in the above step S162.

In step S163, when the magnitude of an acceleration generated in the left controller 3 at the current moment is greater than a threshold for the swing determination regarding the left controller 3, the CPU 81 sets as the threshold the magnitude of the acceleration generated in the left controller 3 at the current moment, thereby updating the threshold data De. Then, the processing proceeds to step S164. Here, as will be apparent later, in the exemplary embodiment, when the magnitude of, among the accelerations generated in the left controller 3, the acceleration (hereinafter referred to as an "XZ-acceleration") except for a Y-axis direction component exceeds the threshold, it is determined that the left controller 3 is swung. In the above step S163, when the magnitude of the acceleration generated in the left controller 3 at the current moment (i.e., the magnitude of, among the accelerations generated in the left controller 3, the acceleration except for a Y-axis direction component at the current moment) is greater than a predetermined value described later, the magnitude of the acceleration is set as a threshold used for the above swing determination, whereby the determination is negative in the above swing determination. That is, the above step S163 is a process executed when the left controller 3 is swung back. When the left controller 3 is swung back before and after the action of throwing a punch, it is possible to prevent an erroneous determination that the left controller 3 is swung so as to throw a punch.

In step S164, the CPU 81 determines whether or not the magnitude of the XZ-acceleration generated in the left controller 3 is greater than the above threshold. Then, when the magnitude of the XZ-acceleration generated in the left controller 3 is greater than the above threshold, the processing proceeds to step S165. On the other hand, when the magnitude of the XZ-acceleration generated in the left controller 3 is less than or equal to the above threshold, the processing proceeds to step S168. Here, in the exemplary embodiment, to determine whether or not the left controller 3 is swung so as to throw a punch, i.e., so as to move in the positive X-axis direction, the magnitude of, among the accelerations generated in the left controller 3, the XZ-acceleration except for a Y-axis direction component is compared with a predetermined value (the threshold set in the above step S163 or step S167 or S168 described later). Thus, in the above step S164, the CPU 81 acquires the accelerations generated in the X-axis direction and the Z-axis direction of the left controller 3 with reference to the acceleration data Dd and calculates the magnitude of the XZ-acceleration generated in the left controller 3 using the accelerations. Then, when the left controller 3 is not swung back, and if the magnitude of the XZ-acceleration exceeds a predetermined value or a threshold approximated to the predetermined value, it is determined that the left controller 3 is swung so as to throw a punch.

In step S165, the CPU 81 determines whether or not a temporary variable B is 0. Then, when the temporary variable B is 0, the processing proceeds to step S166. On the other hand, when the temporary variable B is not 0, the processing proceeds to step S167.

In step S166, the CPU 81 sets the swing flag set for the processing of the left controller 3 to on, thereby updating the swing flag data Dh. Then, the CPU 81 sets a predetermined number of frames as the temporary variable B, and the processing proceeds to step S167. As described above, when it is determined that the left controller 3 is swung so as to throw a punch, and the temporary variable B is 0, the swing flag set for the processing of the left controller 3 is set to on.

Here, in the above step S166, the predetermined number of frames set as the temporary variable B is used to temporarily set the period in which a next swing determination is excluded (the period in which the swing flag cannot be set to on) immediately after it is determined that the left controller 3 is swung so as to throw a punch and is set to, as an example, 12 frames in the exemplary embodiment. For example, even after it is determined that the left controller 3 is swung, the accelerations generated in the left controller 3 can continue to increase. In such a case, affirmative determinations continue in the swing determination in the above step S164. If, however, such affirmative determinations are all regarded as the state where the left controller 3 is swung so as to throw a punch, it is not possible to make an intended punch determination. Thus, in the exemplary embodiment, for a predetermined period (e.g., 12 frames) after it is determined that the left controller 3 is swung so as to throw a punch, this determination is excluded. It should be noted that, as another example, the period in which the accelerations generated in the left controller 3 continue to increase (specifically, the XZ-acceleration continues to increase) after it is determined that the left controller 3 is swung so as to throw a punch and the swing flag is set to on may be set as the period in which the swing flag cannot be set to on again.

In step S167, as a threshold for making the swing determination regarding the left controller 3, the CPU 81 sets the magnitude of the acceleration generated in the left controller 3 at the current moment, thereby updating the threshold data De. Then, the processing proceeds to step S169.

On the other hand, when it is determined in the above step S164 that the magnitude of the XZ-acceleration generated in the left controller 3 is less than or equal to the above threshold, the CPU 81 approximates the threshold for making the swing determination regarding the left controller 3 to a predetermined value determined in advance, thereby updating the threshold data De. Then, the processing proceeds to step S169. As an example, the CPU 81 approximates, by a predetermined amount, the threshold indicated by the threshold data De to the predetermined value to set a new threshold and updates the threshold data De using the threshold. As another example, the CPU 81 approximates, by a predetermined proportion, the threshold indicated by the threshold data De to the predetermined value to set a new threshold and updates the threshold data De using the threshold. As described above, the threshold for making the swing determination regarding the left controller 3 is approximated to a predetermined value determined in advance, whereby, even if the threshold increases by executing the above step S163 or step S167, it is possible to make the swing determination regarding the controller using an intended predetermined value after the lapse of a predetermined time.

In step S169, the CPU 81 determines whether or not the temporary variable B is greater than 0. Then, when the temporary variable B is greater than 0, the processing proceeds to step S170. On the other hand, when the temporary variable B is 0, the processing proceeds to step S171 (see FIG. 22).

In step S170, the CPU 81 subtracts 1 from the temporary variable B to set a new temporary variable B, and the processing proceeds to step S171 (see FIG. 22).

In FIG. 22, in step S171, the CPU 81 determines, with reference to the swing flag data Dh, whether or not the swing flag set for the processing of the left controller 3 is set to on. Then, when the swing flag set for the processing of the left controller 3 is set to on, the processing proceeds to step S172. On the other hand, when the swing flag set for the processing of the left controller 3 is set to off, the processing proceeds to step S173.

In step S172, the CPU 81 sets a predetermined number of frames as a temporary variable S for counting the number of processing frames after it is determined that the left controller 3 is swung so as to throw a punch, and the processing proceeds to step S175. Here, the predetermined number of frames set as the temporary variable S is a parameter corresponding to, when the left controller 3 enters the first movement-start-allowed state within a predetermined time after it is determined that the left controller 3 is swung so as to throw a punch, the predetermined time for performing the process of starting the movement of the first object G1 and is set to, as an example, 15 frames in the exemplary embodiment. Thus, even when the left controller 3 is not in the first movement-start-allowed state, but when the left controller 3 enters the first movement-start-allowed state within 15 frames after it is determined that the left controller 3 is swung so as to throw a punch, the process of starting the movement of the first object G1 is performed.

On the other hand, when it is determined in the above step S171 that the swing flag is set to off, the CPU 81 determines whether or not the temporary variable S is greater than 0. Then, when the temporary variable S is greater than 0, the processing proceeds to step S174. On the other hand, when the temporary variable S is 0, the processing proceeds to step S175.

In step S174, the CPU 81 subtracts 1 from the temporary variable S to set a new temporary variable S, and the processing proceeds to step S175.

In step S175, the CPU 81 determines whether or not the temporary variable S is greater than 0. Then, when the temporary variable S is greater than 0, the processing proceeds to step S176. On the other hand, when the temporary variable S is 0, the processing of this subroutine ends.

In step S176, the CPU 81 determines, with reference to the movement-start-allowed flag data Dl, whether or not the movement-start-allowed flag set for the processing of the first object G1 is set to on. Then, when the movement-start-allowed flag set for the processing of the first object G1 is set to on, the processing proceeds to step S177. On the other hand, when the movement-start-allowed flag set for the processing of the first object G1 is set to off, the processing using this subroutine ends.

In step S177, the CPU 81 sets the movement flag set for the processing of the first object G1 to on, thereby updating the movement flag data Di. Then, the processing proceeds to the next step. As described above, not only when it is determined that the left controller 3 is swung so as to throw a punch, but also before a predetermined number of frames (e.g., 15 frames) elapses even after this determination, and when the movement-start-allowed flag is on (i.e., the first movement-start-allowed state), the movement flag set for the processing of the first object G1 is set to on.

Next, the CPU 81 sets the movement-start-allowed flag set for the processing of the first object G1 to off, thereby updating the movement-start-allowed flag data Dl (step S178). Then, the processing proceeds to the next step. As described above, when the movement flag indicating that the first object G1 moves in the virtual space is set to on, the left controller 3 is not in the first movement-start-allowed state. Thus, the movement-start-allowed flag of the first object G1 is set to off. It should be noted that in the state where the player object PO cannot attack the enemy object EO (e.g., the state where the player object PO is damaged and is temporarily down), the movement-start-allowed flag may be appropriately set to off, thereby setting the movement-start-allowed flag data Dl. In this case, when the player object PO recovers from the above state where the player object PO cannot attack the enemy object EO, the movement-start-allowed flag is set to on.

Next, the CPU 81 determines whether or not the current moment is within a predetermined number of frames (e.g., four frames) since the movement of the second object G2 is started (step S179). For example, in step S145 described later, the CPU 81 performs a process similar to the left controller swing recognition process also on the right controller 4. Thus, when the current moment is within the predetermined number of frames since the movement flag set for the processing of the right controller 4 is set to on in step S145, the determination is affirmative in the above step S179. Then, when the current moment is within the predetermined number of frames since the movement of the second object G2 is started, the processing proceeds to step S180. On the other hand, when the current moment is not within the predetermined number of frames since the movement of the second object G2 is started, the processing using this subroutine ends.

In step S180, the CPU 81 sets the action flag to on, thereby updating the action flag data Dj. Then, the processing using this subroutine ends. As described above, when, within the predetermined number of frames since one of the first object G1 and the second object G2 starts moving, the other object starts moving, the action flag is set to on.

Referring back to FIG. 20, after the left controller swing recognition process in the above step S144, the CPU 81 performs a right controller swing recognition process (step S145), and the processing proceeds to the next step. It should be noted that the controller swing recognition process described with reference to FIGS. 21 and 22 is a subroutine used also in the right controller swing recognition process in the above step S145. That is, the left controller 3 and the first object G1 as processing targets in the left controller swing recognition process are switched to the right controller 4 and the second object G2, whereby it is possible to perform similar processing using the same subroutine. Thus, the details of the right controller swing recognition process in the above step S145 are not described here.

Next, the CPU 81 performs a first object trajectory change process (step S146), and the processing proceeds to the next step. With reference to FIGS. 23 to 25, a description is given of the first object trajectory change process performed in the above step S146.

In FIG. 23, the CPU 81 determines, with reference to the movement flag data Di, whether or not the movement flag set for the processing of the first object G1 is set to on (step S191). Then, when the movement flag set for the processing of the first object G1 is set to on, the processing proceeds to step S192. On the other hand, when the movement flag set for the processing of the first object G1 is set to off, the processing using this subroutine ends.

In step S192, the CPU 81 determines whether or not the temporary variable S is equal to or greater than a predetermined number. Then, when the temporary variable S is equal to or greater than the predetermined number, the processing proceeds to step S193. On the other hand, when the temporary variable S is less than the predetermined number, the processing proceeds to step S211 (see FIG. 24). Here, in the above step S192, it is determined whether or not the current moment is in the period after it is determined that the left controller 3 is swung so as to throw a punch and before the punch operation ends. Then, different trajectory settings are made between when it is determined that the punch operation is being performed and when it is determined that the punch operation ends. Thus, the predetermined number used in the above step S192 may be set to the number of frames allowing the determination of the above period, and may be set such that, for example, the predetermined number=7.

In step S193, the CPU 81 calculates the tilt in the Y-axis direction of the left controller 3 relative to the direction of the gravitational acceleration, and the processing proceeds to the next step. For example, the CPU 81 acquires the orientation of the left controller 3 with reference to the orientation data Db and calculates the tilt in the Y-axis direction of the left controller 3 relative to the direction of the gravitational acceleration.

Next, in accordance with the tilt angle in the Y-axis direction of the left controller 3, the CPU 81 calculates the curve value C of the first object G1, thereby updating the curve value data Df (step S194). Then, the processing proceeds to the next step. Here, the curve value C of the first object G1 is a coefficient for changing the trajectory of the first object G1 to the left and right and is set such that, for example, $-1 \leq C \leq 1$. Then, in the above step S194, when the Y-axis direction of the left controller 3 is tilted to the right relative to the positive X-axis direction, the curve value C is set to a positive value. When the Y-axis direction is tilted 40° to the right relative to the horizontal direction, the curve value C is set such that C=1. Even when the Y-axis direction is tilted 40° or more to the right relative to the horizontal direction, C is set to 1, which is the maximum value. Further, when the Y-axis direction of the left controller 3 is tilted to the left relative to the positive X-axis direction, the curve value C is set to a negative value. When the Y-axis direction is tilted 40° to the left relative to the horizontal direction, the curve value C is set such that C=−1. Even when the Y-axis direction is tilted 40° or more to the left relative to the horizontal direction, C is set to −1, which is the minimum value.

Next, the CPU 81 creates outward vibration data for vibrating the left controller 3 (step S195), and the processing proceeds to step S196. For example, in accordance with the type of the first object G1, the CPU 81 generates an outward vibration waveform when the first object G1 moves on the outward path, and based on the outward vibration waveform, the CPU 81 generates outward vibration data for vibrating the left controller 3, thereby updating the left controller vibration data Dp. It should be noted that the CPU 81 may adjust the outward vibration waveform in accordance with the moving velocity or the moving direction of the first object G1 (the curve value C), or may generate the outward movement waveform regardless of the moving velocity or the moving direction. Further, the CPU 81 may add a vibration corresponding to the situation of the virtual space except for the first object G1 to the vibration waveform. For example, the CPU 81 may add to the outward vibration waveform a vibration corresponding to the action of the player object PO or an impact imparted to the player object PO, a vibration corresponding to the situation of the game field, a vibration corresponding to BGM or a sound effect, or the like. Further, when the action flag indicated by the action flag data Dj is set to on, the CPU 81 may generate outward vibration data (action outward vibration data) for the "both-hand punch action", thereby updating the left controller vibration data Dp.

On the other hand, as shown in FIG. 24, when the temporary variable S is less than the predetermined number, the CPU 81 calculates the rotational velocity V of the left controller 3 about the direction of the gravitational acceleration (step S211), and the processing proceeds to the next step. For example, with reference to the orientation data Db, the CPU 81 acquires the direction of the gravitational acceleration acting on the left controller 3. Further, with reference to the angular velocity data Dc, the CPU 81 acquires the angular velocities about the XYZ-axes generated in the left controller 3. Then, the CPU 81 calculates the angular velocity of the left controller 3 about the direction of the gravitational acceleration using the angular velocities about the XYZ-axes and the direction of the gravitational acceleration and calculates the rotational velocity V of the left controller 3 corresponding to the angular velocities, thereby updating the rotational velocity data Dg.

Next, the CPU 81 determines whether or not the magnitude of the rotational velocity V is greater than the magnitude of a component obtained by removing the angular velocities corresponding to the rotational velocity V from the angular velocities generated in the left controller 3 (step S212). Then, when the magnitude of the rotational velocity V is greater, the processing proceeds to step S213. On the other hand, when the magnitude of the rotational velocity V is smaller or the same, the processing proceeds to step S216. Here, the process of step S212 is performed to determine which direction the angular velocity generated in the left controller 3 is generated mainly about. It is determined whether the motion of the left controller 3 in real space is mainly a motion in the yaw direction, in which the left controller 3 rotates about the gravitational acceleration, or mainly a motion in which the left controller 3 rotates about another direction.

In step S213, based on the angular velocity of the left controller 3 about the direction of the gravitational acceleration, the CPU 81 determines whether or not the left controller 3 rotates in the left yaw direction about the direction of the gravitational acceleration. Then, when the left controller 3 rotates in the left yaw direction about the direction of the gravitational acceleration, the CPU 81 multiplies the rotational velocity V of the left controller 3 by 1.15, thereby updating the rotational velocity data Dg (step S215). Then, the processing proceeds to step S217. On the other hand, when the left controller 3 does not rotate in the left yaw direction about the direction of the gravitational acceleration, the processing immediately proceeds to step S217. Generally, considering the direction in which the wrist of a human being bends, it is more difficult to perform an operation in which the user rotates in the left yaw direction the left controller 3 held with their left hand, than an operation in which the user rotates the left controller 3 in the right yaw direction. The processes of steps S213 and S215 take into account the difficulty of such an operation. Even with the operation of moving the controller in the direction in which it is difficult to move the controller, it is possible to control the object similarly to another operation.

It should be noted that when this subroutine is used to perform the process of changing the trajectory of the second object G2, then in the above step S213, it is determined whether or not the right controller 4 rotates in the right yaw direction about the direction of the gravitational acceleration. Then, when the right controller 4 rotates in the right yaw direction about the direction of the gravitational acceleration, the rotational velocity V of the right controller 4 is multiplied by 1.15, thereby updating the rotational velocity data Dg.

On the other hand, when the angular velocity corresponding to the rotational velocity V is smaller or the same, the CPU 81 calculates the rotational velocity V in accordance with the angular velocity about the X-axis direction of the left controller 3 (step S216), and the processing proceeds to step S217. For example, the CPU 81 acquires the angular velocity about the X-axis direction of the left controller 3 with reference to the angular velocity data Dc and calculates the rotational velocity V of the left controller 3 corresponding to the angular velocity, thereby updating the rotational velocity data Dg.

In step S217, the CPU 81 adds a value regarding the rotational velocity V of the left controller 3 to the curve value C of the first object G1 to calculate a new curve value C, and the processing proceeds to the next step. For example, the CPU 81 acquires the curve value C of the first object G1 and the rotational velocity V of the left controller 3 with reference to the curve value data Df and the rotational velocity data Dg and updates the curve value data Df using a new curve value C of the first object G1 obtained by adding a value corresponding to the rotational velocity V to the curve value C.

Next, the CPU 81 determines whether or not the curve value C of the first object G1 exceeds a predetermined maximum value Cmax (e.g., Cmax=1) (step S218). Then, when the curve value C of the first object G1 exceeds the maximum value Cmax, the CPU 81 sets the maximum value Cmax as the curve value C of the first object G1, thereby updating the curve value data Df (step S219). Then, the processing proceeds to step S220. On the other hand, when the curve value C of the first object G1 does not exceed the maximum value Cmax, the processing immediately proceeds to step S220.

In step S220, the CPU 81 determines whether or not the curve value C of the first object G1 is smaller than a predetermined minimum value Cmin (e.g., Cmin=−1). Then, when the curve value C of the first object G1 is smaller than the minimum value Cmin, the CPU 81 sets the minimum value Cmin as the curve value C of the first object G1, thereby updating the curve value data Df (step S221). Then, the processing proceeds to step S222. On the other hand, when the curve value C of the first object G1 is equal to or greater than the minimum value Cmin, the processing immediately proceeds to step S222.

In step S222, based on the rotational velocity V, the CPU 81 changes the outward vibration data for vibrating the left controller 3, and the processing proceeds to step S196 (see FIG. 23). For example, in accordance with the rotational velocity V calculated based on the angular velocities generated in the left controller 3, the CPU 81 calculates change parameters for changing the amplitude and/or the frequency of a vibration and changes the outward vibration data using the change parameters, thereby updating the left controller vibration data Dp.

Figure 27:
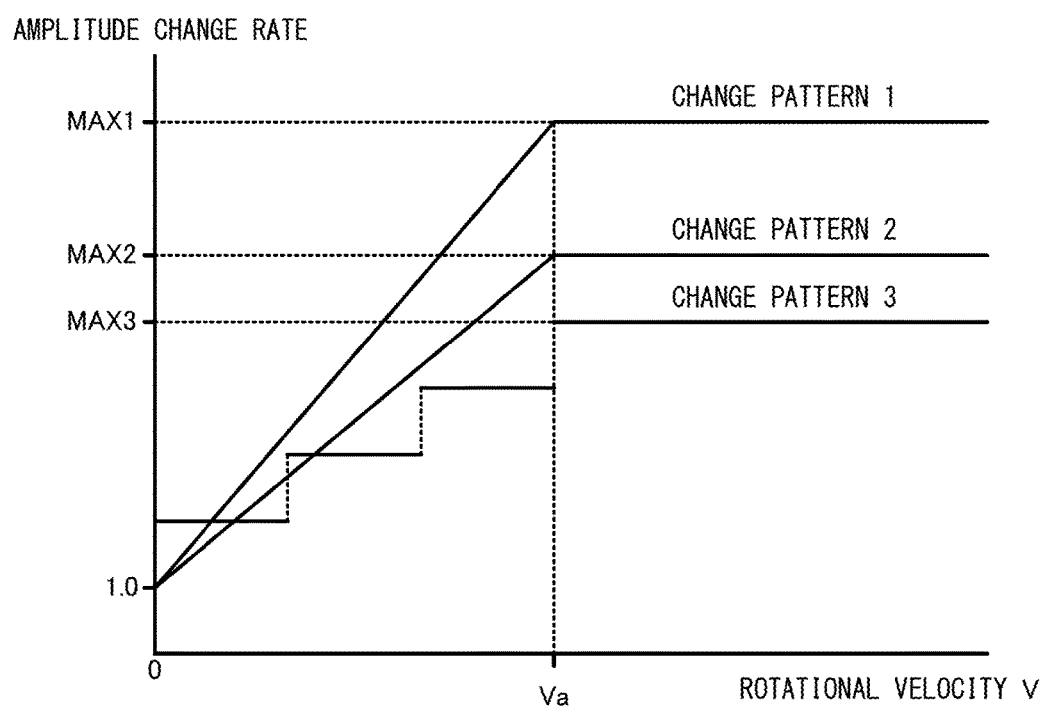
FIG. 27 is a diagram showing non-limiting examples of change patterns for changing the amplitude of an outward vibration waveform in accordance with a rotational velocity V.

For example, as shown in FIG. 27, when the amplitude of the outward vibration waveform is changed in accordance with the rotational velocity V, various change patterns are possible. For example, a change pattern 1 is a change pattern of the amplitude in which for a change in the rotational velocity V from 0 to Va, the amplitude change rate is linearly transformed from 1.0 to MAX1 (MAX1>1.0) and is constant at the amplitude change rate MAX1 at the rotational velocity Va or more. A change pattern 2 is a change pattern of the amplitude in which for a change in the rotational velocity V from 0 to Va, the amplitude change rate is linearly transformed from 1.0 to MAX2 (MAX1>MAX2>1.0) and is constant at the amplitude change rate MAX2 at the rotational velocity Va or more. A change pattern 3 is a change pattern of the amplitude which the amplitude change rate is transformed based on a table in which the amplitude change rate is gradually heightened from 1.0 to MAX3 (MAX3>1.0) in each certain range of the rotational velocity V from 0 to Va, and is constant at the amplitude change rate MAX3 at the rotational velocity Va or more.

When an amplitude change rate of 1.0 is calculated using the above change patterns, the amplitude of the outward vibration waveform is not changed, that is, the outward vibration data created in the above step S195 is set as it is as the left controller vibration data Dp. Further, as is clear from the above, the rotational velocity V is calculated in accordance with the angular velocity of the left controller 3 about the direction of the gravitational acceleration (the angular velocity in the yaw direction) or the angular velocity about the X-axis direction of the left controller 3 (the angular velocity in the roll direction) and is a parameter based on a change in the motion or the orientation of the left controller 3. That is, when there is no change in the motion or the orientation of the left controller 3 in the yaw direction or the roll direction, the rotational velocity V is also 0. Thus, the amplitude change rate is also 1.0. That is, even when the amplitude of the outward vibration waveform changes by the generation of the rotational velocity V due to a change in the motion or the orientation of the left controller 3, the change in the motion or the orientation stops, whereby the amplitude change rate becomes 1.0, and the outward vibration waveform returns to the previous outward vibration waveform. Thus, a change in the outward vibration data in the above step S222 is used to temporarily change the outward vibration waveform generated in the above step S195. The change in the motion or the orientation of the left controller 3 stops, whereby the outward vibration data returns to the previous outward vibration waveform.

In the above step S222, the outward vibration data may be changed using various change patterns based on the rotational velocity V, and a change pattern to be selected may be set in accordance with the type of the first object G1. Further, in FIG. 27, examples of the amplitude change rate for changing the amplitude so as to correspond to the rotational velocity V are exemplified. Alternatively, the frequency of the vibration may be changed using the same change pattern, or the frequency of the vibration may be changed using a change pattern different from that of the amplitude.

Further, in the above step S222, the outward vibration data is changed based on the rotational velocity V. Alternatively, the outward vibration data may be changed based on another parameter. For example, the outward vibration data may be changed based on the amount of change in the curve value C, or the outward vibration data may be changed based on the value of the curve value C itself. In the first case, it is possible to change the outward vibration data based on the amount of change in the curve value C subjected to the processes of the above steps S218 to S221, i.e., the amount of change in the curve value C limited to the minimum value Cmin and the maximum value Cmax.

Referring back to FIG. 23, in step S196, the CPU 81 calculates the moving direction of the first object G1 using the curve value C of the first object G1, and the processing proceeds to the next step. For example, the CPU 81 acquires the curve value C of the first object G1 with reference to the curve value data Df and acquires the moving direction of the first object G1 with reference to the player object position data Dm. Then, when the acquired curve value C of the first object G1 is a positive value, the CPU 81 changes the acquired moving direction of the first object G1 to the right in accordance with the magnitude of the curve value and updates the player object position data Dm using the changed moving direction of the first object G1. Further, when the acquired curve value C of the first object G1 is a negative value, the CPU 81 changes the acquired moving direction of the first object G1 to the left in accordance with the magnitude of the curve value and updates the player object position data Dm using the changed moving direction of the first object G1.

It should be noted that when the first object G1 moves on the homeward path in the virtual space for returning to the movement start position, then without changing the moving direction based on the curve value C of the first object G1, the moving direction may be fixedly set to the direction in which the first object G1 returns from the current position of the first object G1 to the movement start position. The determination of whether or not the first object G1 moves on the homeward path can be made based on whether or not the return flag described later is set to on.

Next, based on the moving direction of the first object G1, the CPU 81 causes the first object G1 to move (step S197), and the processing proceeds to the next step. For example, the CPU 81 acquires the position and the moving direction of the first object G1 with reference to the player object position data Dm, causes the first object G1 to move from the position of the first object G1 based on the moving direction, and updates the player object position data Dm using the position of the moved first object G1.

It should be noted that the moving velocity (the amount of movement) at which the first object G1 is caused to move in the above step S197 may be such that, as an example, the moving velocity of the first object G1 is set in accordance with a velocity corresponding to the type of the first object G1. As another example, the moving velocity of the first object G1 may be set in accordance with the magnitude of the acceleration when it is determined that the left controller 3 is swung so as to throw a punch. In this case, an initial velocity at which the first object G1 starts moving may be set based on the magnitude of the XZ-acceleration when the swing flag is set to on, and the moving velocity after that may be appropriately changed based on the situation of the virtual space, a change in the moving direction, a predetermined algorithm, movement characteristics set for the first object G1, or the like.

Next, the CPU 81 determines, with reference to the action flag data Dj, whether or not the action flag is set to on (step S198). Then, when the action flag is set to on, the processing proceeds to step S199. On the other hand, when the action flag is set to off, the processing proceeds to step S230 (see FIG. 25).

In step S199, the CPU 81 sets the collision area A between the first object G1 and the second object G2, and the processing proceeds to step S230 (see FIG. 25). For example, the CPU 81 acquires the position of the first object G1 and the position of the second object G2 with reference to the player object position data Dm and sets the position in the virtual space, the shape, and the range of the collision area A based on these positions, thereby updating the collision area data Dn. When the moving direction of the first object G1 (and the moving direction of the second object G2) and the position after the movement are set in the state where the action flag is thus set to on, the collision area A is set between the first object G1 and the second object G2.

In FIG. 25, the CPU 81 performs a collision detection process (step S230), and the processing proceeds to the next step. For example, with reference to the player object position data Dm, the collision area data Dn, and the enemy object position data Do, the CPU 81 determines collision in the virtual space between the first object G1 and the collision area A, and another object (e.g., the enemy object EO) in the virtual space.

Next, the CPU 81 determines whether or not at least one of the first object G1 and the collision area A collides with another object in the virtual space (step S231). Then, when at least one of the first object G1 and the collision area A collides with another object, the processing proceeds to step S232. On the other hand, when neither of the first object G1 and the collision area A collides with another object, the processing proceeds to step S235.

In step S232, the CPU 81 performs a collision action process on another object, and the processing proceeds to the next step. For example, when the first object G1 collides with the enemy object EO, the CPU 81 imparts damage corresponding to the collision to the enemy object EO and also sets a predetermined action corresponding to the damage. Further, when the collision area A collides with the enemy object EO, the CPU 81 imparts damage corresponding to the collision to the enemy object EO and also sets the "both-hand punch action" in which the first object G1 and the second object G2 are a set.

It should be noted that in the exemplary embodiment, not only in the period in which the first object G1 moves toward the enemy object EO, but also in the period in which the first object G1 returns toward the player object PO, and when the first object G1 collides with another object, the collision action process is performed. However, when the collision action process is performed on another object only in the period in which the first object G1 moves toward the enemy object EO, then in the period in which the first object G1 returns toward the player object PO (the state where the return flag is on), it may be always determined in the above step S231 that the first object G1 does not collide with another object, and the collision action process may not be performed.

Next, the CPU 81 adds a collision vibration (step S233), and the processing proceeds to the next step. For example, the CPU 81 generates a collision vibration waveform corresponding to the situation where the first object G1 collides with another object. Then, the CPU 81 combines the collision vibration waveform with the vibration waveform indicated by the left controller vibration data Dp to generate a new vibration waveform and updates the left controller vibration data Dp using the new vibration waveform.

Next, the CPU 81 sets the action flag to off, thereby updating the action flag data Dj. The CPU 81 also sets the collision area data Dn to the state where there is no collision area (e.g., Null) (step S234), and the processing proceeds to step S235. As described above, when the action of any one of the first object G1, the second object G2, and the collision area A colliding with another object is set, the action flag is set to off, and also setting data regarding the collision area is erased.

In step S235, the CPU 81 determines, with reference to the return flag data Dk, whether or not the return flag set for the processing of the first object G1 is set to on. Then, when the return flag set for the processing of the first object G1 is set to off, the processing proceeds to step S236. On the other hand, when the return flag set for the processing of the first object G1 is set to on, the processing proceeds to step S240.

In step S236, the CPU 81 determines whether or not the first object G1 performs the action of moving on the homeward path in the virtual space for returning to the movement start position. For example, the condition that the first object G1 reaches a position a predetermined distance away from the movement start position, or the condition that a predetermined time elapses after the first object G1 passes through the position of the enemy object EO, or the condition that a predetermined time elapses after the first object G1 or the collision area A collides with another object, or the like is satisfied, it is determined that the first object G1 performs the action of moving on the homeward path. Then, when the first object G1 performs the action of moving on the homeward path, the processing proceeds to step S237. On the other hand, when the first object G1 does not perform the action of moving on the homeward path, the processing of this subroutine ends.

In step S237, the CPU 81 sets the return flag set for the processing of the first object G1 to on, thereby updating the return flag data Dk. Then, the processing proceeds to the next step. As described above, when the action of the first object G1 moving on the homeward path is set, the return flag set for the processing of the first object G1 is set to on.

Next, the CPU 81 sets a direction toward the movement start position as the moving direction of the first object G1 (step S238), and the processing proceeds to the next step. For example, the CPU 81 calculates a direction from the current position of the first object G1 to the movement start position as the moving direction of the first object G1 with reference to the player object position data Dm, and updates the player object position data Dm using this moving direction. It should be noted that the moving direction of the first object G1 set in the above step S238 may be set to a direction along an object joined to the first object G1 (e.g., an extended arm object of the player object PO), or may be set to return on the trajectory when the first object G1 moves from the movement start position.

Next, the CPU 81 creates homeward vibration data for vibrating the left controller 3 (step S239), and the processing of this subroutine ends. For example, in accordance with the type of the first object G1, the CPU 81 generates a homeward vibration waveform when the first object G1 moves on the homeward path, and based on the homeward vibration waveform, the CPU 81 generates homeward vibration data for vibrating the left controller 3, thereby updating the left controller vibration data Dp. It should be noted that the CPU 81 may adjust the homeward vibration waveform in accordance with the moving velocity or the moving direction of the first object G1, or may generate the homeward movement waveform regardless of the moving velocity or the moving direction. Further, the CPU 81 may add a vibration corresponding to the situation of the virtual space except for the first object G1 to the vibration waveform. For example, the CPU 81 may add to the homeward vibration waveform a vibration corresponding to the action of the player object PO or an impact imparted to the player object PO, a vibration corresponding to the situation of the game field, a vibration corresponding to BGM or a sound effect, or the like. Further, when the CPU 81 does not impart a vibration to the left controller 3 when the first object G1 moves on the homeward path, the CPU 81 may set, in the left controller vibration data Dp, vibration data indicating an amplitude of 0 or vibration data indicating that the left controller 3 is not to be vibrated.

On the other hand, when the return flag is set to on, the CPU 81 determines whether or not the first object G1 returns to the movement start position (step S240). For example, with reference to the player object position data Dm, when the position of the first object G1 is set to the movement start position, the determination is affirmative in the above step S240. Then, when the first object G1 returns to the movement start position, the processing proceeds to step S241. On the other hand, when the first object G1 does not return to the movement start position, the processing of this subroutine ends.

In step S241, the CPU 81 sets the movement-start-allowed flag set for the processing of the first object G1 to on, thereby updating the movement-start-allowed flag data Dl. Then, the processing proceeds to the next step. As described above, when the first object G1 enters the state where the first object G1 can move in the virtual space again, the current state is the first movement-start-allowed state. Thus, the movement-start-allowed flag of the first object G1 is set to on. It should be noted that in the above step S241, when the first object G1 returns to the movement start position, the movement-start-allowed flag of the first object G1 is immediately set to on, and the current state is the first movement-start-allowed state. Alternatively, the first movement-start-allowed state may be started at another timing. For example, the first movement-start-allowed state may be started at the timing when a predetermined time (e.g., eight frames) elapses after the first object G1 returns to the movement start position.

Next, the CPU 81 sets the movement flag and the return flag set for the processing of the first object G1 to off, sets the action flag to off, and sets data regarding the collision area and the moving direction of the first object G1 to the default values (step S242), and the processing proceeds to the next step. For example, the CPU 81 sets the movement flag and the return flag set for the processing of the first object G1 to off, thereby updating the movement flag data Di and the return flag data Dk, respectively. Further, the CPU 81 sets the action flag to off, thereby updating the action flag data Dj. Further, the CPU 81 sets setting data regarding the collision area to the state where there is no collision area (e.g., Null), thereby updating the collision area data Dn. Further, the CPU 81 sets the moving direction of the first object G1 to the default value (e.g., the front direction), thereby updating the player object position data Dm.

Next, the CPU 81 performs the process of stopping the vibration of the left controller 3 (step S243), and the processing of this subroutine ends. For example, in accordance with the type of the first object G1, the CPU 81 generates a vibration to occur when the first object G1 returns to the movement start position, and a vibration waveform for stopping the vibration after the vibration, and based on the vibration waveform, the CPU 81 generates vibration data for vibrating the left controller 3, thereby updating the left controller vibration data Dp. It should be noted that when a vibration corresponding to the situation of the virtual space except for the movement of the first object G1 is to be imparted even after the movement of the first object G1 stops, the CPU 81 may add this vibration (a vibration corresponding to the action of the player object PO or an impact imparted to the player object PO, a vibration corresponding to the situation of the game field, a vibration corresponding to BGM or a sound effect, or the like), thereby continuously vibrating the left controller 3.

Referring back to FIG. 20, after the first object trajectory change process in the above step S146, the CPU 81 performs a second object trajectory change process (step S147), and the processing proceeds to the next step. It should be noted that the object trajectory change process described with reference to FIGS. 23 to 25 is a subroutine used also in the second object trajectory change process in the above step S147. That is, the left controller 3 and the first object G1 as processing targets in the first object trajectory change process are switched to the right controller 4 and the second object G2, whereby it is possible to perform similar processing using the same subroutine. Thus, the details of the second object trajectory change process in the above step S147 are not described here.

Next, the CPU 81 performs a player object movement process (step S148), and the processing proceeds to the next step. With reference to FIG. 26, a description is given of the player object movement process performed in the above step S148.

In FIG. 26, the CPU 81 determines whether or not the tilts of the left controller 3 and the right controller 4 relative to the pitch direction in real space are the same direction (step S251). For example, with reference to the orientation data Db, when both the positive X-axis direction of the left controller 3 and the positive X-axis direction of the right controller 4 are an elevation direction or a depression direction with respect to the horizontal direction in real space, the determination is affirmative in the above step S251. Then, when the tilts of the left controller 3 and the right controller 4 relative to the pitch direction in real space are the same direction, the processing proceeds to step S252. On the other hand, when the tilts of the left controller 3 and the right controller 4 relative to the pitch direction in real space are not the same direction, the processing proceeds to step S253.

In step S252, the CPU 81 calculates an average value P of the tilt angles of the left controller 3 and the right controller 4 relative to the pitch direction in real space, and the processing proceeds to step S254. For example, with reference to the orientation data Db, the CPU 81 calculates the angle between the positive X-axis direction of the left controller 3 and the horizontal direction in real space, and the angle between the positive X-axis direction of the right controller 4 and the horizontal direction in real space and calculates the average value P of these angles. For example, each angle is calculated such that when the positive X-axis direction is a depression direction, the angle has a positive value, and when the positive X-axis direction is an elevation direction, the angle has a negative value.

On the other hand, when it is determined in the above step 251 that the tilts of the left controller 3 and the right controller 4 relative to the pitch direction in real space are not the same direction, the CPU 81 sets the average value P to 0 (step S253), and the processing proceeds to step S254.

In step S254, the CPU 81 determines whether or not the tilts of the left controller 3 and the right controller 4 relative to the roll direction in real space are the same direction. For example, with reference to the orientation data Db, when both the positive Y-axis direction of the left controller 3 and the positive Y-axis direction of the right controller 4 are an elevation direction or a depression direction with respect to the horizontal direction in real space, the determination is affirmative in the above step S254. Then, when the tilts of the left controller 3 and the right controller 4 relative to the roll direction in real space are the same direction, the processing proceeds to step S255. On the other hand, when the tilts of the left controller 3 and the right controller 4 relative to the roll direction in real space are not the same direction, the processing proceeds to step S256.

In step S255, the CPU 81 calculates an average value R of the tilt angles of the left controller 3 and the right controller 4 relative to the roll direction in real space, and the processing proceeds to step S257. For example, with reference to the orientation data Db, the CPU 81 calculates the angle between the positive Y-axis direction of the left controller 3 and the horizontal direction in real space, and the angle between the positive Y-axis direction of the right controller 4 and the horizontal direction in real space and calculates the average value R of these angles. For example, each angle is calculated such that when the positive Y-axis direction is a depression direction, the angle has a positive value, and when the positive Y-axis direction is an elevation direction, the angle has a negative value.

On the other hand, when it is determined in the above step 254 that the tilts of the left controller 3 and the right controller 4 relative to the roll direction in real space are not the same direction, the CPU 81 sets the average value R to 0 (step S256), and the processing proceeds to step S257.

In step S257, the CPU 81 calculates an amount of movement M by combining the amount of front-back movement corresponding to the average value P with the amount of left-right movement corresponding to the average value R, and the processing proceeds to the next step. For example, when the average value P is a positive value, the CPU 81 calculates, in accordance with the value of the average value P, the amount of front-back movement for moving forward in the virtual space. When the average value P is a negative value, the CPU 81 calculates, in accordance with the value of the average value P, the amount of front-back movement for moving backward in the virtual space. Further, when the average value R is a positive value, the CPU 81 calculates, in accordance with the value of the average value R, the amount of left-right movement for moving to the right in the virtual space. When the average value R is a negative value, the CPU 81 calculates, in accordance with the value of the average value R, the amount of left-right movement for moving to the left in the virtual space. Then, the CPU 81 calculates the amount of movement M relative to the virtual space by combining the amount of front-back movement with the amount of left-right movement.

Next, the CPU 81 scales the amount of movement M in accordance with the setting states of the movement flags (step S258), and the processing proceeds to the next step. For example, with reference to the movement flag data Di, when the movement flags set for the processing of the first object G1 and the second object G2 are both set to off, the CPU 81 sets the value of the amount of movement M as it is. Further, when only one of the movement flags set for the processing of the first object G1 and the second object G2 is set to on, the CPU 81 reduces the amount of movement M by a predetermined magnification (e.g., reduces the amount of movement M by 0.9 times). Further, when the movement flags set for the processing of the first object G1 and the second object G2 are both set to on, the CPU 81 sets the amount of movement M to 0.

Next, in accordance with the amount of movement M scaled in the above step S258, the CPU 81 causes the player object PO to move in the virtual space (step S259), and the processing of this subroutine ends. For example, in accordance with the amount of movement M, the CPU 81 moves the position of the player object PO in the virtual space indicated by the player object position data Dm and updates the player object position data Dm using the moved position of the player object PO.

Referring back to FIG. 20, after the player object movement process in the above step S148, the CPU 81 performs a display control process (step S149), and the processing proceeds to the next step. For example, the CPU 81 places the player object PO, the first object G1, the second object G2, and the enemy object EO on the game field using the player object position data Dm and the enemy object position data Do. Further, when the action flag indicated by the action flag data Dj is set to on, and setting data regarding the collision area A is set in the collision area data Dn, the CPU 81 places an object corresponding to the collision area A between the first object G1 and the second object G2. Further, when a collision action is set in the above step S233, the CPU 81 causes each virtual object to perform an action in accordance with the setting content. Then, the CPU 81 performs the process of generating a virtual space image in which the game field is viewed from a virtual camera placed at a predetermined position (e.g., behind the player object PO), and displaying the virtual space image on a display screen of a display device (e.g., the stationary monitor 6).

Next, the CPU 81 performs the process of, in each cycle of transmitting vibration data, transmitting vibration data corresponding to this cycle to the left controller 3 and the right controller 4 (step S150), and the processing proceeds to the next step. For example, with reference to the left controller vibration data Dp, the CPU 81 transmits vibration data for a vibration length corresponding to the transmission cycle to the left controller 3. Further, with reference to the right controller vibration data Dq, the CPU 81 transmits vibration data for a vibration length corresponding to the transmission cycle to the right controller 4. The vibration data for vibrating the two controllers is thus transmitted to the left controller 3 and the right controller 4, whereby the left controller 3 and the right controller 4 receiving the vibration data vibrate based on vibration waveforms corresponding to the vibration data.

Next, the CPU 81 determines whether or not the game is to be ended (step S151). In the above step S151, examples of a condition for ending the game include: the fact that the result of the above game is settled; and the fact that the user performs the operation of ending the game. If the game is not to be ended, the processing returns to the above step S142, and the process of step S142 is repeated. If the game is to be ended, the processing of the flow chart ends. Hereinafter, the series of processes of steps S142 to S151 are repeatedly executed until it is determined in step S151 that he game is to be ended.

As described above, to vibrate the left controller 3 and the right controller 4, when the temporary variable S is equal to or greater than 7, outward vibration data is generated in step S195, and when the temporary variable S is less than 7, the outward vibration data is changed based on the rotational velocity V in step S222. Here, the temporary variable S is the following variable. When it is determined that the left controller 3 or the right controller 4 is swung so as to throw a punch, the temporary variable S is set to a predetermined number (step S172), and then, 1 is subtracted from the temporary variable S in accordance with the progress of the processing. That is, immediately after it is determined based on the accelerations that the left controller 3 and the right controller 4 are swung so as to throw a punch, the left controller 3 and the right controller 4 vibrate based on outward vibration data, and after that, vibrate based on vibration data changing based on the rotational velocity V. Thus, in the exemplary embodiment, it is possible to variedly vibrate the left controller 3 and/or the right controller 4 and also enable realistic game play. Further, vibration data for vibrating the left controller 3 and the right controller 4 can be changed in accordance with the motions and the orientations of the left controller 3 and/or the right controller 4 and can also be changed in accordance with an analog output by a tilt operation or the like on an analog stick. Thus, it is possible to perform flexible control corresponding to an operation form.

It should be noted that in the above exemplary embodiment, an example has been used where, when an acceleration generated in a controller satisfies a predetermined condition, predetermined outward vibration data is generated, and when an angular velocity generated in the controller in the period in which the outward vibration data is output satisfies a predetermined condition, vibration data for temporarily changing the amplitude and/or the frequency of a vibration is generated and output. Alternatively, vibration data may be generated in another form. For example, a parameter for determining whether or not the operation of throwing a punch using a controller may not be an acceleration generated in the controller, and may be determined using an angular velocity generated in the controller or both an acceleration and an angular velocity generated in the controller. Further, a condition for determining whether or not vibration data is to be temporarily changed may not be a condition based on an angular velocity generated in the controller, and may be a condition based on an acceleration generated in the controller or a condition based on both an acceleration and an angular velocity generated in the controller. Further, the above determination may be made based on an operation on an operation button or a direction indication section provided in the controller.

Further, a temporary change in vibration data corresponding to the rotational velocity V may occur multiple times. For example, as is apparent from the above flow charts, when the rotational velocity V is generated multiple times during the outward movement of the first object G1 or the second object G2, outward vibration data temporarily changes every time the rotational velocity V is generated. If the processing of the above flow charts is performed, it is possible to temporarily change outward vibration data multiple times.

Further, in the above exemplary embodiment, an example has been used where, when a change in the motion or the orientation of a controller satisfies a predetermined condition in the period in which predetermined outward vibration data is output, vibration data for temporarily changing the amplitude and/or the frequency of a vibration is output. Alternatively, a vibration parameter for making a temporarily change may be set in another form. As a first example, in accordance with the fact that a change in the motion or the orientation of a controller satisfies a predetermined condition when the controller intermittently vibrates in a predetermined cycle, vibration data may be output in which the period in which the cycle or the vibration is interrupted and/or the time in which the vibration is applied change. As a second example, when a change in the motion or the orientation of a controller satisfies a predetermined condition in the period in which predetermined outward vibration data is output, a single vibration having an amplitude greater than that of a vibration waveform based on the outward vibration data may be added a predetermined number of times, thereby outputting vibration data to be temporarily changed. As a third example, in a case where an object to which predetermined outward vibration data is output is a particular type of object, and even when a change in the motion or the orientation of a controller satisfies a predetermined condition, a vibration may not be changed, and the outward vibration data may continue to be output.

Further, in the above exemplary embodiment, an example has been used where outward vibration data is generated with the movement of the first object G1 or the second object G2 that starts moving in accordance with the motion of the left controller 3 or the right controller 4. Alternatively, the first object G1 or the second object G2 may start moving in accordance with another operation. For example, in accordance with a user operation on a predetermined operation section (e.g., an operation button or a direction indication section) provided in the left controller 3 or the right controller 4, the first object G1 or the second object G2 may start moving, and outward vibration data may be generated with the movement of the first object G1 or the second object G2.

Further, in the above exemplary embodiment, even during the movements of the first object G1 and the second object G2, the trajectories of the first object G1 and the second object G2 change due to an operation using the left controller 3 or the right controller 4. Thus, as a result, the above processing is based on the premise that the time from when the first movement-start-allowed state ends to when the current state enters a next first movement-start-allowed state, and the time from when the second movement-start-allowed state ends to when the current state enters a next second movement-start-allowed state are long. As described above, in a game where the time until a next movement can be started is long, game specifications are effective in which the operation of causing an object to start moving (a swing operation) is received in a preceding manner. However, it goes without saying that a game may be used where the time until a next movement can be started is long based on other specifications. For example, in the above exemplary game, the arm of the player object PO extends, whereby it is possible to control a motion during the movement of the player object PO. Alternatively, the exemplary embodiment may be applied to a game where another part (e.g., the leg) of the body of the player object extends, or a game where an object (a whip object, a pleated object, or the like) owned by the player object extends. Yet alternatively, the exemplary embodiment may be applied to a game where an object (e.g., a radio-controlled object, a robot, a rocket punch, or the like) that can be remotely operated by the player object is operated during the movement of the player object, and when the object returns to a hand portion of the player object again, a next movement can be made. Yet alternatively, the exemplary embodiment may be applied to a game where an object (a bird, a boomerang, a bowling ball, or the like) once shot returns.

Further, the above "both-hand punch action" has been described using an example where the first object G1 and the second object G2 as a set perform a predetermined action. Alternatively, the first object G1 and the second object G2 as a set may simply move. In this case, as the movement form of the first object G1 and the second object G2 represented as a game image, the first object G1 and the second object G2 as a set simply move. Alternatively, when at least one of the first object G1 and the second object G2 collides with the enemy object EO, damage greater than that in the case where the first object G1 or the second object G2 solely collides with the enemy object EO may be imparted to the enemy object EO.

Further, in the above exemplary embodiment, an example has been used where in accordance with an operation using the left controller 3 or the right controller 4, the positions of the first object G1 and the second object G2 in the left-right direction in the virtual space are controlled, and a vibration temporarily changes in accordance with this operation. Alternatively, the positions of the first object G1 and the second object G2 in the up-down direction in the virtual space and/or the positions of the first object G1 and the second object G2 in the front-back direction may be configured to be controlled. In this case, the positions of the first object G1 and/or the second object G2 in the up-down direction in the virtual space may be configured to be controlled in accordance with the motions of the left controller 3 and/or the right controller 4 in the up-down direction in real space and/or the orientations of the left controller 3 and/or the right controller 4 in the pitch direction, and a vibration may temporarily change in accordance with this operation. Yet alternatively, the positions of the first object G1 and/or the second object G2 in the front-back direction in the virtual space may be configured to be controlled in accordance with the motions of the left controller 3 and/or the right controller 4 in the front-back/rear direction in real space and/or the orientations of the left controller 3 and/or the right controller 4 in the pitch direction, and a vibration may temporarily change in accordance with this operation. Yet alternatively, the orientations of the first object G1 and the second object G2 in the virtual space may be configured to be controlled in accordance with an operation using the left controller 3 or the right controller 4. In this case, the orientations of the first object G1 and/or the second object G2 relative to the roll direction in the virtual space may be configured to be controlled in accordance with the orientations of the left controller 3 and/or the right controller 4 in the roll direction in real space, and a vibration may temporarily change in accordance with this operation. Yet alternatively, the orientations of the first object G1 and/or the second object G2 relative to the pitch direction in the virtual space may be configured to be controlled in accordance with the orientations of the left controller 3 and/or the right controller 4 in the pitch direction in real space, and a vibration may temporarily change in accordance with this operation. Yet alternatively, the orientations of the first object G1 and/or the second object G2 relative to the yaw direction in the virtual space may be configured to be controlled in accordance with the orientations of the left controller 3 and/or the right controller 4 in the yaw direction in the real space, and a vibration may temporarily change in accordance with this operation.

Further, in the above exemplary embodiment, the method for detecting the motions and the orientations of the left controller 3 and the right controller 4 is merely illustrative, and the motions and the orientations of the left controller 3 and the right controller 4 may be detected using another method or other data. For example, the acceleration sensors 104 and 114 and the angular velocity sensors 105 and 115 in the above exemplary embodiment are examples of the orientation sensors for calculating the motions and the orientations of the left controller 3 and the right controller 4. For example, in another exemplary embodiment, the left controller 3 or the right controller 4 may include a magnetic sensor in addition to (or instead of) the acceleration sensor or the angular velocity sensor, and may calculate the motions and the orientations of the left controller 3 and the right controller 4 using magnetism. For example, in another exemplary embodiment, the main body apparatus 2 may capture the left controller 3 or the right controller 4 using an image capturing apparatus and calculate the motions and the orientations of the left controller 3 and the right controller 4 using the captured image. Further, in the above exemplary embodiment, a game image corresponding to an operation using the left controller 3 or the right controller 4 is displayed on the stationary monitor 6. Alternatively, the game image may be displayed on the display 12 of the main body apparatus 2. Further, a controller for controlling the actions of the first object G1 and/or the second object G2 may not only be a set of the left controller 3 and the right controller 4, but also be obtained by combining another controller with the left controller 3 and/or the right controller 4, or combining other controllers together.

Further, in the above exemplary embodiment, a game has been used where a plurality of objects are operated using a pair of the left controller 3 and the right controller 4. Alternatively, a game may be used where a single object is operated using a single controller. In this case, when a change in the motion or the orientation of the controller satisfies a predetermined condition in the period in which outward vibration data for vibrating the single controller is output in accordance with the movement of the single object, vibration data for temporarily changing the amplitude and/or the frequency of a vibration is output. Consequently, even in a game where a single object is operated using a single controller, it is possible to temporarily change the vibration of the single controller.

Further, in another exemplary embodiment, the main body apparatus 2 may be able to directly communicate with the stationary monitor 6. For example, the main body apparatus 2 and the stationary monitor 6 may be able to directly perform wired communication with each other, or directly perform wireless communication with each other. In this case, based on whether or not the main body apparatus 2 and the stationary monitor 6 can directly communicate with each other, the main body apparatus 2 may determine the display destination of an image.

Further, the analog sticks 32 and 52 are examples of an operation device capable of acquiring an operation detection result as an analog value and outputting analog operation data indicating the analog value. Alternatively, another operation device capable of acquiring an analog value may be provided in the left controller 3 or the right controller 4. For example, a press button capable of acquiring an analog value corresponding to the amount of pressing of the user pressing the button, or a touch panel or a touch pad capable of acquiring an analog value corresponding to the position where the user performs a touch may be provided in the left controller 3 or the right controller 4.

Further, an additional apparatus (e.g., a cradle) may be any additional apparatus attachable to and detachable from the main body apparatus 2. The additional apparatus may or may not have the function of charging the main body apparatus 2 as in the exemplary embodiment.

Further, the information processing system 1 may be any apparatus, and may be a mobile game apparatus, any mobile electronic device (a PDA (Personal Digital Assistant), a mobile phone, a personal computer, a camera, a tablet, or the like) or the like. Further, the left controller 3 and/or the right controller 4 may be any apparatus, and may be any mobile electronic device (a PDA (Personal Digital Assistant), a mobile phone, a personal computer, a camera, a tablet, a mobile game apparatus, or the like) or the like.

Further, the above descriptions have been given using an example where the information processing system 1 performs information processing (game processing) and a communication process. Alternatively, another apparatus may perform at least some of the processing steps. For example, if the information processing system 1 is further configured to communicate with another apparatus (e.g., another server, another image display device, another game apparatus, or another mobile terminal), the other apparatus may cooperate to perform the processing steps. Another apparatus may thus perform at least some of the processing steps, thereby enabling processing similar to that described above. Further, the above information processing (game processing) can be performed by a processor or the cooperation of a plurality of processors, the processor or the plurality of processors included in an information processing system including at least one information processing apparatus. Further, in the above exemplary embodiment, information processing can be performed by the CPU 81 of the information processing system 1 executing a predetermined program. Alternatively, part or all of the processing of the flow charts may be performed by a dedicated circuit included in the information processing system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information processing described above are merely illustrative. Thus, it goes without saying that the exemplary embodiment can be achieved also with other orders, other values, and other conditions.

Further, the above program may be supplied to the information processing system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as an information processing program, an information processing apparatus, an information processing system, an information processing method, and the like that are capable of variedly vibrating an operation apparatus.

What is claimed is:

1. A non-transitory computer-readable storage medium having stored therein an information processing program executed by a computer included in an information processing apparatus for performing information processing based on an operation on an operation apparatus including a vibrator and a sensor for detecting a motion or an orientation of the operation apparatus, the information processing program causing the computer to execute:

generating predetermined vibration data for vibrating the vibrator;

outputting the predetermined vibration data to the operation apparatus;

acquiring motion or orientation data based on a detection result of the sensor from the operation apparatus; and performing predetermined information processing based on the motion or orientation data, wherein generation the predetermined vibration data, when the motion or orientation data satisfies a predetermined condition in a period in which the predetermined vibration data for vibrating the vibrator is output, includes generations vibration data for temporarily changing the vibration of the vibrator and thereafter continuing the vibration of the vibrator.

2. The non-transitory computer-readable storage medium having stored therein the information processing program according to claim 1, wherein generating the predetermined vibration data, when the motion or orientation data satisfies the predetermined condition, includes generating vibration data for temporarily changing an amplitude of the vibration of the vibrator.

3. The non-transitory computer-readable storage medium having stored therein the information processing program according to claim 2, wherein an amount of change in the amplitude to be temporarily changed is set in accordance with an amount of change in the motion or the orientation of the operation apparatus indicated by the motion or orientation data, thereby generating the vibration data for making the temporarily change.

4. The non-transitory computer-readable storage medium having stored therein the information processing program according to claim 1, wherein generating the predetermined vibration data, when the motion or orientation data satisfies the predetermined condition, includes generating vibration data for temporarily changing a frequency of the vibration of the vibrator.

5. The non-transitory computer-readable storage medium having stored therein the information processing program according to according to claim 1, wherein generating the predetermined vibration data, when the motion or orientation data satisfies the predetermined condition, includes generating vibration data for temporarily changing an amplitude and a frequency of the vibration of the vibrator.

6. The non-transitory computer-readable storage medium having stored therein the information processing program according to claim 1, wherein generating the predetermined vibration data, when the motion or orientation data satisfies the predetermined condition, includes generating vibration data for temporarily changing the vibration of the vibrator and thereafter changing back to the vibration indicated by the predetermined vibration data.

7. The non-transitory computer-readable storage medium having stored therein the information processing program according to claim 1, wherein the predetermined vibration data is generated in accordance with an operation on the operation apparatus.

8. The non-transitory computer-readable storage medium having stored therein the information processing program according to claim 7, wherein the predetermined vibration data is generated in accordance with the motion or orientation data.

9. The non-transitory computer-readable storage medium having stored therein the information processing program according to claim 8, wherein the sensor can detect a plurality of parameters corresponding to the motion or the orientation of the operation apparatus, in the acquisition of the motion or orientation data, a detection result of the sensor regarding the plurality of parameters is acquired as the motion or orientation data, and in the generation of the predetermined vibration data, the predetermined vibration data is generated in accordance with a predetermined parameter indicated by the motion or orientation data, and when a parameter different from the predetermined parameter indicated by the motion or orientation data satisfies the predetermined condition, the vibration data for temporarily changing the vibration of the vibrator is generated.

10. The non-transitory computer-readable storage medium having stored therein the information processing program according to claim 9, wherein in accordance with the motion or the orientation of the operation apparatus, the sensor can detect an acceleration and an angular velocity generated in the operation apparatus, in the acquisition of the motion or orientation data, a detection result regarding the acceleration and the angular velocity detected by the sensor is acquired as the motion or orientation data, and in the generation of the predetermined vibration data, the predetermined vibration data is generated in accordance with the acceleration indicated by the motion or orientation data, and when the angular velocity indicated by the motion or orientation data satisfies the predetermined condition, the vibration data for temporarily changing the vibration of the vibrator is generated.

11. The non-transitory computer-readable storage medium having stored therein the information processing program according to claim 1, wherein performing the predetermined information processing includes moving an object in a virtual world based on the motion or orientation data, the information processing program further causes the computer to execute displaying on a display screen the virtual world where the object moves, and moving the object, when the motion or orientation data satisfies the predetermined condition while the object is moving in the virtual world, includes changing a moving direction of the object.

12. The non-transitory computer-readable storage medium having stored therein the information processing program according to claim 11, wherein displaying on the display screen, when the moving direction of the object changes in accordance with the fact that the motion or orientation data satisfies the predetermined condition, includes displaying the object on the display screen by providing the object a predetermined effect image corresponding to the change in the moving direction.

13. The non-transitory computer-readable storage medium having stored therein the information processing program according to claim 1, wherein
the vibration data for temporarily changing the vibration is generated in accordance with an amount of change in the motion or orientation data.

14. The non-transitory computer-readable storage medium having stored therein the information processing program according to claim 13, wherein
the vibration data for temporarily changing the vibration is generated in accordance with an amount of change corresponding to a difference between the motion or orientation data previously acquired in the acquisition of the motion or orientation data and the motion or orientation data currently acquired in the acquisition of the motion or orientation data.

15. The non-transitory computer-readable storage medium having stored therein the information processing program according to claim 1, wherein
generating the predetermined vibration data, when the motion or orientation data satisfies the predetermined condition again in the period in which the predetermined vibration data for vibrating the vibrator is output, includes generating vibration data for temporarily changing the vibration of the vibrator again and thereafter continuing the vibration of the vibrator.

16. The non-transitory computer-readable storage medium having stored therein the information processing program according to claim 1, further causing the computer to execute outputting a sound, wherein
the predetermined vibration data is generated in relation to the sound output in the output of the sound.

17. The non-transitory computer-readable storage medium having stored therein the information processing program according to claim 1, wherein the information processing program causes the computer to execute: during the period of time that the operation apparatus is being vibrated using a first vibration mode, changing the frequency and/or amplitude of the vibration to a second vibration mode based on the motion or orientation data which has satisfied the predetermined condition, and thereafter changing frequency and/or amplitude of the vibration back to the first vibration mode.

18. An information processing apparatus for performing information processing based on an operation on an operation apparatus including a vibrator and a sensor for detecting a motion or an orientation of the operation apparatus, the information processing apparatus comprising a computer processor configured to:
generate predetermined vibration data for vibrating the vibrator;
output the predetermined vibration data to the operation apparatus;
acquire motion or orientation data based on a detection result of the sensor from the operation apparatus; and
perform predetermined information processing based on the motion or orientation data, wherein
generating the predetermined vibration data, when the motion or orientation data satisfies a predetermined condition in a period in which the predetermined vibration data for vibrating the vibrator is output, includes generating vibration data for temporarily changing the vibration of the vibrator and thereafter continuing the vibration of the vibrator.

19. An information processing system that includes an operation apparatus including a vibrator and a sensor for detecting a motion or an orientation of the operation apparatus and also includes an information processing apparatus for performing information processing based on an operation on the operation apparatus, the information processing system comprising a computer processor configured to:
generate predetermined vibration data for vibrating the vibrator;
output the predetermined vibration data to the operation apparatus;
acquire motion or orientation data based on a detection result of the sensor from the operation apparatus; and
perform predetermined information processing based on the motion or orientation data, wherein
generating the predetermined vibration data, when the motion or orientation data satisfies a predetermined condition in a period in which the predetermined vibration data for vibrating the vibrator is output, includes generating vibration data for temporarily changing the vibration of the vibrator and thereafter continuing the vibration of the vibrator.

20. The information processing system according to claim 19, wherein the computer processor is configured to: during the period of time that the operation apparatus is being vibrated using a first vibration mode, change the frequency and/or amplitude of the vibration to a second vibration mode based on the motion or orientation data which has satisfied the predetermined condition, and thereafter change frequency and/or amplitude of the vibration back to the first vibration mode.

21. An information processing method for performing information processing based on an operation on an operation apparatus including a vibrator and a sensor for detecting a motion or an orientation of the operation apparatus, the information processing method comprising:
generating predetermined vibration data for vibrating the vibrator;
outputting the predetermined vibration data to the operation apparatus;
acquiring motion or orientation data based on a detection result of the sensor from the operation apparatus; and
performing predetermined information processing based on the motion or orientation data, wherein
generating the predetermined vibration data, when the motion or orientation data satisfies a predetermined condition in a period in which the predetermined vibration data for vibrating the vibrator is output, includes generating vibration data for temporarily changing the vibration of the vibrator and thereafter continuing the vibration of the vibrator.

22. The information processing method according to claim 21 comprising: during the period of time that the operation apparatus is being vibrated using a first vibration mode, changing the frequency and/or amplitude of the vibration to a second vibration mode based on the motion or orientation data which has satisfied the predetermined condition, and thereafter changing frequency and/or amplitude of the vibration back to the first vibration mode.

23. A non-transitory computer-readable storage medium having stored therein an information processing program executed by a computer included in an information processing apparatus for performing information processing based on an operation on an operation apparatus including a vibrator, an acceleration sensor, and an angular velocity sensor, the information processing program causing the computer to execute:

acquiring, from the operation apparatus, acceleration data based on a detection result of the acceleration sensor and angular velocity data based on a detection result of the angular velocity sensor;

when the acceleration data satisfies a predetermined condition, generating predetermined vibration data for vibrating the vibrator;

outputting the predetermined vibration data to the operation apparatus; and performing predetermined information processing based on the acceleration data and/or the angular velocity data, wherein generating the predetermined vibration data, when the angular velocity data satisfies a predetermined condition, includes changing a parameter of the predetermined vibration data.

24. The non-transitory computer-readable storage medium having stored therein the information processing program according to claim 23, wherein the parameter of the predetermined vibration data includes the frequency and/or amplitude of the vibration and the information processing program causes the computer to execute: during the period of time that the vibrator is controlled using the generated predetermined vibration data to provide a first vibration mode, changing the frequency and/or amplitude of the predetermined vibration data to provide a second vibration mode upon the angular velocity data satisfies the predetermined condition, and thereafter changing the frequency and/or amplitude of the generated predetermined vibration data back to provide the first vibration mode.

25. A non-transitory computer-readable storage medium having stored therein an information processing program executed by a computer included in an information processing apparatus for performing information processing based on an operation on an operation apparatus including a vibrator, the information processing program causing the computer to execute:

acquiring operation data of an operation on the operation apparatus;

causing an object to move in a virtual world;

displaying on a display screen the virtual world where the object moves;

generating predetermined vibration data for vibrating the vibrator in relation to the movement of the object; and outputting the predetermined vibration data to the operation apparatus, wherein generating the predetermined vibration data, when the operation data satisfies a predetermined condition during the movement of the object in which the predetermined vibration data for vibrating the vibrator in relation to the movement of the object is output, includes generating vibration data for changing the vibration of the vibrator, and moving the object, when the operation data satisfies the predetermined condition during the movement of the object, includes changing a moving direction of the object in the virtual world.

26. The non-transitory computer-readable storage medium having stored therein the information processing program according to claim 25, wherein the information processing program causes the computer to execute: during the period of time that the vibrator is controlled using the generated predetermined vibration data to provide a first vibration mode, changing the frequency and/or amplitude of the predetermined vibration data to provide a second vibration mode upon the operation data satisfies the predetermined condition, and thereafter changing the frequency and/or amplitude of the generated predetermined vibration data back to provide the first vibration mode.

27. A non-transitory computer-readable storage medium having stored therein an information processing program executed by a computer included in an information processing apparatus for performing information processing based on an operation on an operation apparatus including a vibrator and an operation unit allowing an analog operation input, the information processing program causing the computer to execute:

generating predetermined vibration data for vibrating the vibrator;

outputting the predetermined vibration data to the operation apparatus;

acquiring analog operation data based on a detection result of the operation unit from the operation apparatus; and performing predetermined information processing based on the operation data, wherein generating the predetermined vibration data, when the analog operation data satisfies a predetermined condition in a period in which the predetermined vibration data for vibrating the vibrator is output, includes generating vibration data for temporarily changing the vibration of the vibrator and thereafter continuing the vibration of the vibrator.

28. The non-transitory computer-readable storage medium having stored therein the information processing program according to claim 27, wherein the information processing program causes the computer to execute: during the period of time that the generated vibration data is output to the operation apparatus for vibrating the vibrator to provide a first vibration mode, changing the frequency and/or amplitude of the generated vibration data to provide a second vibration mode upon the analog operation data satisfying the predetermined condition, and thereafter changing the frequency and/or amplitude of the generated vibration data back to provide the first vibration mode.

* * * * *